United States Patent
Cheng et al.

(10) Patent No.: US 10,334,479 B2
(45) Date of Patent: Jun. 25, 2019

(54) TRAFFIC STEERING METHOD AND HETEROGENEOUS RADIO ACCESS NETWORK SYSTEM APPLYING THE SAME

(71) Applicant: INDUSTRIAL TECHNOLOGY RESEARCH INSTITUTE, Hsinchu (TW)

(72) Inventors: Ching-Wen Cheng, Tainan (TW); Hung-Chen Chen, Hsinchu (TW); Fang-Ching Ren, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/086,635

(22) Filed: Mar. 31, 2016

(65) Prior Publication Data
US 2016/0337903 A1 Nov. 17, 2016

Related U.S. Application Data

(60) Provisional application No. 62/159,931, filed on May 11, 2015.

(51) Int. Cl.
*H04W 48/18* (2009.01)
*H04W 28/12* (2009.01)
(Continued)

(52) U.S. Cl.
CPC ....... *H04W 28/12* (2013.01); *H04W 28/0268* (2013.01); *H04W 36/22* (2013.01); *H04W 40/12* (2013.01)

(58) Field of Classification Search
CPC ... H04W 48/18; H04W 76/023; H04W 28/12; H04W 28/0268
(Continued)

(56) References Cited

U.S. PATENT DOCUMENTS 8,635,335 B2   1/2014 Raleigh et al.
8,898,079 B2  11/2014 Raleigh
(Continued)

FOREIGN PATENT DOCUMENTS

CN   101626596 A   1/2010
CN   102209030 A  10/2011
(Continued)

OTHER PUBLICATIONS

"Traffic steering command for Rel-13 WLAN Interworking", 3GPP TSG-RAN WG2 Meeting #90, R2-152109, May 25-29, 2015.
(Continued)

*Primary Examiner* — Inder P Mehra
(74) *Attorney, Agent, or Firm* — Rabin & Berdo, P.C.

(57) ABSTRACT

A heterogeneous radio access network system includes a mobile device and a first base station operated in a first wireless access network. The mobile device is wireless communicated with the first base station. One of the mobile device and the first base station sends a traffic steering initial message to request a traffic steering operation, the traffic steering initial message including a plurality of traffic flows. The other one of the mobile device and the first base station decides whether to accept or reject the traffic steering initial message. If the other one of the mobile device and the first base station accepts the traffic steering initial message, the mobile device performs a selective traffic steering, wherein the selective traffic steering comprises traffic flow(s), and the traffic flow(s) in the selective traffic steering are selected among the traffic flows of the traffic steering initial message.

27 Claims, 53 Drawing Sheets

(51) Int. Cl.
*H04W 40/12* (2009.01)
*H04W 36/22* (2009.01)
*H04W 28/02* (2009.01)

(58) Field of Classification Search
USPC ... 455/432.1, 434, 435.2, 435.3, 510, 552.1; 370/468, 235
See application file for complete search history.

(56) References Cited

U.S. PATENT DOCUMENTS

| | | | |
|---|---|---|---|
| 8,971,182 B2 | 3/2015 | Lee et al. | |
| 9,014,026 B2 | 4/2015 | Raleigh | |
| 9,167,492 B2 | 10/2015 | Li | |
| 9,185,620 B2 | 11/2015 | Khoryaev et al. | |
| 2012/0281674 A1* | 11/2012 | Jackson | H04L 12/1403 370/331 |
| 2014/0071942 A1 | 3/2014 | Ye | |
| 2014/0100962 A1 | 4/2014 | Rajagopalan et al. | |
| 2014/0314047 A1* | 10/2014 | Kalhan | H04W 36/38 370/331 |
| 2014/0334446 A1 | 11/2014 | Lim et al. | |
| 2015/0024001 A1 | 1/2015 | Misumi et al. | |
| 2015/0045038 A1 | 2/2015 | Gao et al. | |
| 2015/0098331 A1 | 4/2015 | Ye | |
| 2015/0098446 A1 | 4/2015 | Ye | |
| 2015/0181491 A1 | 6/2015 | Van Phan et al. | |
| 2015/0327117 A1 | 11/2015 | Sirotkin | |
| 2016/0066192 A1* | 3/2016 | Markwart | H04W 16/14 455/410 |
| 2016/0142970 A1 | 5/2016 | Chen et al. | |
| 2016/0277956 A1* | 9/2016 | Lindheimer | H04W 36/22 |
| 2016/0277974 A1* | 9/2016 | Persson | H04W 48/16 |
| 2016/0278138 A1 | 9/2016 | Chen et al. | |
| 2016/0337904 A1* | 11/2016 | Hsu | H04W 28/12 |
| 2016/0337960 A1* | 11/2016 | Nagasaka | H04W 48/18 |
| 2016/0374086 A1* | 12/2016 | Gupta | H04W 36/22 |
| 2017/0201939 A1* | 7/2017 | Lee | H04W 76/02 |

FOREIGN PATENT DOCUMENTS

| | | |
|---|---|---|
| CN | 102892143 A | 1/2013 |
| CN | 103002511 A | 3/2013 |
| CN | 103119980 A | 5/2013 |
| CN | 101998394 B | 7/2013 |
| CN | 103517340 A | 1/2014 |
| CN | 103582079 A | 2/2014 |
| CN | 104053185 A | 9/2014 |
| CN | 104349380 A | 2/2015 |
| CN | 104519531 A | 4/2015 |
| CN | 105165067 A | 12/2015 |
| EP | 2947926 A1 | 11/2015 |
| JP | 2015-033124 A | 2/2015 |
| TW | 201114280 A | 4/2011 |
| TW | I455637 B | 10/2014 |
| WO | WO 2013-066956 A1 | 5/2013 |
| WO | WO 2014-163696 A1 | 10/2014 |
| WO | WO 2015-016138 A1 | 2/2015 |

OTHER PUBLICATIONS

"Frame work for interworking enhancement in Rel-13", 3GPP TSG-RAN WG2 Meeting #90, R2-152519, May 25-29, 2015.
"Considerations on Interworking Enhancements", 3GPP TSG RAN WG2 Meeting #90, R2-152128, May 25-29, 2015.
"Core Network requirements for LTE-WLAN interworking", 3GPP TSG-RAN WG2 Meeting #90, R2-152246, May 25-29, 2015.
"Overall operational procedure for LTE-WLAN interworking", 3GPP TSG-RAN WG2 Meeting #91, R2-153170, Aug. 24-28, 2015.
"Traffic steering method for interworking enhancement", 3GPP TSG-RAN WG2 Meeting #91, R2-153551, Aug. 24-28, 2015.
"User preference aspects of WLAN aggregation and interworking", 3GPP TSG-RAN WG2 Meeting #91, R2-153625, Aug. 24-28, 2015.
"Summary of email discussion: [91bis#18][LTE/WiFi] LTE/WLAN Interworking enhancements", 3GPP TSG-RAN WG2 #92, R2-156592, Nov. 16-20, 2015.
"Introduction of LTE-WLAN Radio Level Integration and Interworking Enhancement stage-2", 3GPP TSG-RAN2 Meeting 92, R2-156902, Nov. 16-20, 2015.
"3rd Generation Partnership Project" etc, 3GPP TS 36.300 V13.1.0, Sep. 2015.
"3rd Generation Partnership Project" etc. 3GPP TS 23.402 V13.0.0, Dec. 2014.
"Presentation of Specification to TSG:TS36.463, Version 1.0.0", 3GPP TSG-RAN Meeting #70, Tdoc RP-151958, Dec. 7-10, 2015.
"3rd Generation Partnership Project" etc, 3GPP TR 37.834 V12.0.0, Dec. 2013.
Chinese Office Action dated Jan. 3, 2019.

* cited by examiner

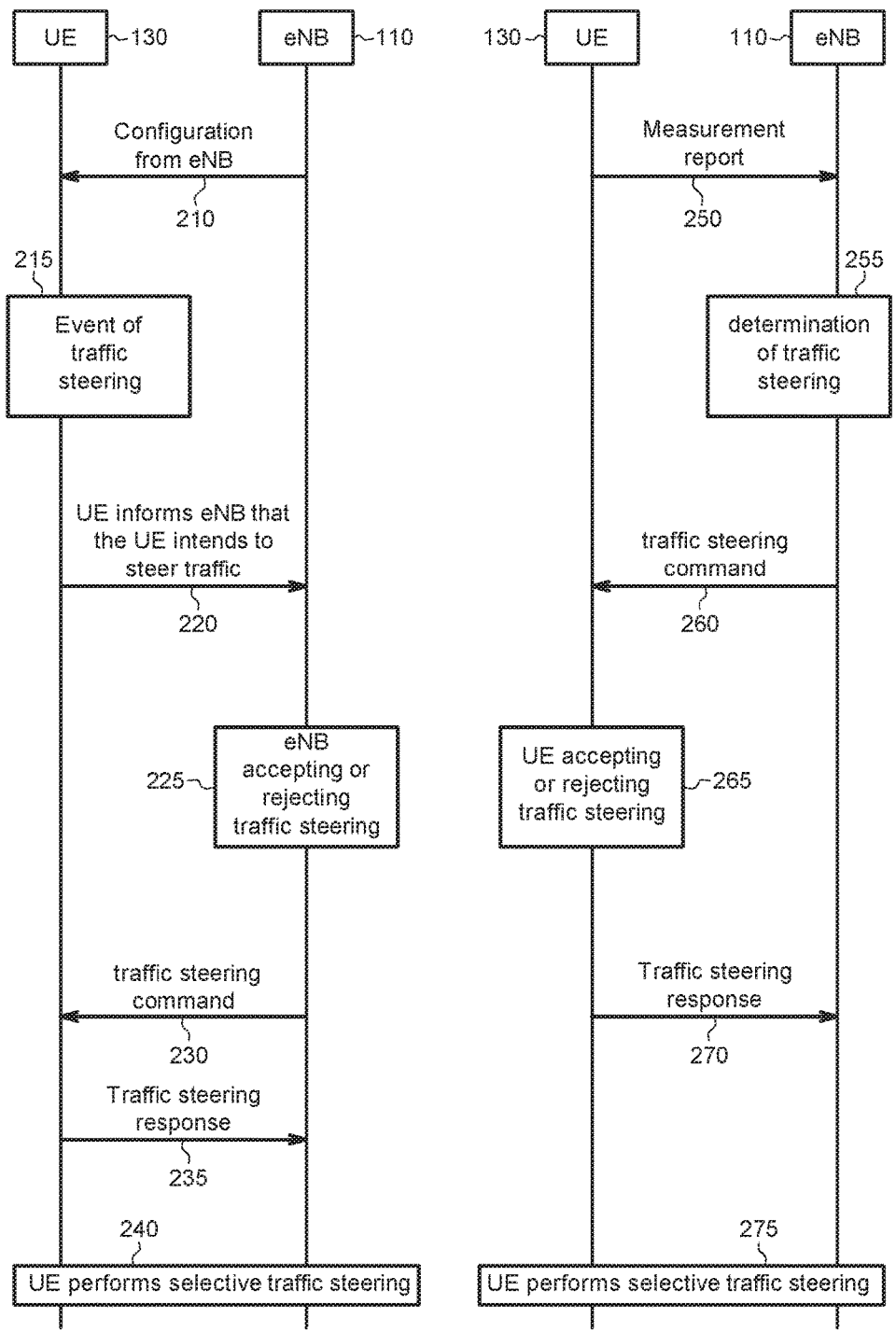

TRAFFIC STEERING METHOD AND HETEROGENEOUS RADIO ACCESS NETWORK SYSTEM APPLYING THE SAME

CROSS-REFERENCE TO RELATED ART

This application claims the benefit of U.S. Provisional application Ser. No. 62/159,931, filed on May 11, 2015, the disclosure of which is incorporated by reference herein in its entirety.

TECHNICAL FIELD

The disclosure relates in general to a traffic steering method and a heterogeneous radio access network system applying the same.

BACKGROUND

Cellular wireless networks are widely popular in people life. In cellular wireless networks, base stations (BSs) communicate with terminals (e.g., User Equipments (UEs), or mobile devices or mobile stations) within range of the BSs.

The geographical areas covered by the service of base stations are generally referred to as cells. Cellular wireless networks are formed by a plurality of BSs to cover a wide geographical area, and usually, cells are desired to be seamlessly with adjacent and/or overlapping cells. Terminals are generally mobile and may move among cells, prompting a need for traffic mobility between adjacent and/or overlapping cells.

3GPP (3rd Generation Partnership Project)/WLAN (Wireless Local Area Networks) interworking intended to provide UEs with seamless mobility between 3GPP access network and WLAN access network. Traffic steering (i.e., handling the traffic routing among cells) is a key issue of seamless traffic mobility. In 3GPP/WLAN interworking, radio resource utilization and load balance are important requirements.

Thus, the application provides a traffic steering method and a heterogeneous radio access network system applying the same.

SUMMARY

The disclosure is directed to a traffic steering method and a heterogeneous radio access network system applying the same. In the application, traffic steering initiated by UE or by CN (core network) is further admitted by 3GPP access node (e.g., eNB). The traffic steering determined by the 3GPP access node (e.g., eNB) is further confirmed by the UE.

According to one embodiment, a traffic steering method in a heterogeneous radio access network system is provided. The heterogeneous radio access network system includes a mobile device and a first base station operated in a first wireless access network. The mobile device is wireless communicated with the first base station. The traffic steering method includes: sending a traffic steering initial message to request a traffic steering by one of the mobile device and the first base station, the traffic steering initial message including a plurality of traffic flows; deciding whether to accept or reject the traffic steering initial message by the other one of the mobile device and the first base station; and if the other one of the mobile device and the first base station accepts the traffic steering initial message, performing a selective traffic steering by the mobile device, wherein the selective traffic steering comprises one or more traffic flow(s), and the one or more traffic flow(s) in the selective traffic steering are selected among the plurality of traffic flows in the traffic steering initial message.

According to another embodiment, a traffic steering method in a heterogeneous radio access network system is provided. The heterogeneous radio access network system includes a mobile device and a first base station operated in a first wireless access network. The mobile device is wireless communicated with the first base station. A traffic steering request is sent by the mobile device to the first base station to inform the first base station that the mobile device intends to steer traffic, the traffic steering request including a plurality of traffic flows. A traffic steering command is received by the mobile device if the first base station accepts the traffic steering request, wherein traffic flow(s) in the traffic steering command are selected among the plurality of traffic flows of the traffic steering request. The mobile device performs a selective traffic steering according to the traffic steering command, wherein one or more traffic flow(s) in the selective traffic steering are the one or more the traffic flows in the traffic steering command.

According to another embodiment, a traffic steering method in a heterogeneous radio access network system is provided. The heterogeneous radio access network system includes a mobile device and a first base station operated in a first wireless access network. The mobile device is wireless communicated with the first base station. A traffic steering command from the first base station is received by the mobile device, and the traffic steering command including a plurality of traffic flows. The mobile device determines whether to accept or reject the traffic steering command. A traffic steering response is sent to the first base station by the mobile device based on determination made by the mobile device, wherein traffic flow(s) in the traffic steering response are selected from the plurality of traffic flows in the traffic steering command. The mobile device performs a selective traffic steering, wherein traffic flow(s) in the selective traffic steering are the traffic flows of the traffic steering response.

According to still yet another embodiment, a heterogeneous radio access network system is provided. The heterogeneous radio access network system including: a mobile device; and a first base station operated in a first wireless access network. The mobile device is wireless communicated with the first base station. One of the mobile device and the first base station sending a traffic steering initial message to request a traffic steering, the traffic steering initial message including a plurality of traffic flows. The other one of the mobile device and the first base station decides whether to accept or reject the traffic steering initial message. If the other one of the mobile device and the first base station accepts the traffic steering initial message, the mobile device performs a selective traffic steering, wherein the selective traffic steering comprises one or more traffic flow(s), and the one or more traffic flow(s) in the selective traffic steering are selected among the plurality of traffic flows in the traffic steering initial message.

BRIEF DESCRIPTION OF THE DRAWINGS

FIG. 2A shows a traffic steering method initiated by a UE according to an embodiment of the application.

FIG. 2B shows another traffic steering method initiated by an eNB according to another embodiment of the application.

Figure 1B:
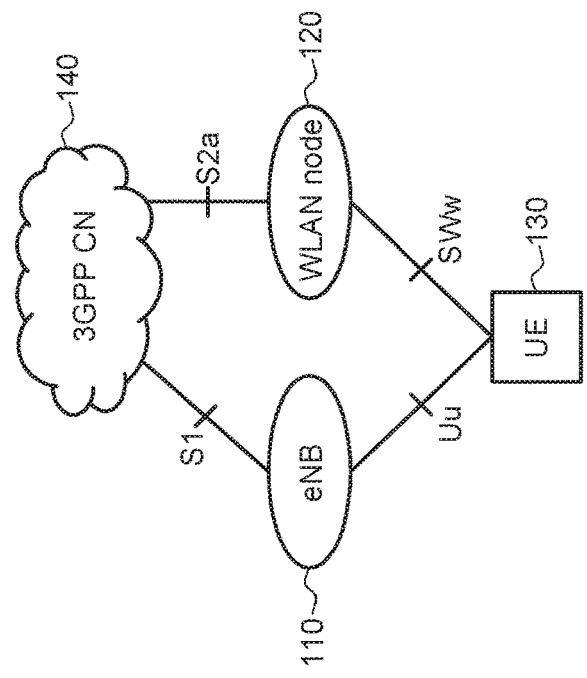
FIG. 1A and FIG. 1B show two examples of a heterogeneous radio access network system applying the traffic steering method according to an embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. However, it does not mean that implementation of the disclosure needs every technical feature of any embodiment of the disclosure or combination of the embodiments of the disclosure is prohibited. In other words, in possible implementation, one skilled person in the art would selectively implement part or all technical features of any embodiment of the disclosure or selectively combine part or all technical features of the embodiments of the disclosure.

The "heterogeneous radio access network system" mentioned hereinafter includes for example but not limited by, a 3GPP (3rd Generation Partnership Project) access network and a non-3GPP access network (for example, but not limited by) WLAN access network. The 3GPP access network and the WLAN access network are examples of wireless access networks. The 3GPP access network may be referred as a first wireless access network, and the WLAN access network may be referred as a second wireless access network.

The application discloses mechanisms for performing traffic steering in cellular wireless networks, particularly but not exclusively in heterogeneous radio access network systems.

Figure 1A:
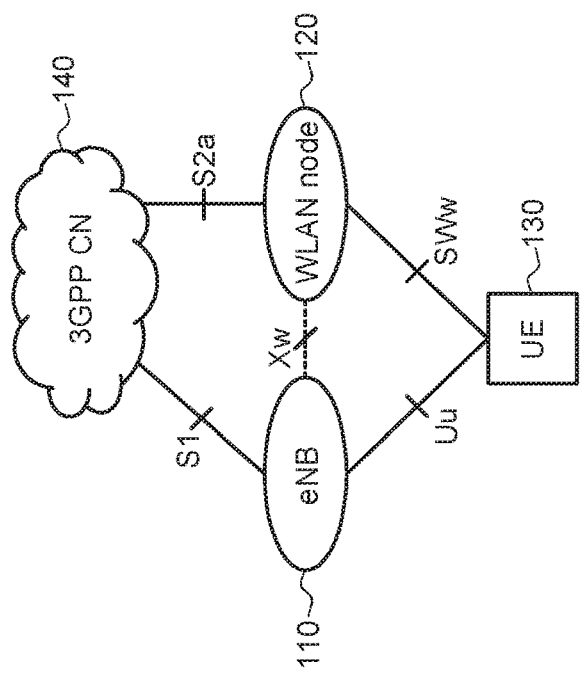

FIG. 1A and FIG. 1B show two examples of a heterogeneous radio access network system applying the traffic steering method according to an embodiment of the application. As shown in FIG. 1A and FIG. 1B, the heterogeneous radio access network system 100A/100B includes: a 3GPP access node 110, for example but not limited by, eNB; a WLAN (Wireless Local Area Network) node 120, at least one UE (User Equipment) 130 and a 3GPP CN (Core Network) 140. In the application, the UE 130 is an example of a mobile device. In one embodiment, the WLAN node 120 may be a WLAN AP (Access Point). The heterogeneous radio access network system 100A/100B includes interfaces S1, S2a, SWw and Uu. The interface S1 is between the eNB 110 and the 3GPP CN 140. The interface S2a is between the WLAN node 120 and the 3GPP CN 140. The interface Uu is between the eNB 110 and the UE 130. The interface SWw is between the WLAN node 120 and the UE 130. The 3GPP CN 140 is connected with the eNB 110 and the WLAN node 120. The UE 140 is wireless communicated with the eNB 110 and/or the WLAN node 120. In some embodiments, the eNB(s), the WLAN node(s), the SeNB(s) or the like may be referred as a base station.

The term "mobile device" in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so like.

In FIG. 1A, there is an interface Xw between the eNB 110 and the WLAN node 120. On the contrary, in FIG. 1B, there is no interface between the eNB 110 and the WLAN node 120.

In an embodiment of the application, traffic steering initiated by the UE 130 or by the 3GPP CN 140 is further admitted by the eNB 110. The traffic steering determined by the eNB 110 is further confirmed by the UE 130.

FIG. 2A shows a traffic steering method initiated by the UE 130 according to an embodiment of the application. FIG. 2B shows another traffic steering method initiated by the eNB 110 according to another embodiment of the application.

As shown in FIG. 2A, in step 210, the eNB 110 which is the serving eNB of the UE 130 sends an "eNB controlled steering configuration" message to one or more UEs 130 in the coverage of the eNB 110. The eNB controlled steering configuration message may be sent by the eNB 110 according to events (for example but not limited by, a congestion level of the heterogeneous radio access network system), or the indication/instruction from the core network 140, or by configuration. The eNB controlled steering configuration message may be delivered by the eNB 110 via broadcast signaling or via dedicated signaling.

The UE 130 which is capable of resolving the eNB controlled steering configuration message from the eNB 110 is subject to the control that the steering of traffics between the 3GPP access network and the WLAN access network is admitted by the eNB 110.

If the UE 130 determines that the event of traffic steering between the 3GPP access network and the WLAN access network occurs (i.e. an traffic steering event occurs) in step 215 (e.g., based on the policy rules configured from the core network 140 to the UE 130, or based on the radio condition learned by the UE 130), the UE 130 sends a "traffic steering request" to inform the eNB 110 that the UE 130 intends to steer traffic to obtain the admission for traffic steering in step 220. The traffic steering request may be referred as the traffic steering initial message. The traffic steering request includes a plurality of traffic flows. The policy rules configured from the core network to the UE 130 may include, for example, but not limited by, ISRP (Inter-System Routing Policy) or IARP (Inter-APN Routing Policy) of ANDSF (Access Network Discovery and Selection Function) rules.

In step 225, the eNB 110 determines whether to accept or reject the traffic steering request. In step 230, the eNB 110 sends a "traffic steering command" to inform the UE 130 if the eNB 110 accepts the traffic steering request. Traffic flow(s) in the traffic steering command are selected among the plurality of traffic flows of the traffic steering request. If the eNB 110 rejects the traffic steering request, then the eNB 110 does not respond to the traffic steering request. Or, in other possible embodiment of the application, if the eNB 110 rejects the traffic steering request, then the eNB 110 responds to the traffic steering request by, for example, sending a steering reject to the UE 130.

In step 235, the UE 130 may send "traffic steering response" (e.g., a UE ack or a UE response message) to the eNB 110 to acknowledge the traffic steering command sent by the eNB 110, and the UE 130 performs selective traffic steering according to the traffic steering command in step 240. Traffic flow(s) in the selective traffic steering are selected among the traffic flows of the traffic steering request. Further, the traffic flow(s) in the selective traffic steering are the traffic flows of the traffic steering command. The traffic flow(s) to be handled in the selective traffic steering may be a subset of the traffic flow(s) of the traffic steering request. In one embodiment, an amount of traffic flow(s) in the selective traffic steering may be smaller than an amount of traffic flow(s) in the traffic steering request.

In brief, in the embodiment of the application, the traffic steering request initiated by the UE 130 is admitted by the eNB 110.

In FIG. 2B, the UE 130 sends a "measurement report" to the eNB 110 in step 250. The UE 130 performs measurement procedure according to the configuration message from the eNB 110 if the UE 130 successfully connects to the eNB 110. The measurement procedure includes, for example but not limited by, receiving measurement command from the eNB 110 and sending the measurement report to the eNB 110 (periodically or by event triggered). The measurement report may include the information of the signal strength and/or the signal quality of the serving cell and one or more neighboring cells. The eNB 110 may use the measurement report from the UE 130 for traffic steering decision, or to select an assist eNB when dual connectivity is supported in the operation environment (i.e. when the UE 130, the eNB 110 and the core network 140 support dual connectivity).

In step 255, the eNB 110 determines whether a traffic steering event occurs for example, based on the measurement report from the UE 130. If the traffic steering event occurs, in step 260, the eNB 110 sends a "traffic steering command" to inform the UE 130 that the eNB 110 intends to initiate traffic steering. The traffic steering command may be referred as the traffic steering initial message. The traffic steering command includes a plurality of traffic flows. In step 265, the UE 130 determines whether to accept or reject the traffic steering command from the eNB 110. In step 270, the UE 130 sends a "traffic steering response" based on determination made by the UE 130, and the UE 130 performs selective traffic steering in step 275. Traffic flow(s) in the traffic steering response are selected among the plurality of traffic flows of the traffic steering command. The traffic flow(s) in the selective traffic steering are the traffic flows of the traffic steering response. The traffic flow(s) to be handled in the selective traffic steering may be a subset of the traffic flow(s) of the traffic steering command.

In brief, in the embodiment of the application, the traffic steering request initiated by the eNB 110 is allowed by the UE 130. That is, if without confirmation of the UE 130, the UE 130 does not perform the traffic steering request initiated by the eNB 110. In one embodiment, the traffic steering request and/or the traffic steering command may be also referred as the traffic steering initial message.

Now, more embodiments of the application are described with reference to the accompanying drawings. Embodiment A of the application describes the traffic steering from the 3GPP access network to the WLAN access network. Embodiment B of the application describes the traffic steering from the WLAN access network to the 3GPP access network. Embodiment C of the application describes that how the eNB shares load.

Embodiment A describes traffic steering from 3GPP to WLAN. In embodiment A, there are two embodiments A-1 and A-2. In the Embodiment A-1, the eNB 110 and the WLAN node 120 has an interface to share the information of UEs 130 and radio conditions by directly exchanging messages with each other. In the Embodiment A-2, there is no interface between the eNB 110 and the WLAN node 120, and thus the eNB 110 and the WLAN node 120 do not exchange messages directly with each other but share the information provided via other devices (for example, via the UE 130).

In the embodiment A-1, the UE 130 has ongoing PDN (Packet Data Network) connection(s) over the 3GPP access network. The UE 130 selects a WLAN (e.g., WLAN1) and may have PDN connection(s) over the selected WLAN. The eNB 110 which serves the UE 130 configures the UEs 130 for measurement control, and the UE 130 performs measurement report(s) based on the measurement control from the eNB 110. The measurement report(s) sent from the UE 130 to the eNB 110 may include the information of the WLANs detected by the UE 130. The information of the detected WLAN may include: RCPI (Received Channel Power Indicator), RSSI (Received Signal Strength Indicator), SSID (Service Set Identifier), BSSID (Basic Service Set Identifier) and/or BSS (Basic Service Set) load. The UE 130 may send the UE ID used in the selected WLAN to the eNB 110. The UE ID used in WLAN could be e.g., the IP address of the UE 130 used in the WLAN, or the MAC address of the UE 130. The WLAN node 120 that has an interface with the eNB 110 may send reports to the eNB 110 periodically or by event-triggered.

In the embodiment A-1, there are at least three embodiments, i.e. the embodiment A-1.1 (in which the traffic steering is initiated by the UE 130), the embodiment A-1.2 (in which the traffic steering is initiated by the CN 140), and the embodiment A-1.3 (in which the traffic steering is initiated by the eNB 110).

Figure 3:
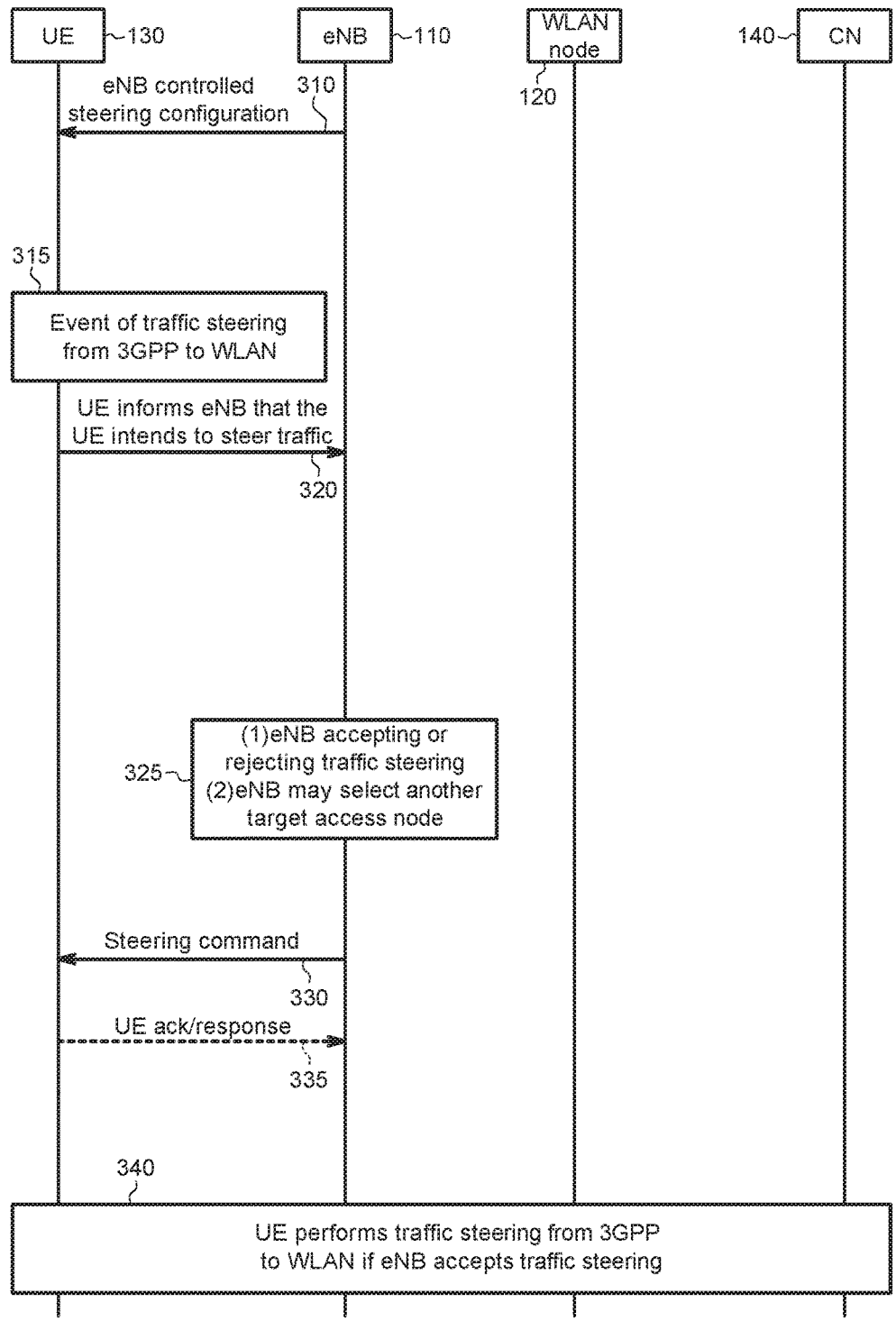
FIGS. 3-20 show respective traffic steering methods for steering from 3GPP access network to WLAN access network according to embodiments of the application.

Embodiment A-1.1-a: From 3GPP to WLAN, with eNB/WLAN Node Interface, UE Initiated FIG. 3 shows a traffic steering method according to the embodiment A-1.1-a of the application. In the embodiment A-1.1-a of the application, the traffic steering is initiated by the UE 130.

In step 310, the eNB 110 sends an "eNB controlled steering configuration" message to one or more UEs 130 in the coverage of the eNB 110. If the UE 130 determines that the event of traffic steering from the 3GPP access network to a WLAN access network occurs in step 315 (i.e. an traffic steering event occurs), the UE 130 sends a "traffic steering request" to inform the eNB 110 that the UE 130 intends to steer traffic to obtain the admission for traffic steering in step 320.

The information of the traffic steering request from the UE 130 to the eNB 110 may include for example but not limited by, the following information: (1) UE ID: the identifier that the requesting UE used in the WLAN for WLAN access (e.g., the MAC address of the UE or the IP address given by the WLAN); (2) cause: the cause of traffic steering (e.g., cause=UE-initiated) to present that the traffic steering intention is launched by the UE; (3) the direction of the intended traffic steering: e.g., "move out" presenting that the traffic will be steered from the 3GPP access network to a WLAN access network; "move in" presenting that the traffic will be steered from a WLAN access network to the 3GPP access network; (4) the identifier of the target access node (in the case that the direction of the intended traffic steering is from the 3GPP access network to the WLAN access network) or the identifier of the source access node (in the case that the direction of the intended traffic steering is from a WLAN access network to the 3GPP access network); (5) QoS (quality of service) information: the values of one or more bearer level of QoS parameter(s); and/or (6) a list of {APN, at least one ID of at least one traffic flow}: to identify one or more traffic flow(s) that are intended to be steered. "APN" identifies the APN (access point name) or a network connection that the one or more traffic flow(s) are transmitted through; and the at least one ID of at least one traffic flow to be steered may refer to the bearer ID(s) of one or more bearer(s) (e.g., EPS (Evolved Packet System) bearer, radio bearer), or refer to the ID(s) of one or more packet data flow(s) (e.g., IP/TCP/RTCP flow(s)), or refer to one or more priority/class ID(s) corresponded to the specific APN.

Further, the UE 130 may start a waiting timer for the window of expecting to receive a response message from the eNB 110 after the UE 130 sends the traffic steering request. If no response is received from the eNB 110 until the expiry of the waiting timer, the UE 130 does not perform traffic steering. The UE 130 may start a prohibit timer (e.g., timer_2) for the window of prohibiting frequent sending of traffic steering request. The UE 130 is allowed to send again a traffic steering request (sends another traffic steering request) to the eNB 110 after the expiry of the prohibit timer and the event of traffic steering from 3GPP to WLAN holds.

In step 325, the eNB 110 determines whether to accept or reject the traffic steering request. Further, if the eNB 110 accepts the traffic steering request, the eNB 110 may select another target access node for the UE 130 (e.g., based on the load of the target access node reported by the UE 130, or by the WLAN node 120 or by the estimation of the eNB 110).

In step 330, the eNB 110 sends a "traffic steering command" to inform the UE 130 if the eNB 110 accepts the traffic steering request. If the eNB 110 rejects the traffic steering request, then the eNB 110 does not respond to the traffic steering request. In another embodiment, the eNB 110 may respond to the traffic steering request to reject the traffic steering request.

The steering command message from the eNB 110 to the UE 130 may include: (1) the identifier of the target access node; (2) RAN (Radio Access Network) assistance information to assist the UE for the access network detection, selection and for traffic steering; and/or (3) a list of {APN, at least one ID of at least one traffic flow} to identify one or more traffic flow(s) that will be steered. The traffic flow ID(s) in the steering command information of step 330 may be different from the traffic flow ID(s) given in the traffic steering request of the step 320. In one embodiment, the traffic flow ID(s) in the steering command information of step 330 may be selected from the traffic flow ID(s) given in the traffic steering request of the step 320.

In step 335, the UE 130 may send a "UE ack" or a "UE response message" to the eNB 110 to acknowledge the traffic steering command sent by the eNB 110.

In step 340, the UE 130 performs traffic steering if the eNB 110 admitted the traffic steering. The performing of the traffic steering message may utilize the information including: the cause of traffic steering (e.g., cause=UE-initiated); the target access node identifier indicated by the eNB 110; the traffic flow ID identifying one or more traffic flow(s) that will be steered; and/or APN which identifies the APN that the one or more traffic flow(s) be transmitted through.

In step 340, when the UE 130 performs traffic steering, the traffic flows of the UE 130 may be partially steered or steered as a whole. For example, if the UE 130 has three traffic flows, the UE 130 may select/decide which of the traffic flows is/are to be steered. That is to say, the UE 130 may assign any one of the three traffic flows to be steered, or any two of the three traffic flows to be steered, or all of the three traffic flows to be steered, based on the decision of the UE 130.

Embodiment A-1.1-b: From 3GPP to WLAN, with eNB/WLAN Node Interface, UE Initiated with Dual Connectivity (DC)

Figure 4:
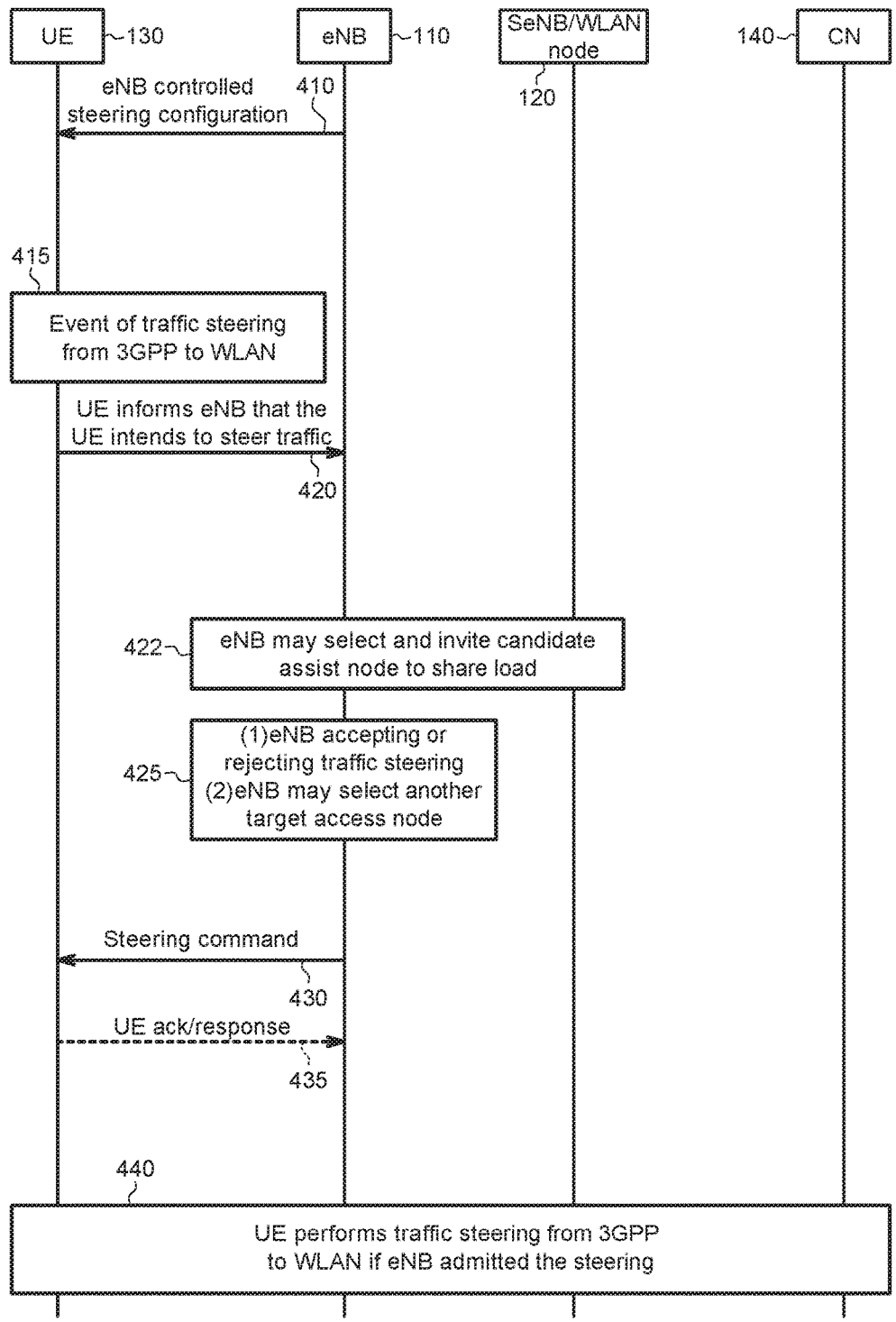

FIG. 4 shows a traffic steering method according to the embodiment A-1.1-b of the application. In the embodiment A-1.1-b of the application, the traffic steering is initiated by the UE 130 and the UE 130 supports Dual Connectivity (DC).

The DC UE mentioned hereinafter includes a UE which may connect to multiple eNBs simultaneously and have multiple PDN connections to the 3GPP core network (CN) via the 3GPP access network and via the WLAN access network.

In step 410, the eNB 110 sends an "eNB controlled steering configuration" message to one or more UEs 130 in the coverage of the eNB 110. If the UE 130 determines that the event of traffic steering from the 3GPP access network to a WLAN access network occurs in step 415, the UE 130 sends a "traffic steering request" to inform the eNB 110 that the UE 130 intends to steer traffic to obtain the admission for traffic steering in step 420. The information contained in the traffic steering request in step 420 is the same or similar to that in the step 320.

Further, in FIG. 4, the UE 130 may start a waiting timer for the window of expecting to receive a response message from the eNB 110 after the UE 130 sends the traffic steering request.

In step 422, the eNB 110 may select and invite other candidate assist node(s) to share load. Details of step 422 may be described in the Embodiment C.

In step 425, the eNB 110 determines whether to accept or reject the traffic steering request. Further, if the eNB 110 accepts the traffic steering request, the eNB 110 may select another target access node for the UE 130 (e.g., based on the load of the target access node reported by UEs, or by WLAN node(s) or by the estimation of the eNB 110) in step 425.

In step 430, the eNB 110 sends a "traffic steering command" to inform the UE 130 if the eNB 110 accepts the traffic steering request. If the eNB 110 rejects the traffic steering request, then the eNB 110 does not respond to the traffic steering request. In another embodiment, the eNB 110 may respond to the traffic steering request to reject the traffic steering request.

In step 435, the UE 130 may send a "UE ack" or a "UE response" message to the eNB 110 to acknowledge the traffic steering command sent by the eNB 110. In step 440, the UE 130 performs traffic steering if the eNB 110 admitted the traffic steering. The step 435 may be optional.

Figure 5:
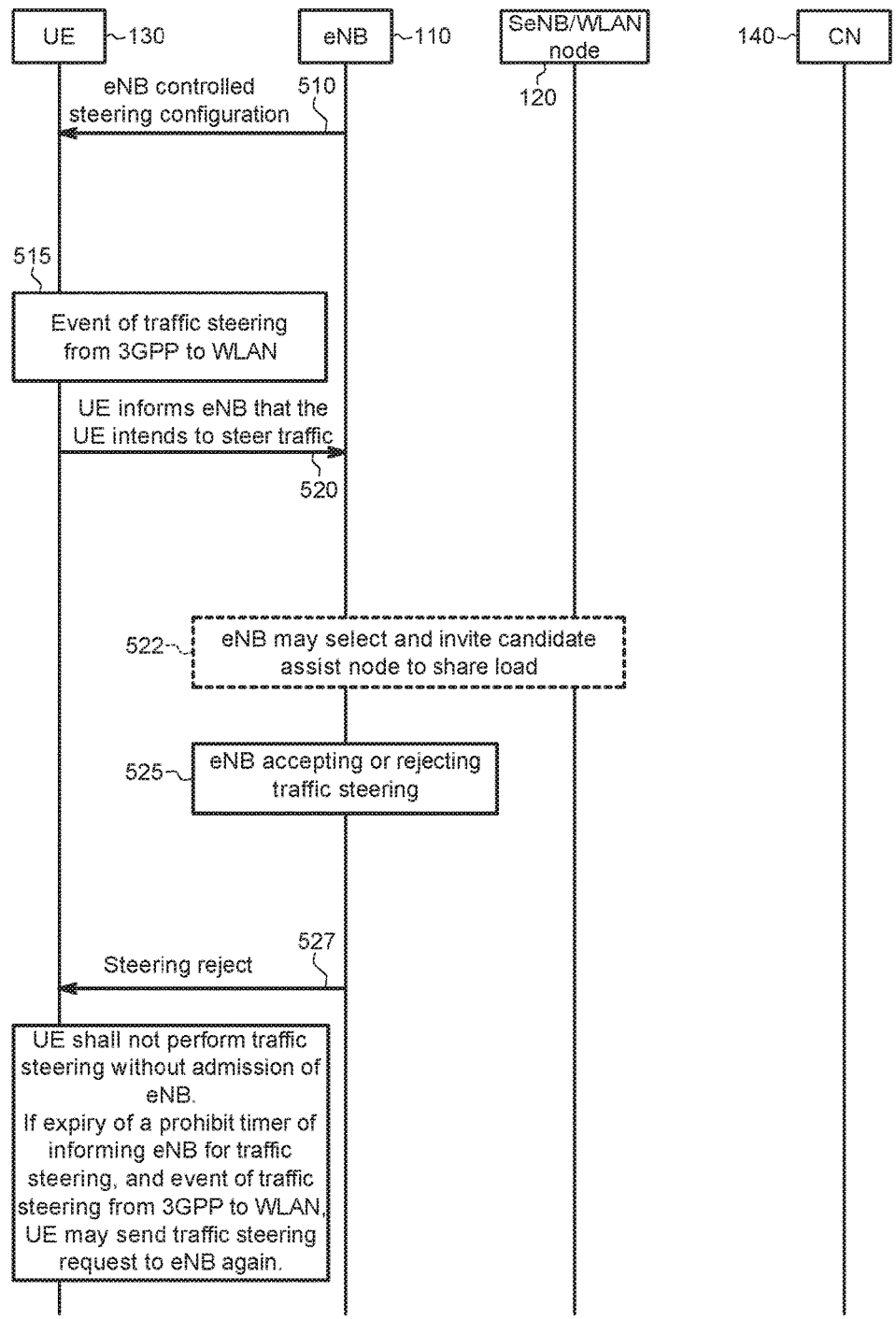

Embodiment A-1.1-c: From 3GPP to WLAN, with eNB/WLAN Node Interface, UE Initiated but eNB Rejects FIG. 5 shows a traffic steering method according to the embodiment A-1.1-c of the application. In the embodiment A-1.1-c, the UE 130 initiates a traffic steering request, but the eNB 110 rejects.

In step 510, the eNB 110 sends an "eNB controlled steering configuration" message to one or more UEs 130 in the coverage of the eNB 110. If the UE 130 determines that the event of traffic steering from the 3GPP access network to a WLAN access network occurs in step 515, the UE 130 sends a "traffic steering request" to inform the eNB 110 that the UE 130 intends to steer traffic to obtain the admission for traffic steering in step 520.

Further, the UE 130 may start a waiting timer for the window of expecting to receive a response message from the eNB 110 after the UE 130 sends the traffic steering request.

In step 522, the eNB 110 may select and invite other candidate assist node(s) to share load (e.g., based on WLAN reports or UE measurement reports).

In step 525, the eNB 110 determines whether to accept or reject the traffic steering request. If the eNB 110 decides to reject the traffic steering intention of the requesting UE 130, the eNB 110 sends a "steering reject" message to the requesting UE 130 in step 527. The steering reject message may include the following information: cause representing the cause for rejection, and/or RAN assistance information as information to assist the UE 130 for the access network detection and selection and for traffic steering.

Without admission of the eNB 110, the UE 130 does not perform traffic steering. The UE 130 may start a prohibit timer of informing eNB for traffic steering. If the prohibit timer is expired, and the event of traffic steering from 3GPP to WLAN holds or another event of traffic steering from 3GPP to WLAN occurs, the UE 130 may send the traffic steering request to the eNB 110 again (sends another traffic steering request). The UE 130 is allowed to send again a traffic steering request to the eNB 110 after the prohibit timer is expired and the event of traffic steering from 3GPP to WLAN holds/occurs again.

Figure 6:
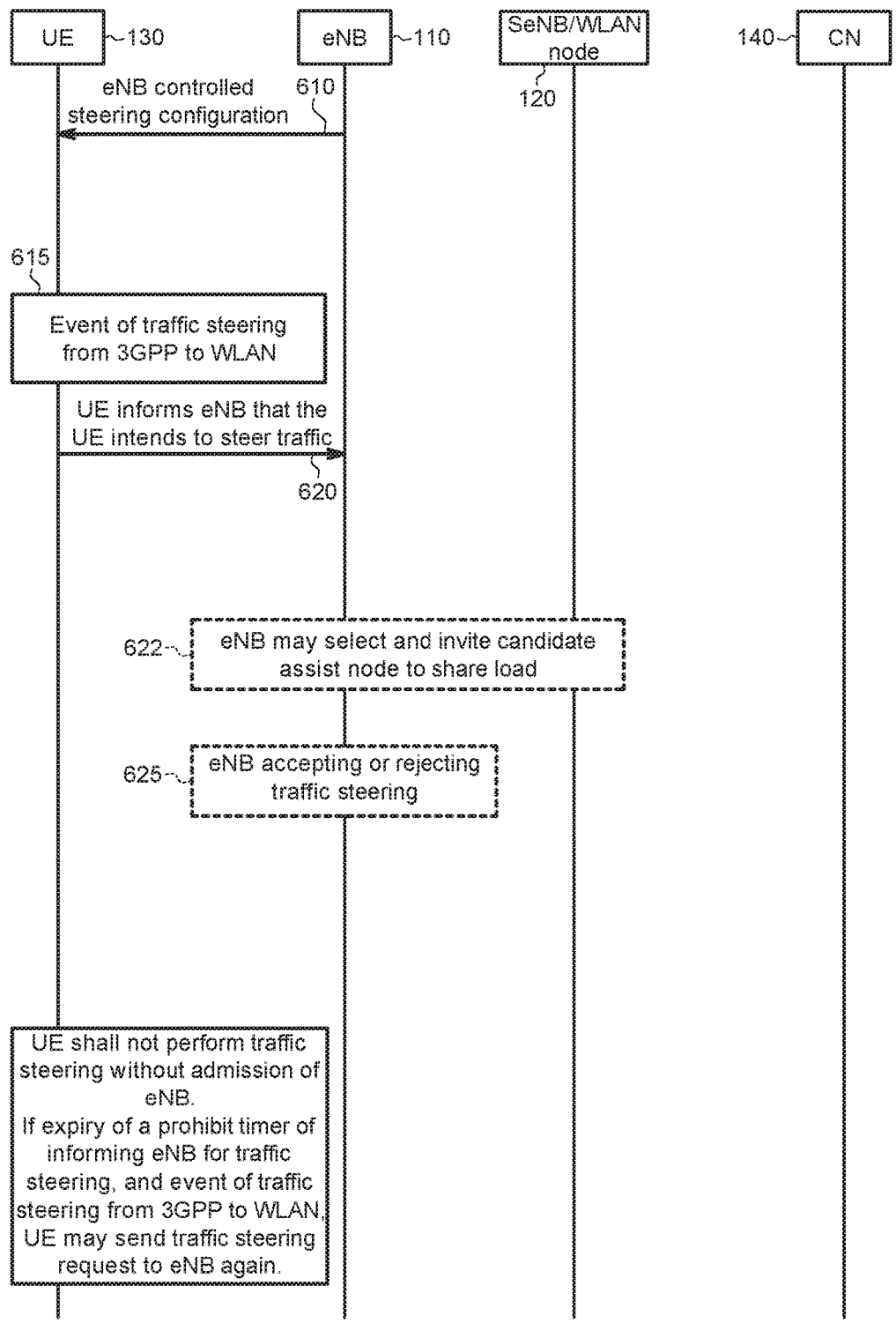

Embodiment A-1.1-d: From 3GPP to WLAN, with
eNB/WLAN Node Interface, UE Initiated but No
Response from eNB FIG. 6 shows a traffic steering method according to the embodiment A-1.1-d of the application. In the embodiment A-1.1-d, the UE 130 initiates a traffic steering request, but the eNB 110 does not respond.

In step 610, the eNB 110 sends an "eNB controlled steering configuration" message to one or more UEs 130 in the coverage of the eNB 110. If the UE 130 determines that the event of traffic steering from the 3GPP access network to the WLAN access network occurs in step 615, the UE 130 sends a "traffic steering request" to inform the eNB 110 that the UE 130 intends to steer traffic to obtain the admission for traffic steering in step 620.

Further, the UE 130 may start a waiting timer for the window of expecting to receive a response message from the eNB 110 after the UE 130 sends the traffic steering request.

In step 622, the eNB 110 may select and invite other candidate assist node to share load (e.g., based on WLAN reports or UE measurement reports).

In step 625, the eNB 110 determines whether to accept or reject the traffic steering request. After the eNB 110 determines to reject the traffic steering request from the UE 130, the eNB 110 may perform no action to the traffic steering request or the eNB 110 may decide not to respond to the traffic steering request. If so, no response would be sent to the requesting UE 130 from the eNB 110.

Without admission of the eNB 110, the UE 130 does not perform traffic steering. If no response is received until the expiry of the waiting timer, the UE 130 does not perform traffic steering. The UE 130 may start a prohibit timer of informing eNB for traffic steering. If the prohibit timer of informing eNB for traffic steering is expired, and event of traffic steering from 3GPP to WLAN occurs, the UE 130 may send the traffic steering request to the eNB 110 again. The UE 130 is allowed to send again a traffic steering request to the eNB 110 after the prohibit timer is expired and the event of traffic steering from 3GPP to WLAN holds/occurs again.

Figure 7:
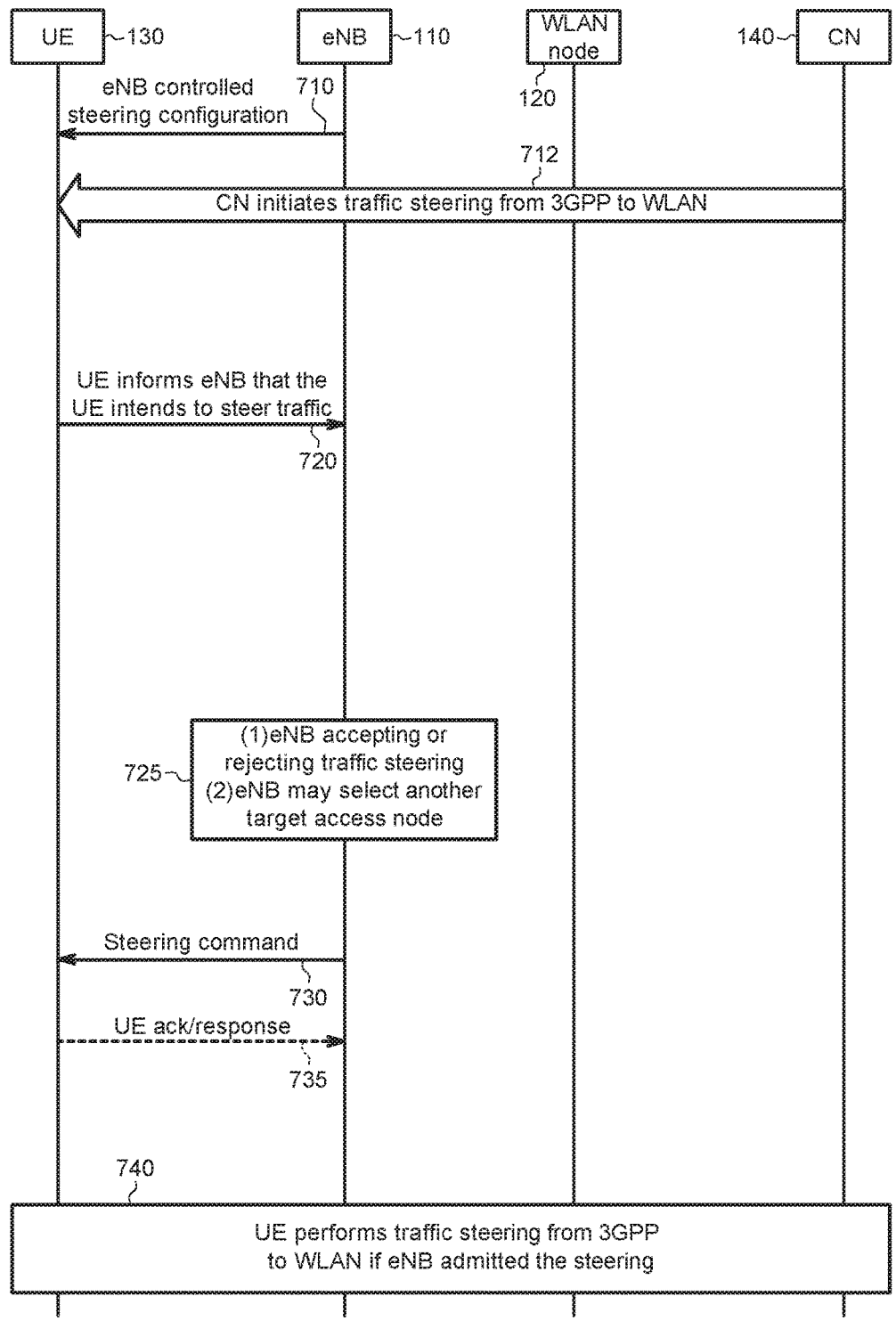

Embodiment A-1.2-a: From 3GPP to WLAN, with
eNB/WLAN Node Interface, CN Initiated FIG. 7 shows a traffic steering method according to the embodiment A-1.2-a of the application. In the embodiment A-1.2-a, the CN 140 initiates a traffic steering request.

In step 710, the eNB 110 sends an "eNB controlled steering configuration" message to one or more UEs 130 in the coverage of the eNB 110.

In step 712, the UE 130 receives an indication from the core network 140 that the core network 140 initiates traffic steering from 3GPP to WLAN for the UE 130.

The UE 130 sends a "traffic steering request" to the eNB 110 to inform the eNB 110 that the UE 130 intends to steer traffic to obtain the admission for traffic steering in step 720. The information in the traffic steering request of the step 720 is similar to the information in the traffic steering request of the step 320, but the cause parameter in the information in the traffic steering request of the step 720 is "ON-initiated".

In step 725, the eNB 110 determines whether to accept or reject the traffic steering request. Further, if the eNB 110 accepts the traffic steering request, the eNB may select another target access node for the UE 130 (e.g., based on the load of the target access node reported by UEs, or by WLAN(s) or by the estimation of the eNB 110) in step 725.

In step 730, the eNB 110 sends a "traffic steering command" to inform the UE 130 if the eNB 110 accepts the traffic steering request. In step 735, the UE 130 may send a "UE ack" or a "UE response" message to the eNB 110 to acknowledge the traffic steering command sent by the eNB 110.

In step 740, the UE 130 performs traffic steering if the eNB 110 admitted the traffic steering, and the information used in performing the traffic steering message includes: the cause of traffic steering (e.g., cause=CN-initiated), and/or the identifier of the target access node, the traffic flow ID and the APN.

Figure 8:
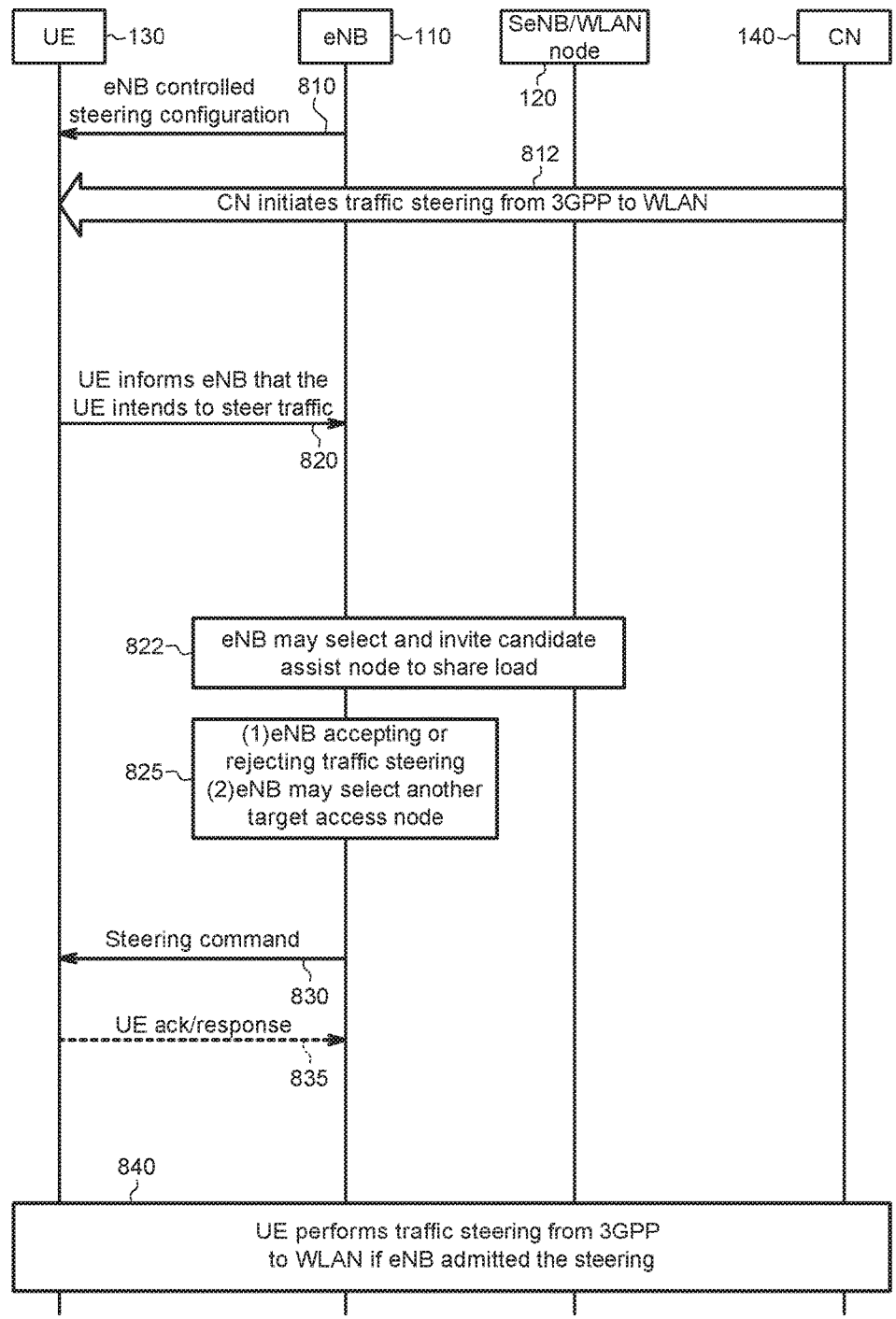

Embodiment A-1.2-b: From 3GPP to WLAN, with
eNB/WLAN Node Interface, CN Initiated with DC FIG. 8 shows a traffic steering method according to the embodiment A-1.2-b of the application. In the embodiment A-1.2-b, the CN 140 initiates a traffic steering request and the UE supports DC.

In step 810, the eNB 110 sends an "eNB controlled steering configuration" message to one or more UEs 130 in the coverage of the eNB 110.

In step 812, the UE 130 receives an indication from the core network 140 that the core network 140 initiates traffic steering from 3GPP to WLAN for the UE 130.

The UE 130 sends a "traffic steering request" to the eNB 110 to inform the eNB 110 that the UE 130 intends to steer traffic to obtain the admission for traffic steering in step 820.

In step 822, the eNB 110 may select and invite at least one candidate assist node to share load.

In step 825, the eNB 110 determines whether to accept or reject the traffic steering request. Further, if the eNB 110 accepts the traffic steering request, the eNB may select another target access node for the UE 130 (e.g., based on the load of the target access node reported by UEs, or by WLAN(s) or by the estimation of the eNB 110) in step 825.

In step 830, the eNB 110 sends a "traffic steering command" to inform the UE 130 if the eNB 110 accepts the traffic steering request. In step 835, the UE 130 may send a "UE ack" or a "UE response" message to the eNB 110 to acknowledge the traffic steering command sent by the eNB 110.

In step 840, the UE 130 performs traffic steering if the eNB 110 admitted the traffic steering.

Figure 9:
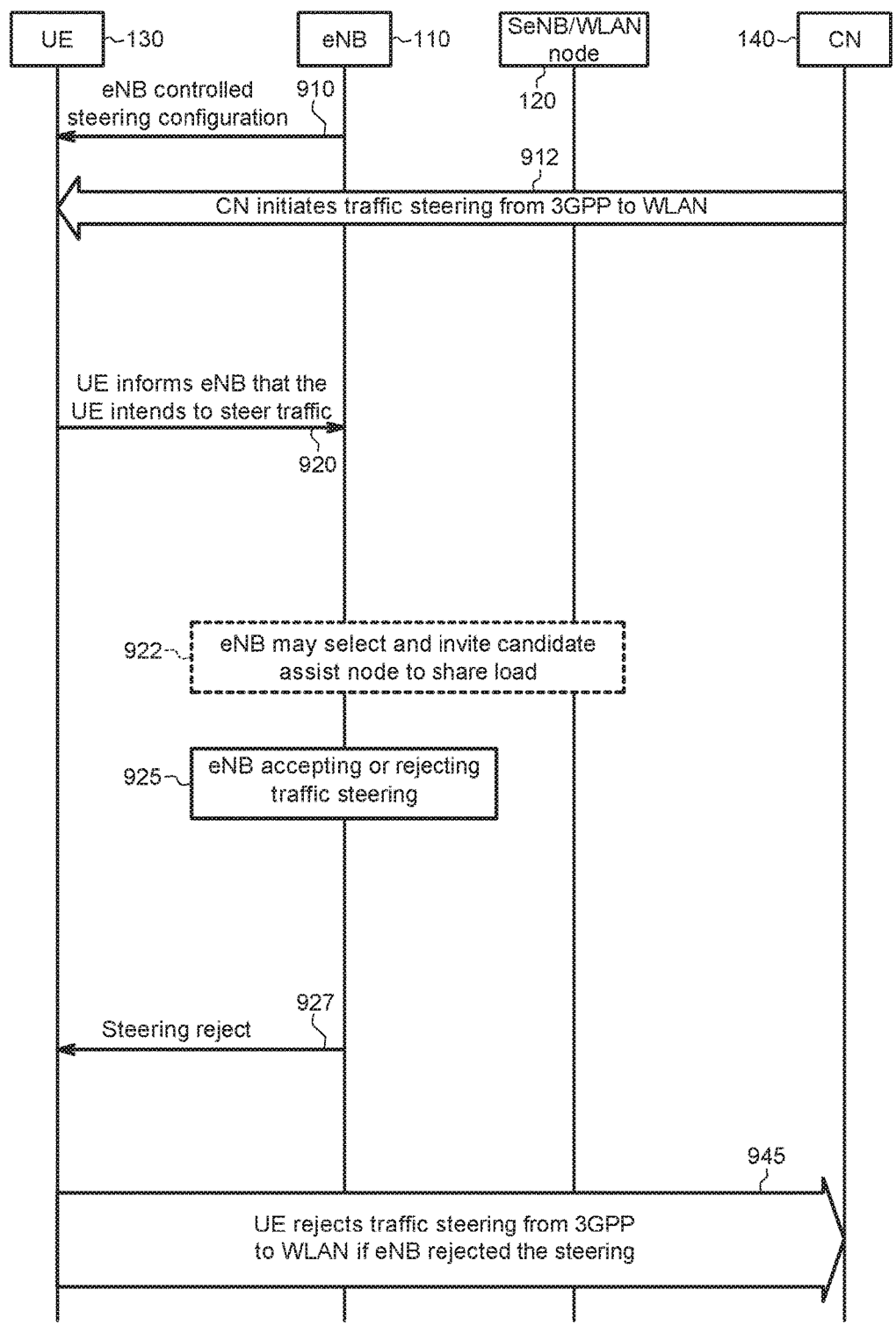

Embodiment A-1.2-c: From 3GPP to WLAN, with eNB/WLAN Node Interface, CN Initiated but eNB Rejected FIG. 9 shows a traffic steering method according to the embodiment A-1.2-c of the application. In the embodiment A-1.2-c, the CN 140 initiates a traffic steering request, but the eNB 110 rejects.

In step 910, the eNB 110 sends an "eNB controlled steering configuration" message to one or more UEs 130 in the coverage of the eNB 110.

In step 912, the UE 130 receives an indication from the core network 140 that the core network 140 initiates traffic steering from 3GPP to WLAN for the UE 130.

The UE 130 sends a "traffic steering request" to the eNB 110 to inform the eNB 110 that the UE 130 intends to steer traffic to obtain the admission for traffic steering in step 920.

In step 922, the eNB 110 may select and invite at least one candidate assist node to share load.

In step 925, the eNB 110 determines whether to accept or reject the traffic steering request. If the eNB 110 decides to reject the traffic steering intention of the requesting UE 130, the eNB 110 sends a "steering reject message" to the requesting UE 130 in step 927.

Upon receiving the steering reject message from the eNB 110, the UE 130 rejects traffic steering from 3GPP to WLAN requested by the CN 140 in step 945. The rejection message from the UE 130 to the CN 140 may include the cause presenting that the eNB 110 rejects the traffic steering (e.g., cause=eNB-controlled) from 3GPP to WLAN.

Figure 10:
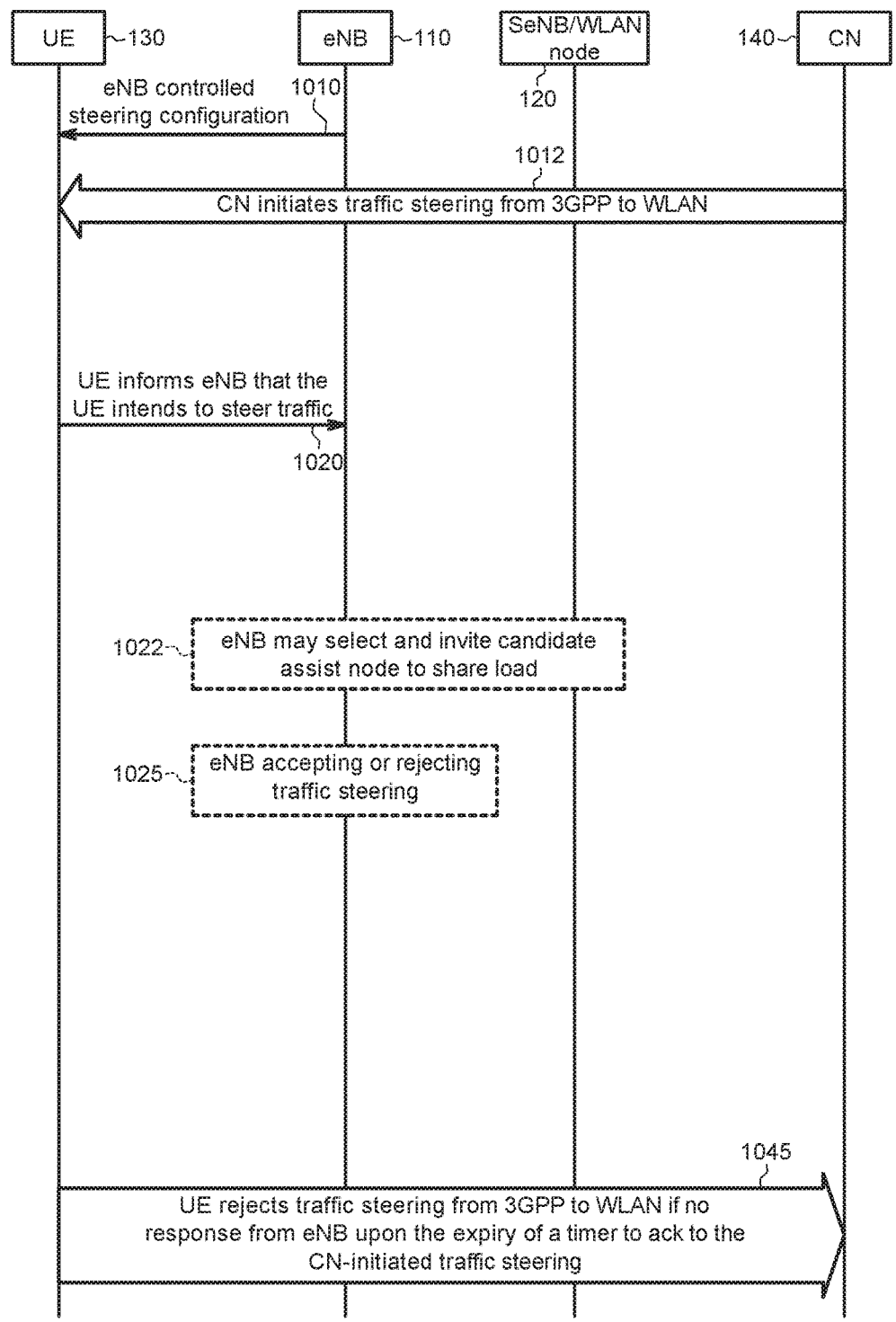

Embodiment A-1.2-d: From 3GPP to WLAN, with eNB/WLAN Node Interface, CN Initiated but No Response from eNB FIG. 10 shows a traffic steering method according to the embodiment A-1.2-d of the application. In the embodiment A-1.2-d, the CN 140 initiates a traffic steering request, but the eNB 110 does not respond.

In step 1010, the eNB 110 sends an "eNB controlled steering configuration" message to one or more UEs 130 in the coverage of the eNB 110.

In step 1012, the UE 130 receives an indication from the core network 140 that the core network 140 initiates traffic steering from 3GPP to WLAN for the UE 130.

The UE 130 sends a "traffic steering request" to the eNB 110 to inform the eNB 110 that the UE 130 intends to steer traffic to obtain the admission for traffic steering in step 1020.

In step 1022, the eNB 110 may select and invite at least one candidate assist node to share load.

In step 1025, the eNB 110 determines whether to accept or reject the traffic steering request. After the eNB 110 determines to reject the traffic steering request from the UE 130, the eNB 110 may perform no action to the traffic steering request or the eNB 110 may decide not to respond to the traffic steering request. If so, no response would be sent to the requesting UE 130 from the eNB 110.

The UE does not perform traffic steering without admission of eNB. Upon expiry of the waiting timer for the time window of expecting to receive a response message from the eNB 110, in step 1045, the UE 130 rejects traffic steering from 3GPP to WLAN requested by the CN 140 if the UE 130 does not receive a response from the eNB 110. The rejection from the UE 130 to the CN 140 may include the cause which presents that the eNB rejects the traffic steering (e.g., cause=eNB-controlled) from 3GPP to WLAN.

Figure 11:
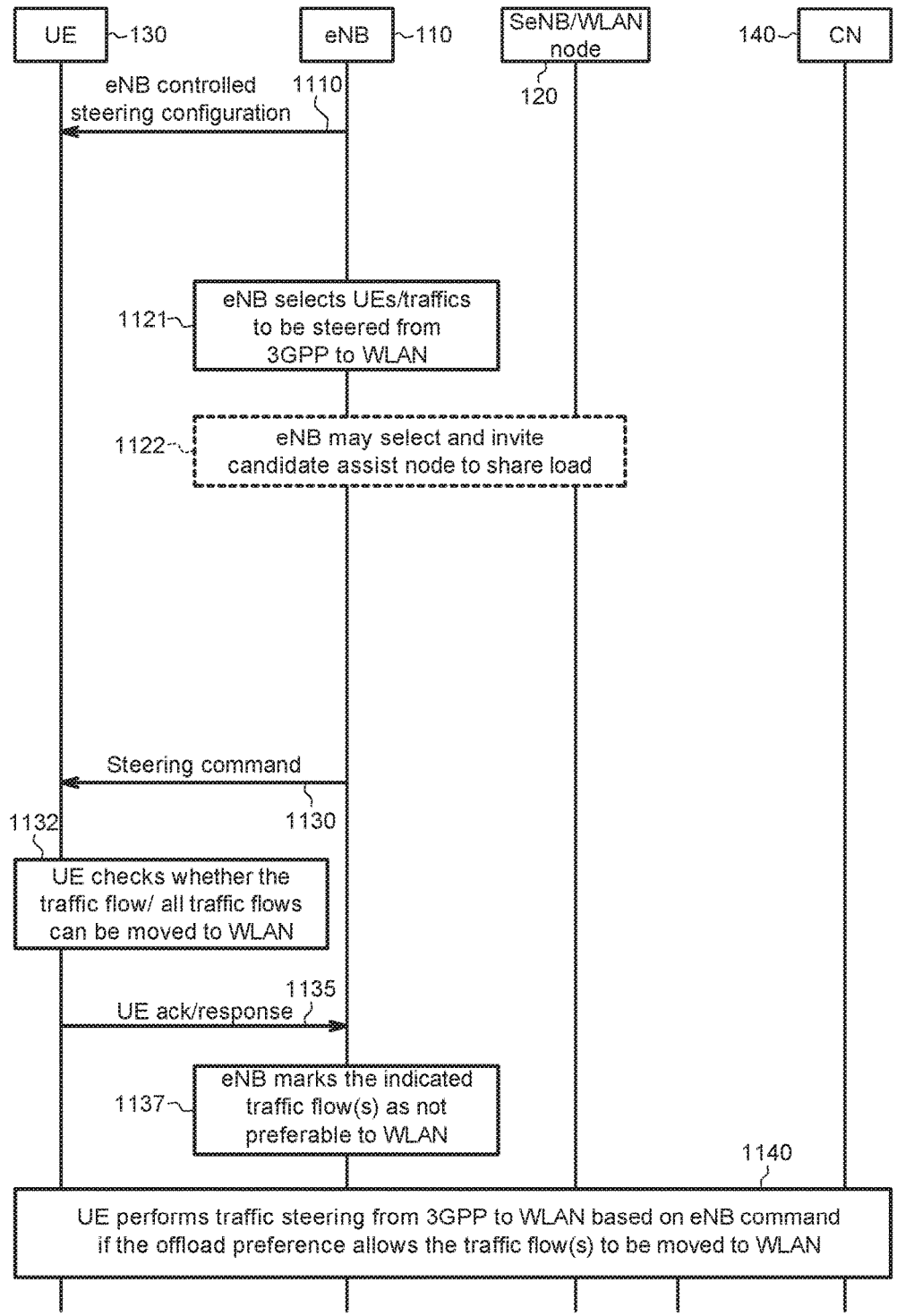

Embodiment A-1.3-a: From 3GPP to WLAN, with eNB/WLAN Node Interface, eNB Initiated FIG. 11 shows a traffic steering method according to the embodiment A-1.3-a of the application. In the embodiment A-1.3-a, the eNB 110 initiates a traffic steering request.

In step 1110, the eNB 110 sends an "eNB controlled steering configuration" message to one or more UEs 130 in the coverage of the eNB 110.

The eNB 110 selects UEs and/or traffic flow(s) to be steered from 3GPP to WLAN (e.g., based on the measurement reports from UEs, or load of target access node reported by UEs or by WLAN(s), or by the estimation of the network element of 3GPP access network) in step 1121.

The eNB 110 may select and invite at least one candidate assist node to share load in step 1122.

In step 1130, the eNB 110 sends a "traffic steering command" to inform the UE 130 if the eNB 110 initiates the traffic steering.

Upon receiving the "steering command" message (traffic steering command) from the eNB 110, the UE 130 checks whether the one or more traffic flow(s) indicated in the steering command message are allowed (e.g., complying with the policy rules maintained in the UE for offload preference) to be moved to WLAN in step 1132.

In step 1135, the UE 130 may send a "UE ack" or a "UE response" message to the eNB 110 to acknowledge the steering command message sent by the eNB 110. The UE ack or UE response message may include an indication (e.g., no release traffic flow(s) indication) to indicate that the one or more traffic flow(s) of the specific APN should not be released according to the policy rules maintained in the UE 130.

In step 1137, if the eNB 110 receives from the UE the UE ack or UE response message includes the indication (e.g., no release traffic flow(s) indication) to indicate that the one or more traffic flows(s) of the specific APN should not be released, the eNB 110 should not release the specific traffic flow(s); and the eNB 110 may mark the indicated traffic flow(s) as not allowed to be steered WLAN.

In step 1140, the UE performs traffic steering from 3GPP to WLAN based on the steering command if the offload preference allows the traffic flow(s) to be moved to WLAN.

The performing of the traffic steering message may utilize the information including the cause of traffic steering (cause=eNB-initiated); the identifier of the target access node which was indicated by the eNB 110; the traffic flow ID(s) to identify one or more traffic flow(s) that will be steered; and/or the APN.

In the embodiment A-2, there is no interface between the eNB 110 and the WLAN node 120. The UE 130 has ongoing PDN connection(s) over 3GPP. The UE 130 may select a WLAN (e.g., WLAN1) and may have PDN connection(s) over the selected WLAN. The eNB 110 which serves the UE 130 configures UEs for measurement control. The UE 130 performs measurement report(s) based on the measurement control from the eNB 110. The measurement report(s) sent from the UE 130 to the eNB 110 may include the information of the WLANs detected by the UE 130. The UE 130 may send the UE ID used in the selected WLAN to the eNB 110. The UE ID used in WLAN could be e.g., the IP address of the UE used in the WLAN, or the MAC address of the UE used in the WLAN.

Embodiment A-2.1-a: From 3GPP to WLAN, No eNB/WLAN Node Interface, UE Initiated

Figure 12:
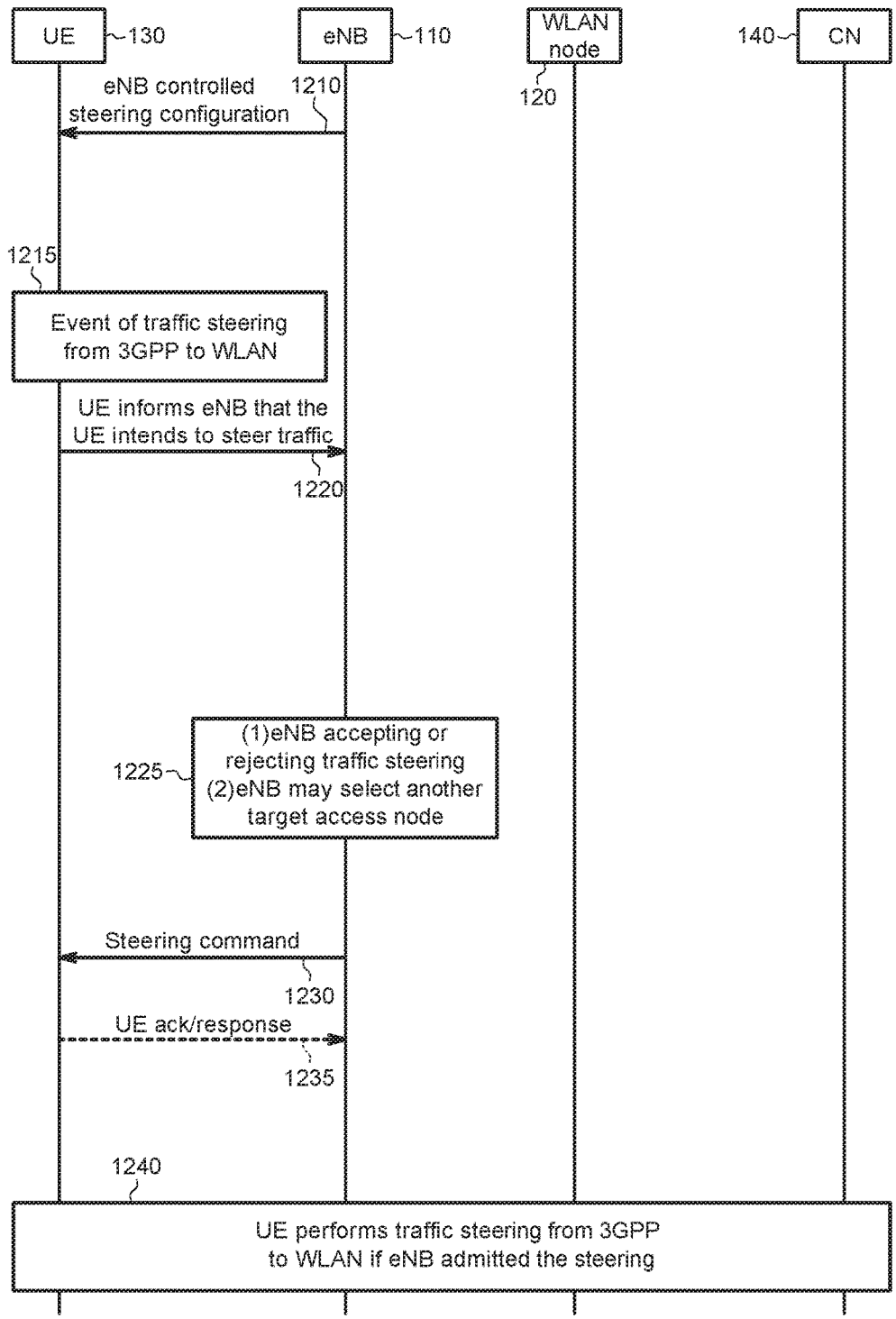

FIG. 12 shows a traffic steering method according to the embodiment A-2.1-a of the application. In the embodiment A-2.1-a of the application, the traffic steering is initiated by the UE 130 and there is no interface between the eNB 110 and the WLAN node 120.

In step 1210, the eNB 110 sends an "eNB controlled steering configuration" message to one or more UEs 130 in the coverage of the eNB 110. If the UE 130 determines that the event of traffic steering between the 3GPP access network and the WLAN access network occurs in step 1215, the UE 130 sends a "traffic steering request" to inform the eNB 110 that the UE 130 intends to steer traffic to obtain the admission for traffic steering in step 1220.

Further, the UE 130 may start a waiting timer for the window of expecting to receive a response message from the eNB 110 after the UE 130 sends the traffic steering request.

In step 1225, the eNB 110 determines whether to accept or reject the traffic steering request. Further, if the eNB 110 accepts the traffic steering request, the eNB 110 may select another target access node for the UE 130.

In step 1230, the eNB 110 sends a "traffic steering command" to inform the UE 130 if the eNB 110 accepts the traffic steering request.

In step 1235, the UE 130 may send a "UE ack" or a "UE response" message to the eNB 110 to acknowledge the traffic steering command sent by the eNB 110.

In step 1240 the UE 130 performs traffic steering if the eNB 110 admitted the traffic steering.

Figure 13:
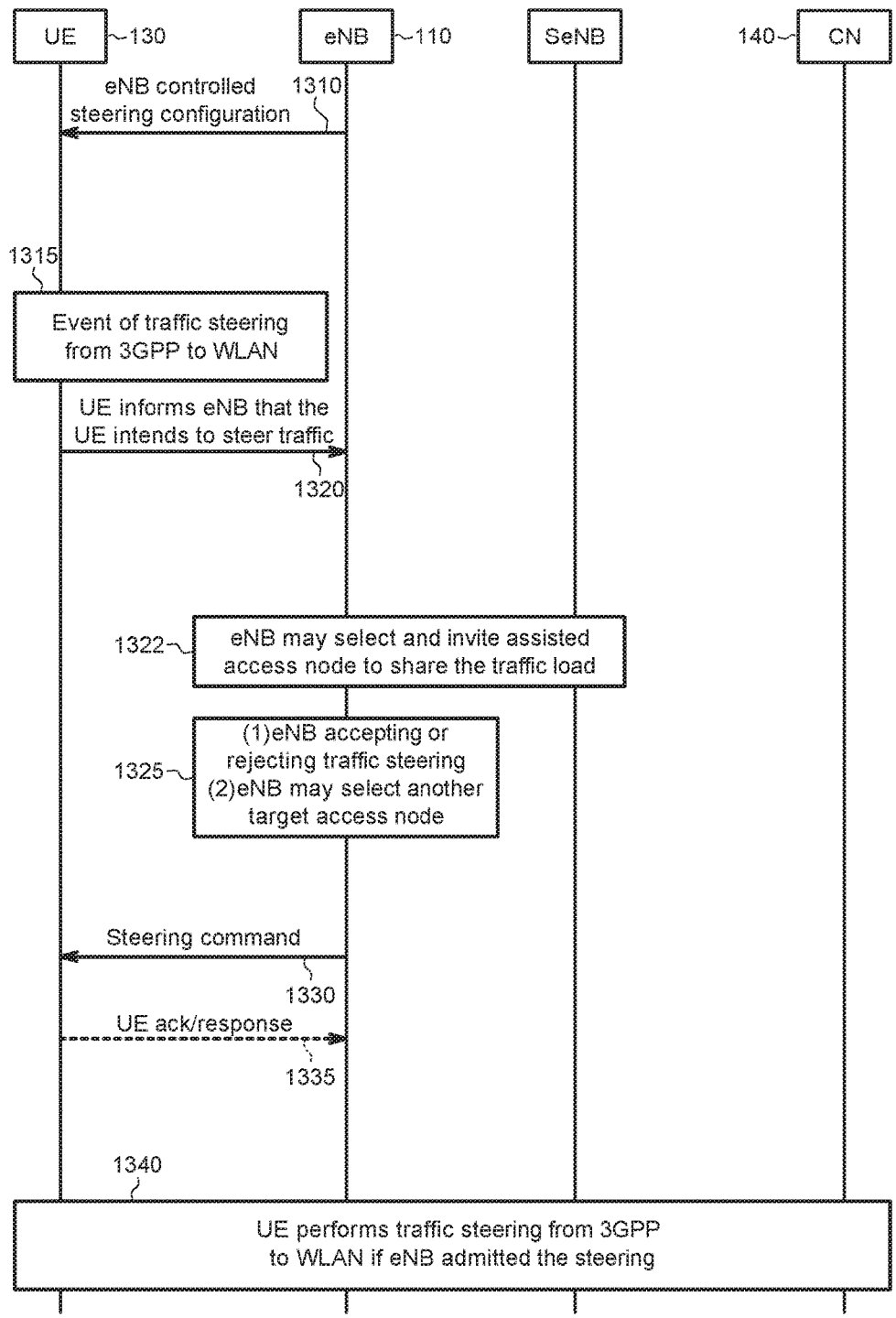

Embodiment A-2.1-b: From 3GPP to WLAN, No eNB/WLAN Node Interface, UE Initiated with DC FIG. 13 shows a traffic steering method according to the embodiment A-2.1-b of the application. In the embodiment A-2.1-b of the application, the traffic steering is initiated by the UE 130 and the UE 130 supports DC.

In step 1310, the eNB 110 sends an "eNB controlled steering configuration" message to one or more UEs 130 in the coverage of the eNB 110. If the UE 130 determines that the event of traffic steering between the 3GPP access network and the WLAN access network occurs in step 1315, the UE 130 sends a "traffic steering request" to inform the eNB 110 that the UE 130 intends to steer traffic to obtain the admission for traffic steering in step 1320.

Further, in FIG. 13, the UE 130 may start a waiting timer for the window of expecting to receive a response message from the eNB 110 after the UE 130 sends the traffic steering request.

In step 1322, the eNB 110 may select and invite other candidate assist node to share load.

In step 1325, the eNB 110 determines whether to accept or reject the traffic steering request. Further, if the eNB 110 accepts the traffic steering request, the eNB may select another target access node for the UE 130 (e.g., based on the load of the target access node reported by UEs, or by WLAN(s) or by the estimation of the eNB 110) in step 1325.

In step 1330, the eNB 110 sends a "traffic steering command" to inform the UE 130 if the eNB 110 accepts the traffic steering request.

In step 1335, the UE 130 may send a "UE ack" or a "UE response" message to the eNB 110 to acknowledge the traffic steering command sent by the eNB 110. In step 1340, the UE 130 performs traffic steering if the eNB 110 admitted the traffic steering.

Figure 14:
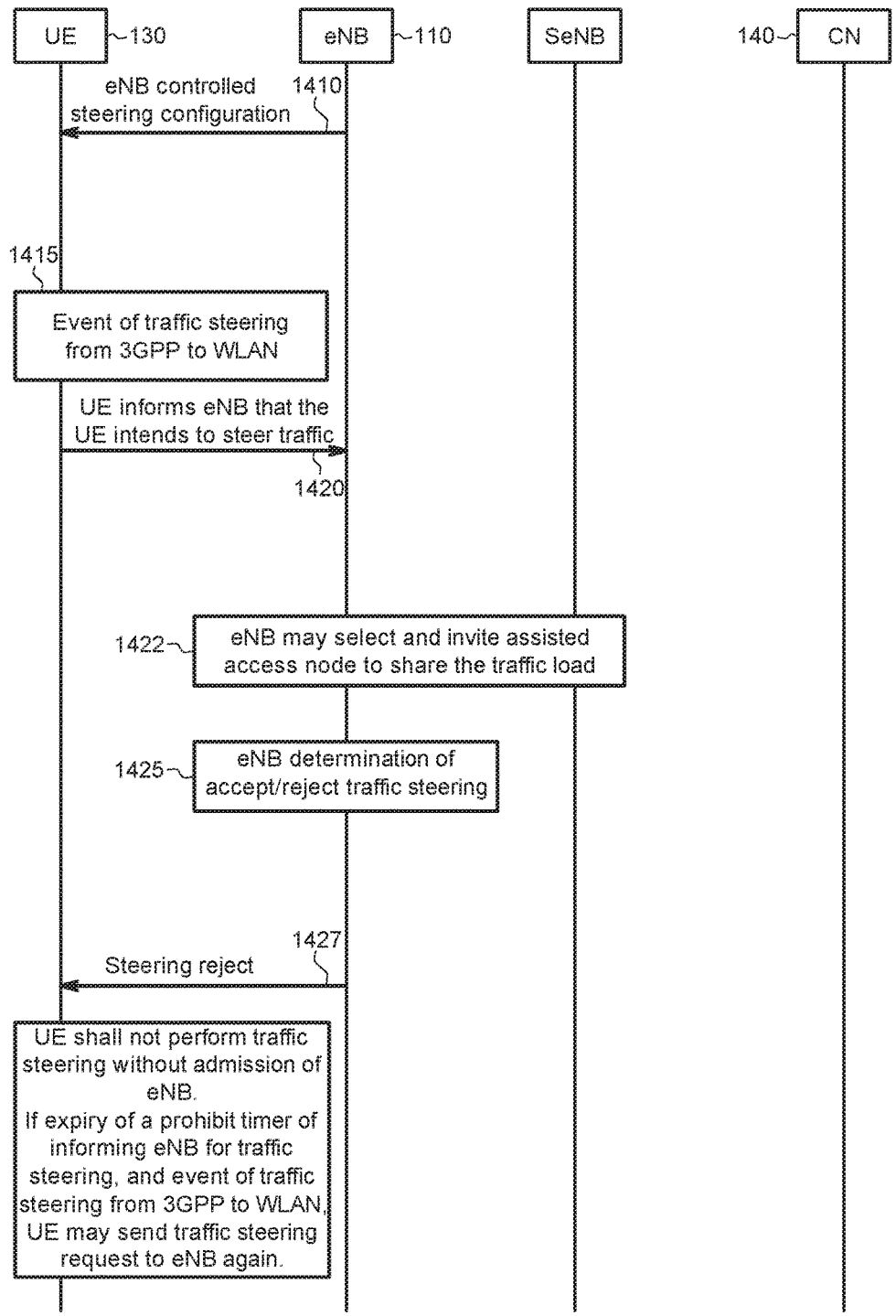

Embodiment A-2.1-c: From 3GPP to WLAN, No eNB/WLAN Node Interface, UE Initiated but eNB Rejects FIG. 14 shows a traffic steering method according to the embodiment A-2.1-c of the application. In the embodiment A-2.1-c, the UE 130 initiates a traffic steering request, but the eNB 110 rejects.

In step 1410, the eNB 110 sends an "eNB controlled steering configuration" message to one or more UEs 130 in the coverage of the eNB 110. If the UE 130 determines that the event of traffic steering between the 3GPP access network and the WLAN access network occurs in step 1415, the UE 130 sends a "traffic steering request" to inform the eNB 110 that the UE 130 intends to steer traffic to obtain the admission for traffic steering in step 1420.

Further, the UE 130 may start a waiting timer for the window of expecting to receive a response message from the eNB 110 after the UE 130 sends the traffic steering request.

In step 1422, the eNB 110 may select and invite other candidate assist node to share load (e.g., based on WLAN reports or UE measurement reports).

In step 1425, the eNB 110 determines whether to accept or reject the traffic steering request. If the eNB 110 decides to reject the traffic steering intention of the requesting UE 130, the eNB 110 sends a "steering reject" message to the requesting UE 130 in step 1427.

Without admission of the eNB 110, the UE 130 does not perform traffic steering. The UE 130 may start a prohibit timer of informing eNB for traffic steering. If the prohibit timer of informing eNB for traffic steering is expired, and event of traffic steering from 3GPP to WLAN occurs, the UE 130 may send the traffic steering request to the eNB 110 again.

Figure 15:
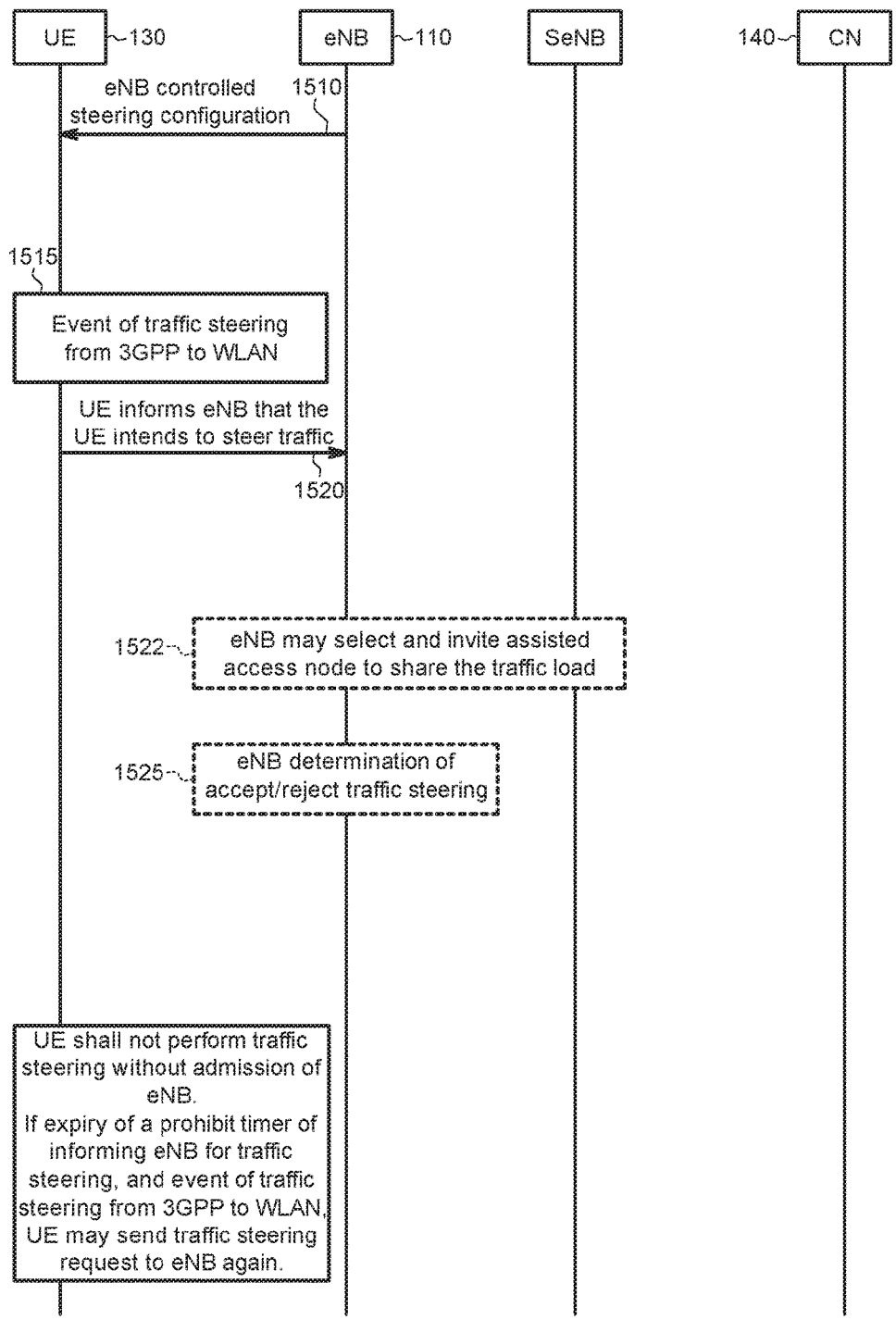

Embodiment A-2.1-d: From 3GPP to WLAN, No eNB/WLAN Node Interface, UE Initiated but No Response from eNB FIG. 15 shows a traffic steering method according to the embodiment A-2.1-d of the application. In the embodiment A-2.1-d, the UE 130 initiates a traffic steering request, but the eNB 110 does not respond.

In step 1510, the eNB 110 sends an "eNB controlled steering configuration" message to one or more UEs 130 in the coverage of the eNB 110. If the UE 130 determines that the event of traffic steering between the 3GPP access network and the WLAN access network occurs in step 1515, the UE 130 sends a "traffic steering request" to inform the eNB 110 that the UE 130 intends to steer traffic to obtain the admission for traffic steering in step 1520.

Further, the UE 130 may start a waiting timer for the window of expecting to receive a response message from the eNB 110 after the UE 130 sends the traffic steering request.

In step 1522, the eNB 110 may select and invite other candidate assist node to share load (e.g., based on WLAN reports or UE measurement reports).

In step 1525, the eNB 110 determines whether to accept or reject the traffic steering request. After the eNB 110 determines to reject the traffic steering request from the UE 130, the eNB 110 may perform no action to the traffic steering request or the eNB 110 may decide not to respond to the traffic steering request. If so, no response would be sent to the requesting UE 130 from the eNB 110.

Without admission of the eNB 110, the UE 130 does not perform traffic steering. The UE 130 may start a prohibit timer of informing eNB for traffic steering. If the prohibit timer of informing eNB for traffic steering is expired, and event of traffic steering from 3GPP to WLAN occurs, the UE 130 may send the traffic steering request to the eNB 110 again.

Embodiment A-2.2-a: From 3GPP to WLAN, No eNB/WLAN Node Interface, CN Initiated

Figure 16:
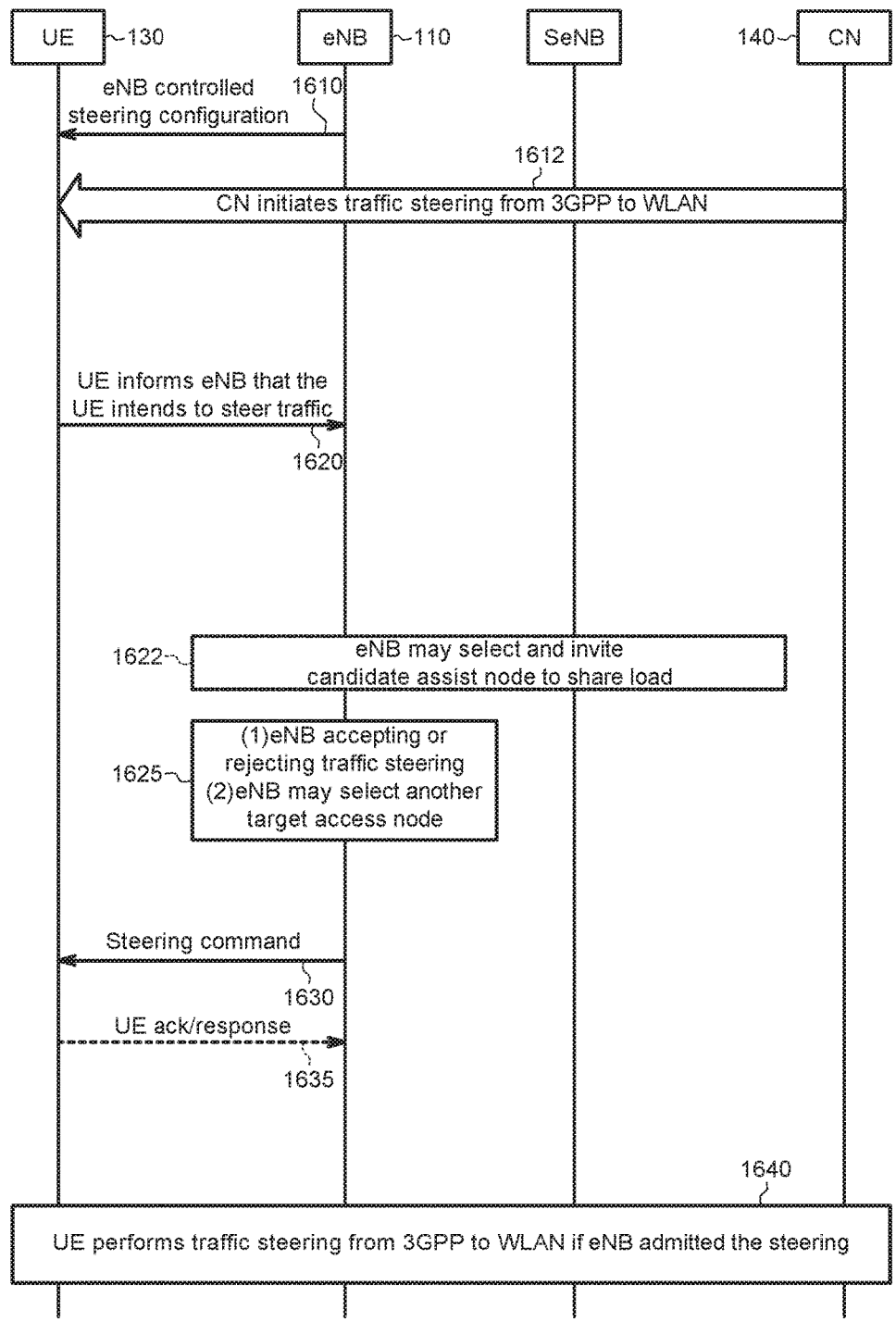

FIG. 16 shows a traffic steering method according to the embodiment A-2.2-a of the application. In the embodiment A-2.2-a, the CN 140 initiates a traffic steering request.

In step 1610, the eNB 110 sends an "eNB controlled steering configuration" message to one or more UEs 130 in the coverage of the eNB 110.

In step 1612, the UE 130 receives an indication from the core network 140 that the core network 140 initiates traffic steering from 3GPP to WLAN for the UE 130. The UE 130 sends a "traffic steering request" to the eNB 110 to inform the eNB 110 that the UE 130 intends to steer traffic to obtain the admission for traffic steering in step 1620.

In step 1622, the eNB 110 may select and invite at least one candidate assist node to share load.

In step 1625, the eNB 110 determines whether to accept or reject the traffic steering request. Further, if the eNB 110 accepts the traffic steering request, the eNB may select another target access node for the UE 130 (e.g., based on the load of the target access node reported by UEs, or by WLAN(s) or by the estimation of the eNB 110) in step 1625.

In step 1630, the eNB 110 sends a "traffic steering command" to inform the UE 130 if the eNB 110 accepts the traffic steering request. In step 1635, the UE 130 may send a "UE ack" or a "UE response" message to the eNB 110 to acknowledge the traffic steering command sent by the eNB 110.

In step 1640, the UE 130 performs traffic steering if the eNB 110 admitted the traffic steering.

Figure 17:
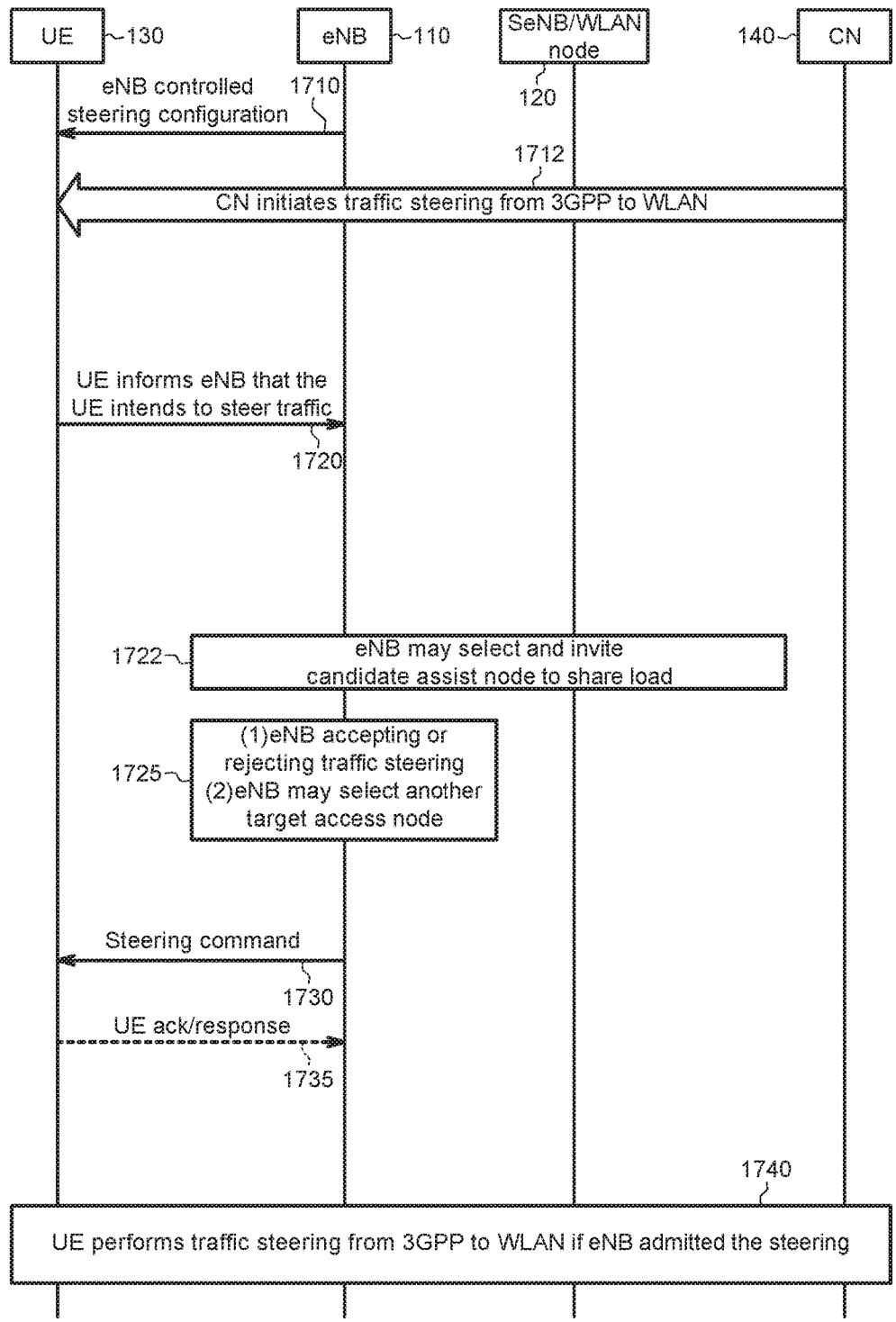

Embodiment A-2.2-b: From 3GPP to WLAN, No eNB/WLAN Node Interface, CN Initiated with DC FIG. 17 shows a traffic steering method according to the embodiment A-2.2-b of the application. In the embodiment A-2.2-b, the CN 140 initiates a traffic steering request and the UE supports DC.

In step 1710, the eNB 110 sends an "eNB controlled steering configuration" message to one or more UEs 130 in the coverage of the eNB 110.

In step 1712, the UE 130 receives an indication from the core network 140 that the core network 140 initiates traffic steering from 3GPP to WLAN for the UE 130.

The UE 130 sends a "traffic steering request" to the eNB 110 to inform the eNB 110 that the UE 130 intends to steer traffic to obtain the admission for traffic steering in step 1720.

In step 1722, the eNB 110 may select and invite at least one candidate assist node to share load.

In step 1725, the eNB 110 determines whether to accept or reject the traffic steering request. Further, the eNB may select another target access node for the UE 130 in step 1725.

In step 1730, the eNB 110 sends a "traffic steering command" to inform the UE 130 if the eNB 110 accepts the traffic steering request. In step 1735, the UE 130 may send a "UE ack" or a "UE response" message to the eNB 110 to acknowledge the traffic steering command sent by the eNB 110.

In step 1740, the UE 130 performs traffic steering if the eNB 110 admitted the traffic steering.

Figure 18:
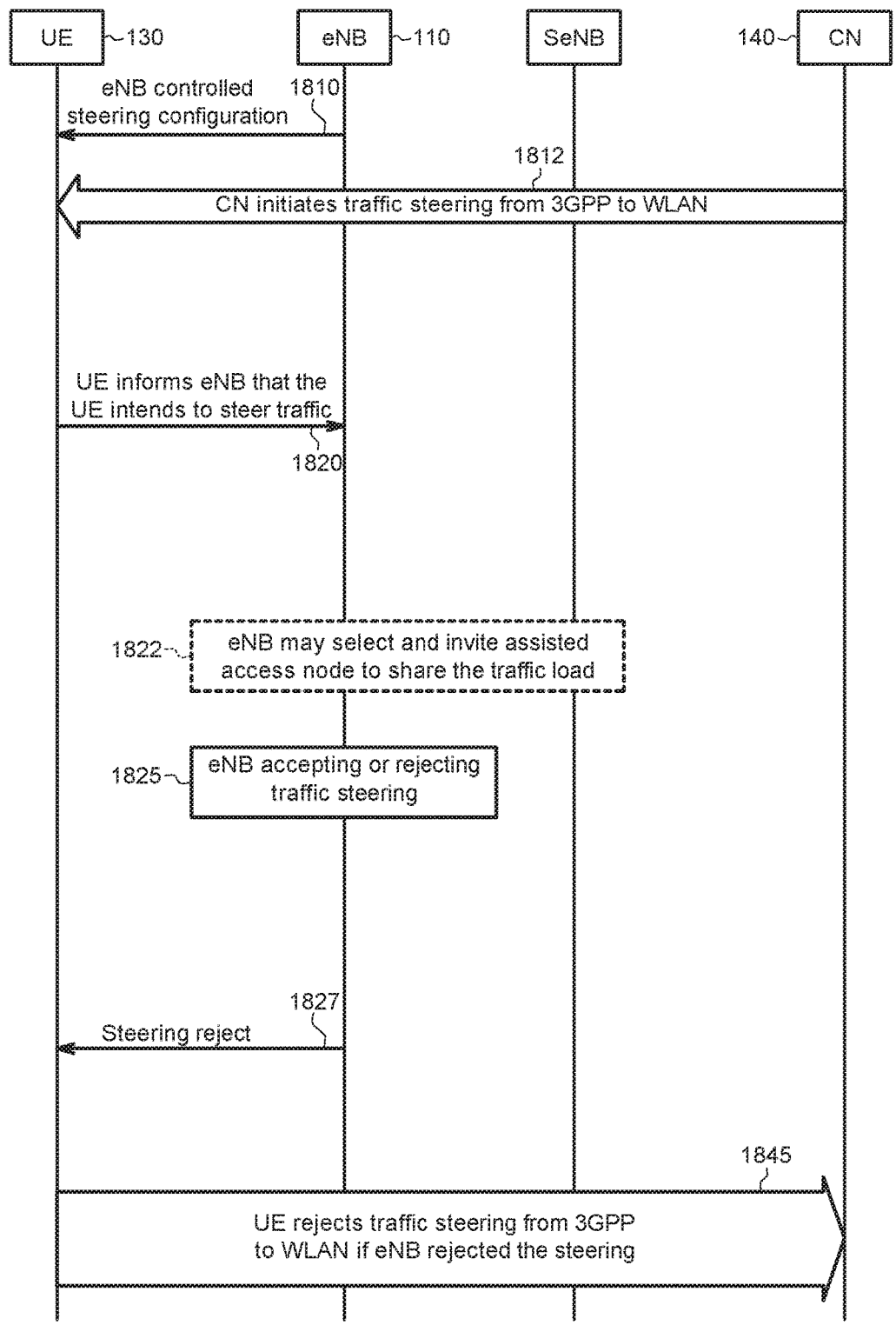

Embodiment A-2.2-c: From 3GPP to WLAN, No eNB/WLAN Node Interface, CN Initiated but eNB Rejected FIG. 18 shows a traffic steering method according to the embodiment A-2.2-c of the application. In the embodiment A-2.2-c, the CN 140 initiates a traffic steering request, but the eNB 110 rejects.

In step 1810, the eNB 110 sends an "eNB controlled steering configuration" message to one or more UEs 130 in the coverage of the eNB 110.

In step 1812, the UE 130 receives an indication from the core network 140 that the core network 140 initiates traffic steering from 3GPP to WLAN for the UE 130.

The UE 130 sends a "traffic steering request" to the eNB 110 to inform the eNB 110 that the UE 130 intends to steer traffic to obtain the admission for traffic steering in step 1820.

In step 1822, the eNB 110 may select and invite at least one candidate assist node to share load.

In step 1825, the eNB 110 determines whether to accept or reject the traffic steering request. If the eNB 110 decides to reject the traffic steering intention of the requesting UE 130, the eNB 110 sends a "steering reject" message to the requesting UE 130 in step 1827.

Upon receiving the steering reject message from the eNB 110, the UE 130 rejects traffic steering from 3GPP to WLAN requested by the CN 140 in step 1845 if the eNB 110 rejected the steering.

Figure 19:
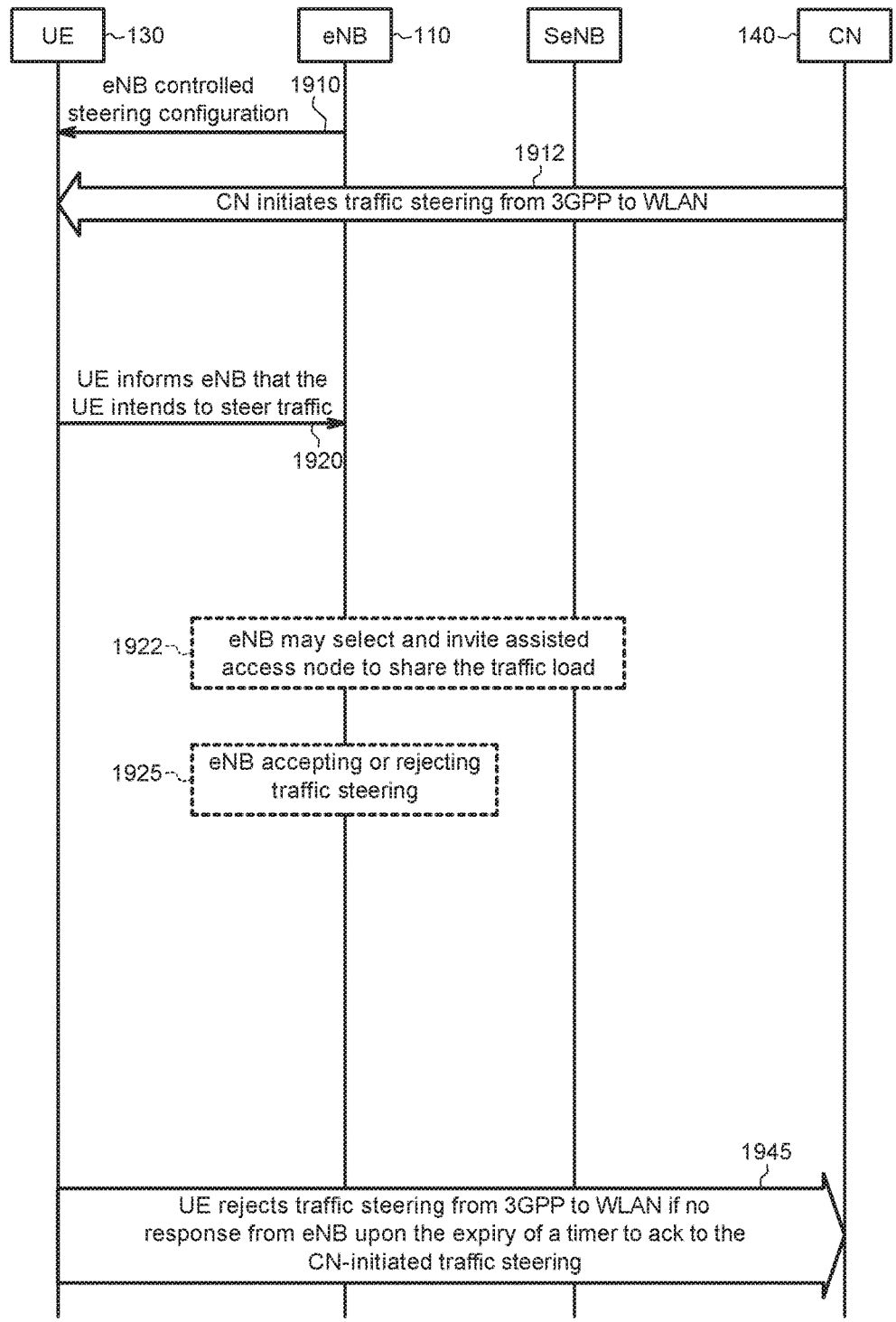

Embodiment A-2.2-d: From 3GPP to WLAN, No eNB/WLAN Node Interface, CN Initiated but No Response from eNB FIG. 19 shows a traffic steering method according to the embodiment A-2.2-d of the application. In the embodiment A-2.2-d, the CN 140 initiates a traffic steering request, but the eNB 110 does not respond.

In step 1910, the eNB 110 sends an "eNB controlled steering configuration" message to one or more UEs 130 in the coverage of the eNB 110.

In step 1912, the UE 130 receives an indication from the core network 140 that the core network 140 initiates traffic steering from 3GPP to WLAN for the UE 130.

The UE 130 sends a "traffic steering request" to the eNB 110 to inform the eNB 110 that the UE 130 intends to steer traffic to obtain the admission for traffic steering in step 1920.

In step 1922, the eNB 110 may select and invite at least one candidate assist node to share load.

In step 1925, the eNB 110 determines whether to accept or reject the traffic steering request. After the eNB 110 determines to reject the traffic steering request from the UE 130, the eNB 110 may perform no action to the traffic steering request or the eNB 110 may decide not to respond to the traffic steering request. If so, no response would be sent to the requesting UE 130 from the eNB 110.

The UE does not perform traffic steering without admission of eNB. Upon expiry of the waiting timer for the time window of expecting to receive a response message from the eNB 110, in step 1945, the UE 130 rejects traffic steering from 3GPP to WLAN requested by the CN 140 if the UE 130 does not receive a response from the eNB 110. The rejection from UE to the core network may include the cause which presents that the eNB rejects the traffic steering (e.g., cause=eNB-controlled) from 3GPP to WLAN.

Figure 20:
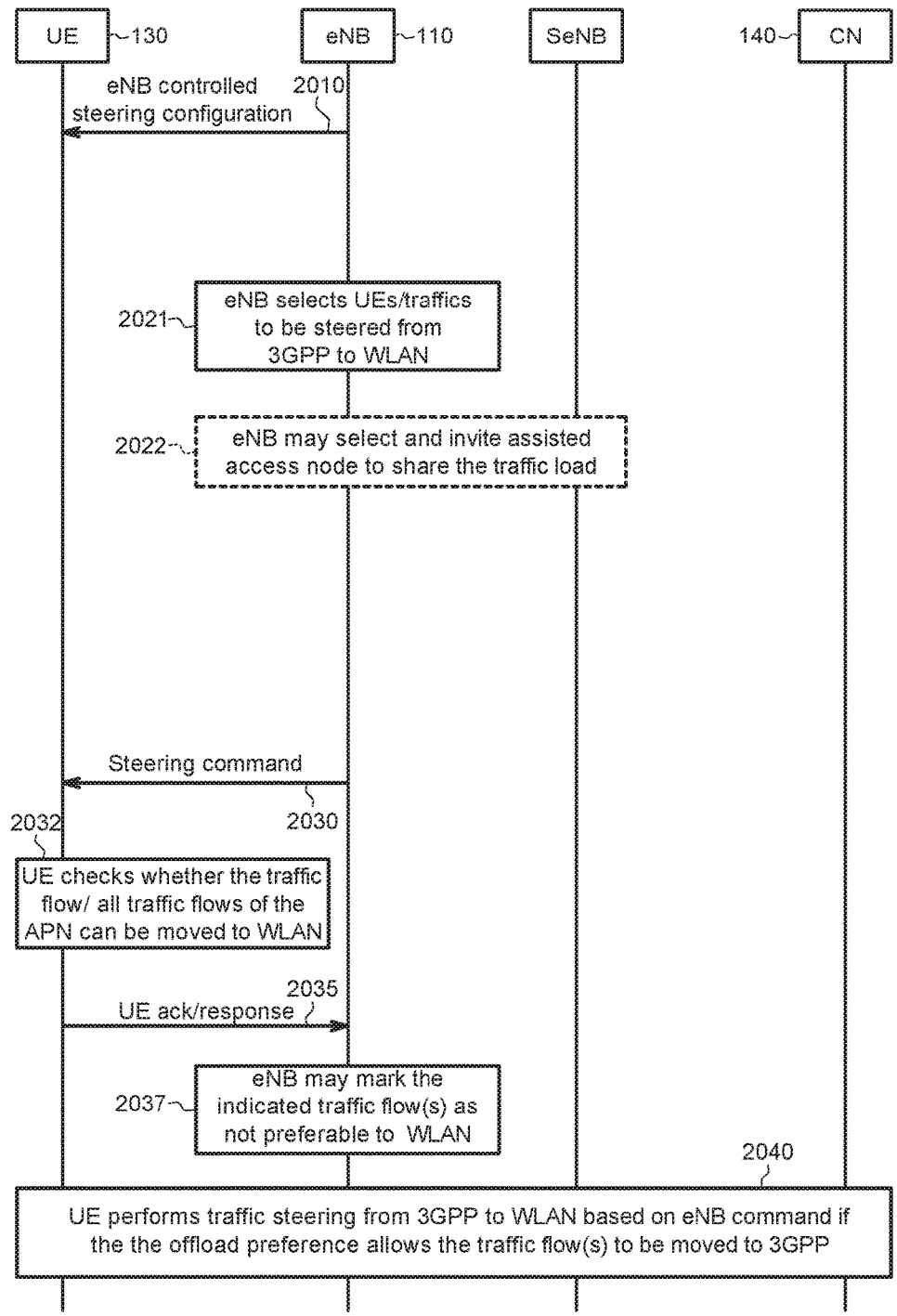

Embodiment A-2.3-a: From 3GPP to WLAN, No eNB/WLAN Node Interface, eNB Initiated FIG. 20 shows a traffic steering method according to the embodiment A-2.3-a of the application. In the embodiment A-2.3-a, the eNB 110 initiates a traffic steering request.

In step 2010, the eNB 110 sends an "eNB controlled steering configuration message" to one or more UEs 130 in the coverage of the eNB 110.

When the eNB 110 selects UEs and/or traffic flow(s) to be steered from 3GPP to WLAN (e.g., based on the measurement reports from UEs, or load of target access node reported by UEs or by WLAN(s), or by the estimation of the network element of 3GPP access network) in step 2021, the eNB 110 may select and invite at least one candidate assist node to share load in step 2022.

In step 2030, the eNB 110 sends a "traffic steering command" to inform the UE 130 if the eNB 110 initiates the traffic steering.

Upon receiving the steering command message from the eNB 110, the UE 130 checks whether the one or more traffic flow(s) indicated in the steering command message are allowed (e.g., complying with the policy rules maintained in the UE for offload preference) to be moved to WLAN in step 2032.

In step 2035, the UE 130 may send a "UE ack" or a "UE response" message to the eNB 110 to acknowledge the steering command message sent by the eNB 110.

The UE ack or UE response message may include an indication (e.g., no release traffic flow(s) indication) to indicate that the traffic flow(s) of the specific APN should not be released according to the policy rules maintained in the UE 130. In step 2037, if the eNB 110 receives from the UE the UE ack or UE response message includes the indication (e.g., no release traffic flow(s) indication) to indicate that the one or more traffic flow(s) of the specific APN should not be released, the eNB 110 should not release the specific traffic flow(s); and the eNB 110 may mark the indicated traffic flow(s) as not allowed to be steered to WLAN in step 2037.

In step 2040, the UE performs traffic steering from 3GPP to WLAN based on the steering command if the offload preference allows the bearer(s) to be moved to WLAN.

Embodiment B describes traffic steering from WLAN to 3GPP. In the embodiment B, there are two embodiments B-1 and B-2. In the Embodiment B-1, the eNB 110 and the WLAN node 120 has an interface to share the information of UEs 130 and radio conditions by directly exchanging messages with each other. In the Embodiment B-2, there is no interface between the eNB 110 and the WLAN node 120, and thus the eNB 110 and the WLAN node 120 do not exchange messages directly with each other but share information via other devices (for example, via the UE 130).

In the embodiment B-1, the UE 130 has ongoing PDN connection(s) over WLAN (e.g., WLAN1) and the UE 130 has active 3GPP connection(s). The eNB 110 which serves the UE 130 configures the UE 130 for measurement control, and the UE 130 performs measurement report(s) based on the measurement control from the eNB 110. The UE 130 may send the UE ID used in the selected WLAN to the eNB 110. The UE ID used in WLAN could be e.g., the IP address of the UE 130 used in the WLAN, or the MAC address of the UE 130 used in the WLAN. If the WLAN node 120 has an interface with the eNB 110, the WLAN node 120 may send reports to the eNB 110 periodically or by event-triggered.

In the embodiment B-1, there are at least four embodiments, i.e. the embodiment B-1.1 (in which the traffic steering is initiated by the UE 130), the embodiment B-1.2 (in which the traffic steering is initiated by the CN 140), the embodiment B-1.3 (in which the traffic steering is initiated by the WLAN node 120), and the embodiment B-1.4 (in which the traffic steering is initiated by the eNB 110).

Figure 21:
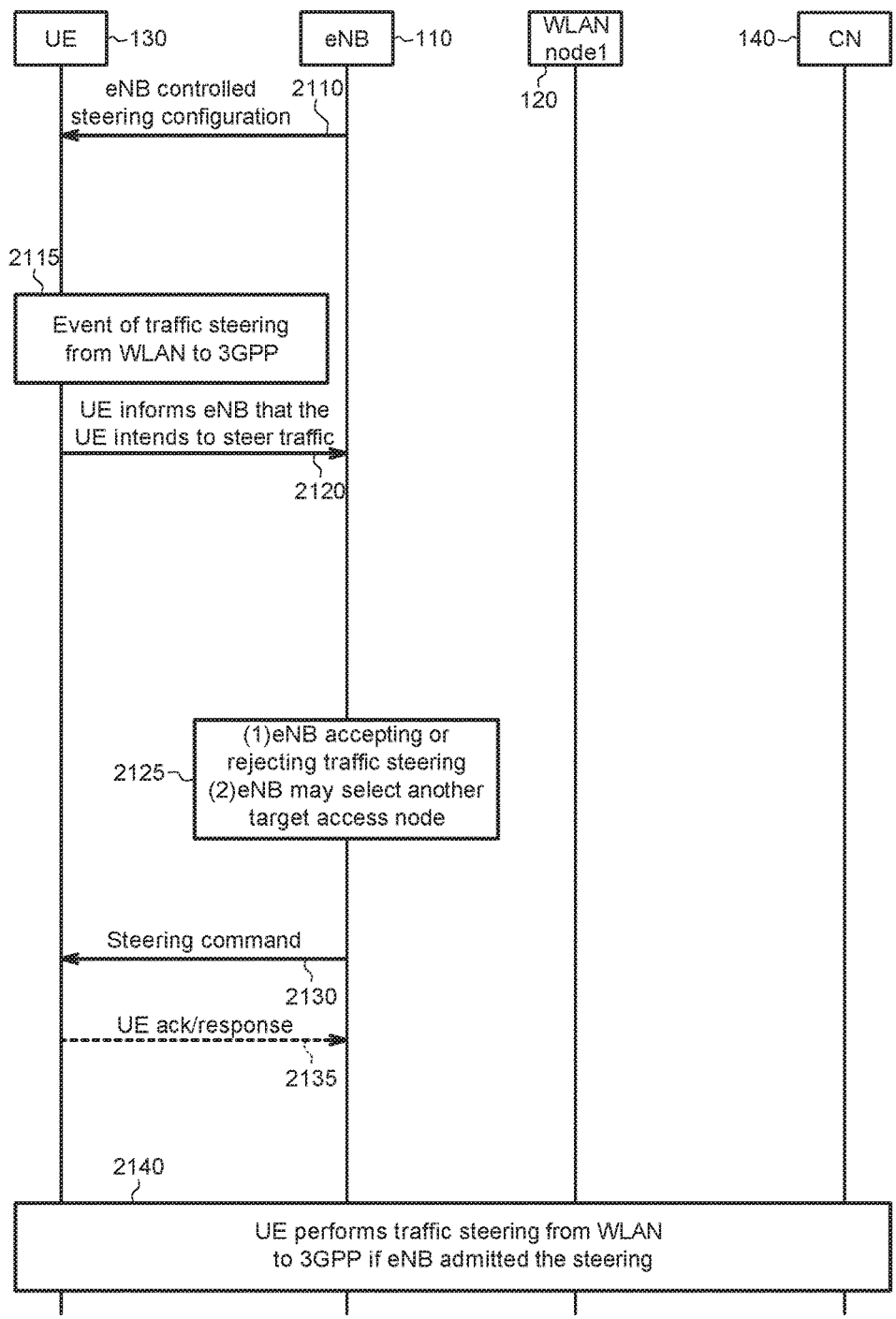
FIGS. 21-52 show respective traffic steering methods for steering from WLAN access network to 3GPP access network according to embodiments of the application.

Embodiment B-1.1-a: From WLAN to 3GPP, with eNB/WLAN Node Interface, UE Initiated FIG. 21 shows a traffic steering method according to the embodiment B-1.1-a of the application. In the embodiment B-1.1-a, the traffic steering is initiated by the UE 130.

In step 2110, the eNB 110 sends an "eNB controlled steering configuration" message to one or more UEs 130 in the coverage of the eNB 110. If the UE 130 determines that the event of traffic steering from the WLAN access network to the 3GPP access network occurs in step 2115, the UE 130 sends a "traffic steering request" to inform the eNB 110 that the UE 130 intends to steer traffic to obtain the admission for traffic steering in step 2120.

Further, the UE 130 may start a waiting timer for the window of expecting to receive a response message from the eNB 110 after the UE 130 sends the traffic steering request.

In step 2125, the eNB 110 determines whether to accept or reject the traffic steering request. Further, the eNB may select another target access node for the UE 130 (e.g., based on the load of the target access node reported by the UE 130, or by the WLAN node 120 or by the estimation of the eNB 110). The eNB 110 avoids selecting the source access node given in the notification from the UE 130.

In step 2130, the eNB 110 sends a "traffic steering command" to inform the UE 130 if the eNB 110 accepts the traffic steering request. If the eNB 110 rejects the traffic steering request, then the eNB 110 does not respond to the traffic steering request.

In step 2135, the UE 130 may send a "UE ack" or a "UE response" message to the eNB 110 to acknowledge the traffic steering command sent by the eNB 110, and in step 2140, the UE 130 performs traffic steering if the eNB 110 admitted the traffic steering.

Embodiment B-1.1-b: From WLAN to 3GPP, with eNB/WLAN Node Interface, UE Initiated with Dual Connectivity (DC)

Figure 22:
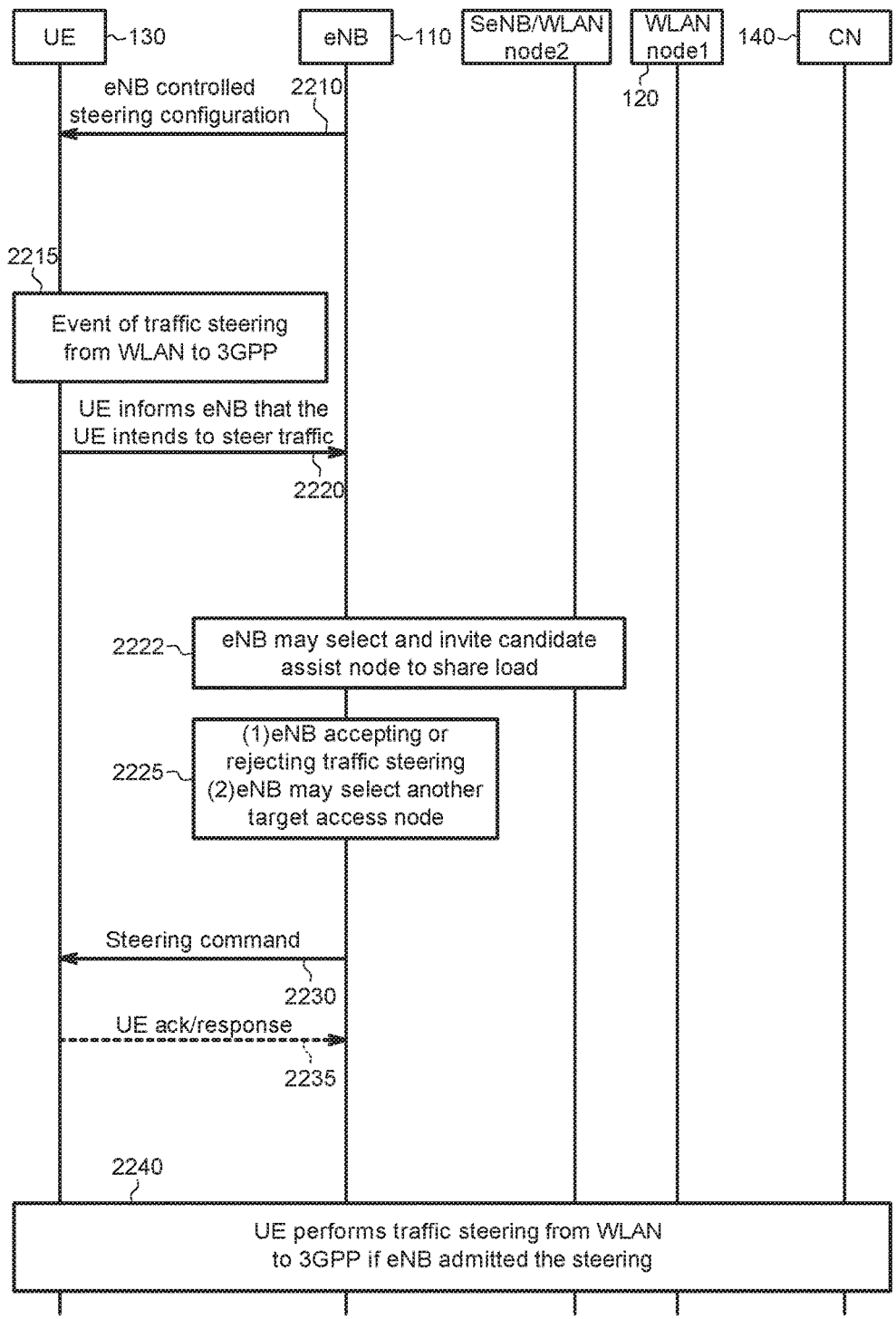

FIG. 22 shows a traffic steering method according to the embodiment B-1.1-b of the application. In the embodiment B-1.1-b, the traffic steering is initiated by the UE 130.

In step 2210, the eNB 110 sends an "eNB controlled steering configuration" message to one or more UEs 130 in the coverage of the eNB 110. If the UE 130 determines that the event of traffic steering from the WLAN access network to the 3GPP access network occurs in step 2215, the UE 130 sends a "traffic steering request" to inform the eNB 110 that the UE 130 intends to steer traffic to obtain the admission for traffic steering in step 2220.

Further, in FIG. 22, the UE 130 may start a waiting timer for the window of expecting to receive a response message from the eNB 110 after the UE 130 sends the traffic steering request.

In step 2222, the eNB 110 may select and invite other candidate assist node to share load.

In step 2225, the eNB 110 determines whether to accept or reject the traffic steering request.

In step 2230, the eNB 110 sends a "traffic steering command" to inform the UE 130 if the eNB 110 accepts the traffic steering request. If the eNB 110 rejects the traffic steering request, then the eNB 110 does not respond to the traffic steering request.

In step 2235, the UE 130 may send a "UE ack" or a "UE response" message to the eNB 110 to acknowledge the traffic steering command sent by the eNB 110. In step 2240, the UE 130 performs traffic steering from WLAN to 3GPP if the eNB 110 admitted the traffic steering.

Figure 23:
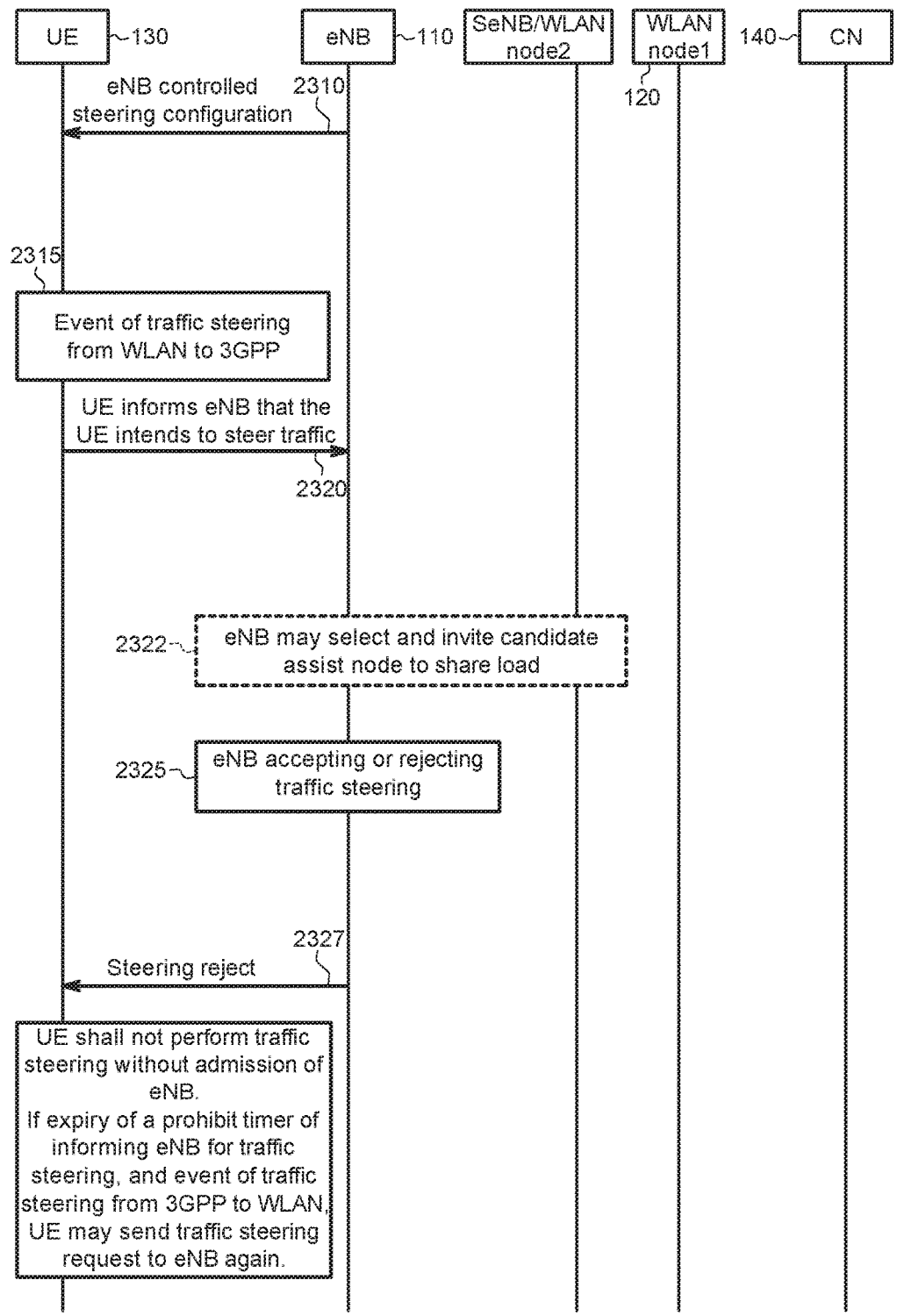

Embodiment B-1.1-c: From WLAN to 3GPP, with eNB/WLAN Node Interface, UE Initiated but eNB Rejects FIG. 23 shows a traffic steering method according to the embodiment B-1.1-c of the application. In the embodiment B-1.1-c, the UE 130 initiates a traffic steering request, but the eNB 110 rejects.

In step 2310, the eNB 110 sends an "eNB controlled steering configuration" message to one or more UEs 130 in the coverage of the eNB 110. If the UE 130 determines that the event of traffic steering from the WLAN access network to the 3GPP access network occurs in step 2315, the UE 130 sends a "traffic steering request" to inform the eNB 110 that the UE 130 intends to steer traffic to obtain the admission for traffic steering in step 2320.

Further, the UE 130 may start a waiting timer for the window of expecting to receive a response message from the eNB 110 after the UE 130 sends the traffic steering request.

In step 2322, the eNB 110 may select and invite other candidate assist node to share load.

In step 2325, the eNB 110 determines whether to accept or reject the traffic steering request. If the eNB 110 decides to reject the traffic steering intention of the requesting UE 130, the eNB 110 sends a "steering reject" message to the requesting UE 130 in step 2327.

Without admission of the eNB 110, the UE 130 does not perform traffic steering. The UE 130 may start a prohibit timer of informing eNB for traffic steering (e.g., timer_2). If the prohibit timer of informing eNB for traffic steering (e.g., timer_2) is expired, and event of traffic steering from WLAN to 3GPP occurs, the UE 130 may send the traffic steering request to the eNB 110 again.

Figure 24:
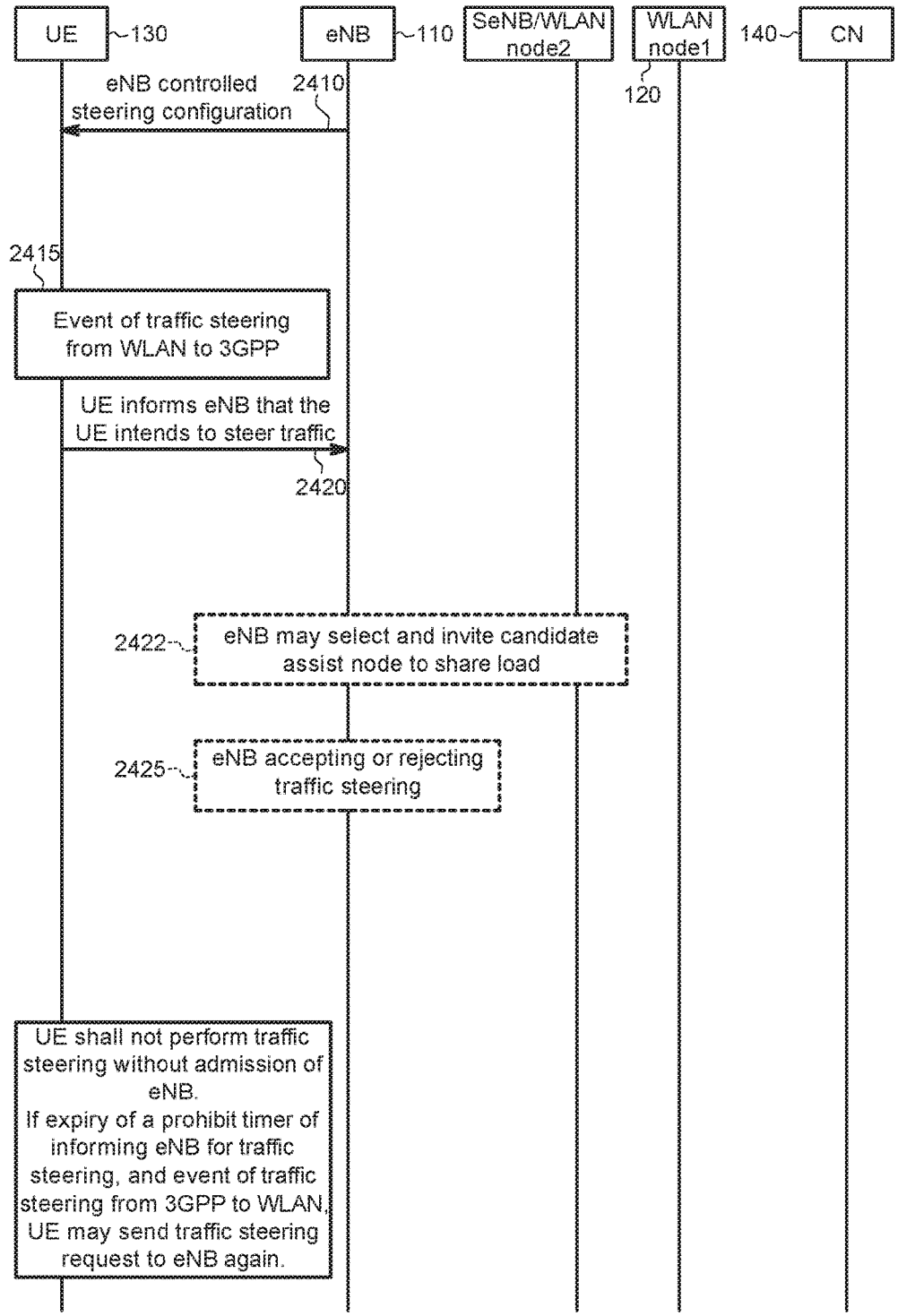

Embodiment B-1.1-d: From WLAN to 3GPP, with eNB/WLAN Node Interface, UE Initiated but No Response from eNB FIG. 24 shows a traffic steering method according to the embodiment B-1.1-d of the application. In the embodiment B-1.1-d, the UE 130 initiates a traffic steering request, but the eNB 110 does not respond.

In step 2410, the eNB 110 sends an "eNB controlled steering configuration" message to one or more UEs 130 in the coverage of the eNB 110. If the UE 130 determines that the event of traffic steering from the WLAN access network to the 3GPP access network occurs in step 2415, the UE 130 sends a "traffic steering request" to inform the eNB 110 that the UE 130 intends to steer traffic to obtain the admission for traffic steering in step 2420.

Further, the UE 130 may start a waiting timer for the window of expecting to receive a response message from the eNB 110 after the UE 130 sends the traffic steering request.

In step 2422, the eNB 110 may select and invite other candidate assist node to share load.

In step 2425, the eNB 110 determines whether to accept or reject the traffic steering request. After the eNB 110 determines to reject the traffic steering request from the UE 130, the eNB 110 may perform no action to the traffic steering request or the eNB 110 may decide not to respond to the traffic steering request. If so, no response would be sent to the requesting UE 130 from the eNB 110.

Without admission of the eNB 110, the UE 130 does not perform traffic steering. The UE 130 may start a prohibit timer of informing eNB for traffic steering. If the prohibit timer of informing eNB for traffic steering is expired, and event of traffic steering from WLAN to 3GPP occurs, the UE 130 may send the traffic steering request to the eNB 110 again.

Figure 25:
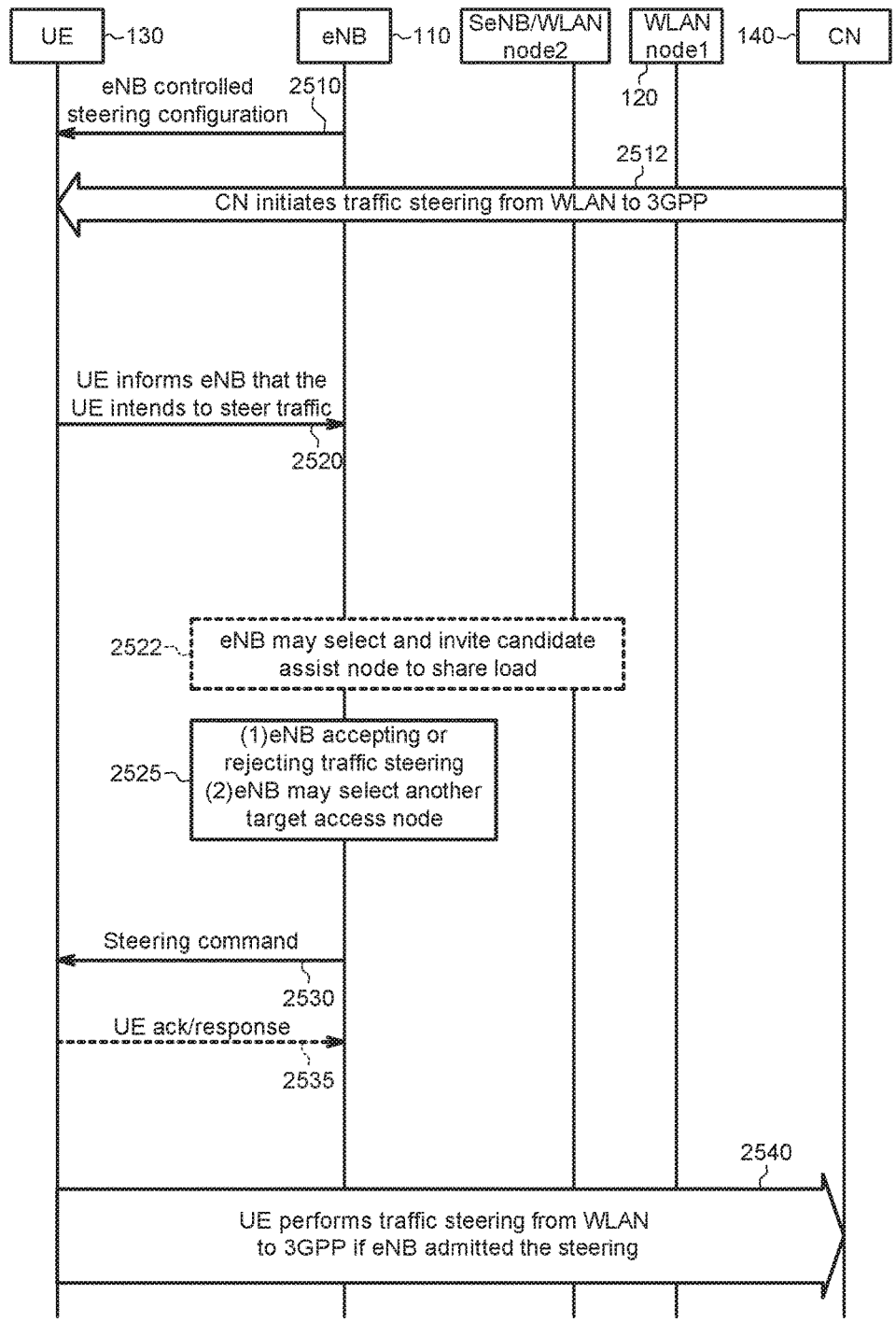

Embodiment B-1.2-a: From WLAN to 3GPP, with eNB/WLAN Node Interface, CN Initiated FIG. 25 shows a traffic steering method according to the embodiment B-1.2-a of the application. In the embodiment B-1.2-a, the CN 140 initiates a traffic steering request.

In step 2510, the eNB 110 sends an eNB controlled steering configuration message to one or more UEs 130 in the coverage of the eNB 110.

In step 2512, the UE 130 receives an indication from the core network 140 that the core network 140 initiates traffic steering from WLAN to 3GPP for the UE 130.

The UE 130 sends a "traffic steering request" to the eNB 110 to inform the eNB 110 that the UE 130 intends to steer traffic to obtain the admission for traffic steering in step 2520.

In step 2522, the eNB 110 may select and invite at least one candidate assist node to share load.

In step 2525, the eNB 110 determines whether to accept or reject the traffic steering request. Further, the eNB may select another target access node for the UE 130 (e.g., based on the load of the target access node reported by UEs, or by WLAN(s) or by the estimation of the eNB 110) in step 2525.

In step 2530, the eNB 110 sends a "traffic steering command" to inform the UE 130 if the eNB 110 accepts the traffic steering request. In step 2535, the UE 130 may send a "UE ack" or a "UE response" message to the eNB 110 to acknowledge the traffic steering command sent by the eNB 110.

In step 2540, the UE 130 performs traffic steering if the eNB 110 admitted the traffic steering.

The embodiment in which the CN 140 initiates traffic steering from WLAN to 3GPP, with eNB/WLAN node Interface and UE supporting DC is similar to the above embodiments and thus, the details are omitted here.

Figure 26:
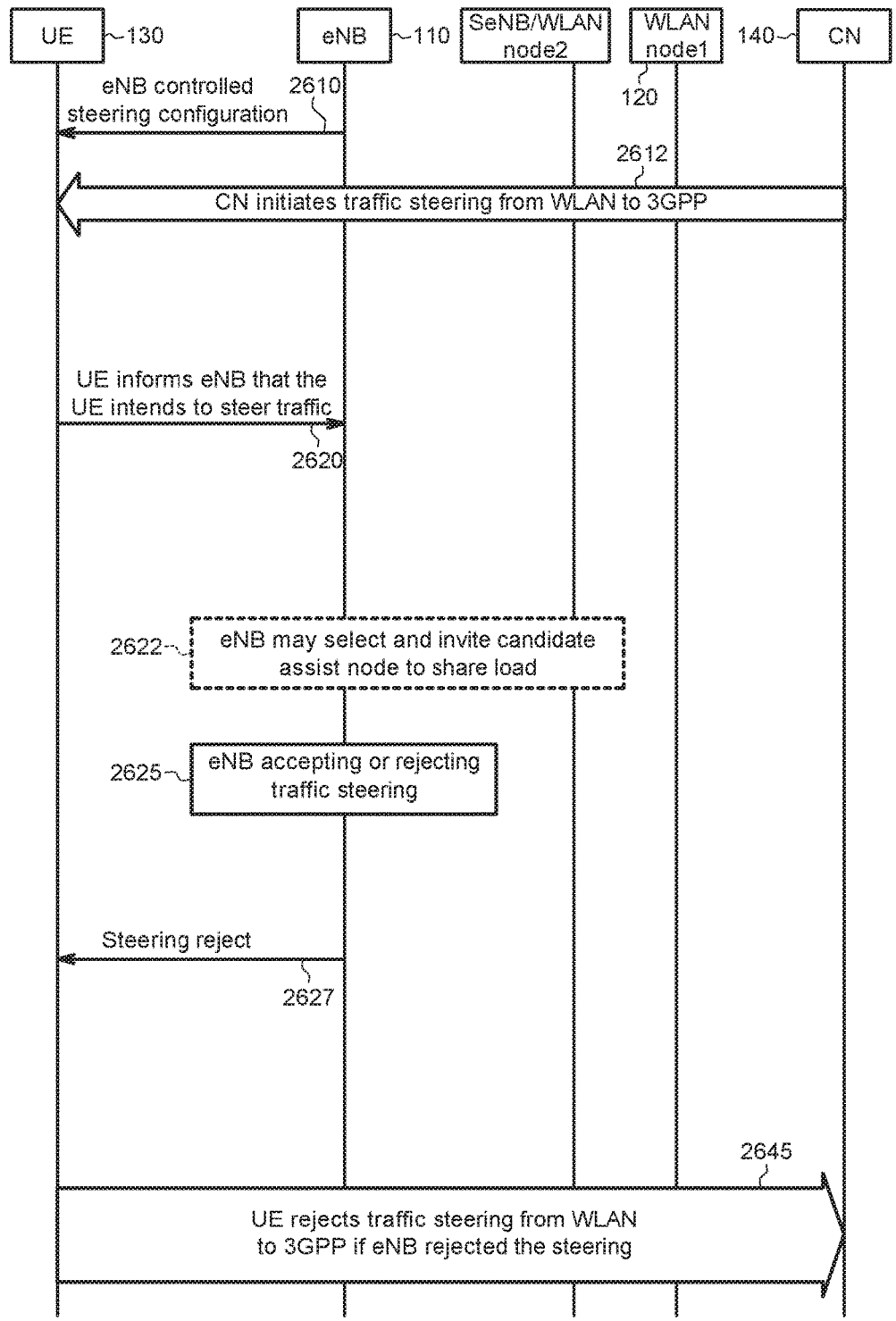

Embodiment B-1.2-b: From WLAN to 3GPP, with eNB/WLAN Node Interface, CN Initiated but eNB Rejected FIG. 26 shows a traffic steering method according to the embodiment B-1.2-b of the application. In the embodiment B-1.2-b, the CN 140 initiates a traffic steering request, but the eNB 110 rejects.

In step 2610, the eNB 110 sends an "eNB controlled steering configuration" message to one or more UEs 130 in the coverage of the eNB 110.

In step 2612, the UE 130 receives an indication from the core network 140 that the core network 140 initiates traffic steering from WLAN to 3GPP for the UE 130.

The UE 130 sends a "traffic steering request" to the eNB 110 to inform the eNB 110 that the UE 130 intends to steer traffic to obtain the admission for traffic steering in step 2620.

In step 2622, the eNB 110 may select and invite at least one candidate assist node to share load.

In step 2625, the eNB 110 determines whether to accept or reject the traffic steering request. If the eNB 110 decides to reject the traffic steering intention of the requesting UE 130, the eNB 110 sends a "steering reject" message to the requesting UE 130 in step 2627.

Upon receiving the steering reject message from the eNB 110, the UE 130 rejects traffic steering from WLAN to 3GPP requested by the CN 140 in step 2645. The rejection message from the UE 130 to the CN 140 may include the cause presenting that the eNB 110 rejects the traffic steering (e.g., cause=eNB-controlled) from WLAN to 3GPP.

Figure 27:
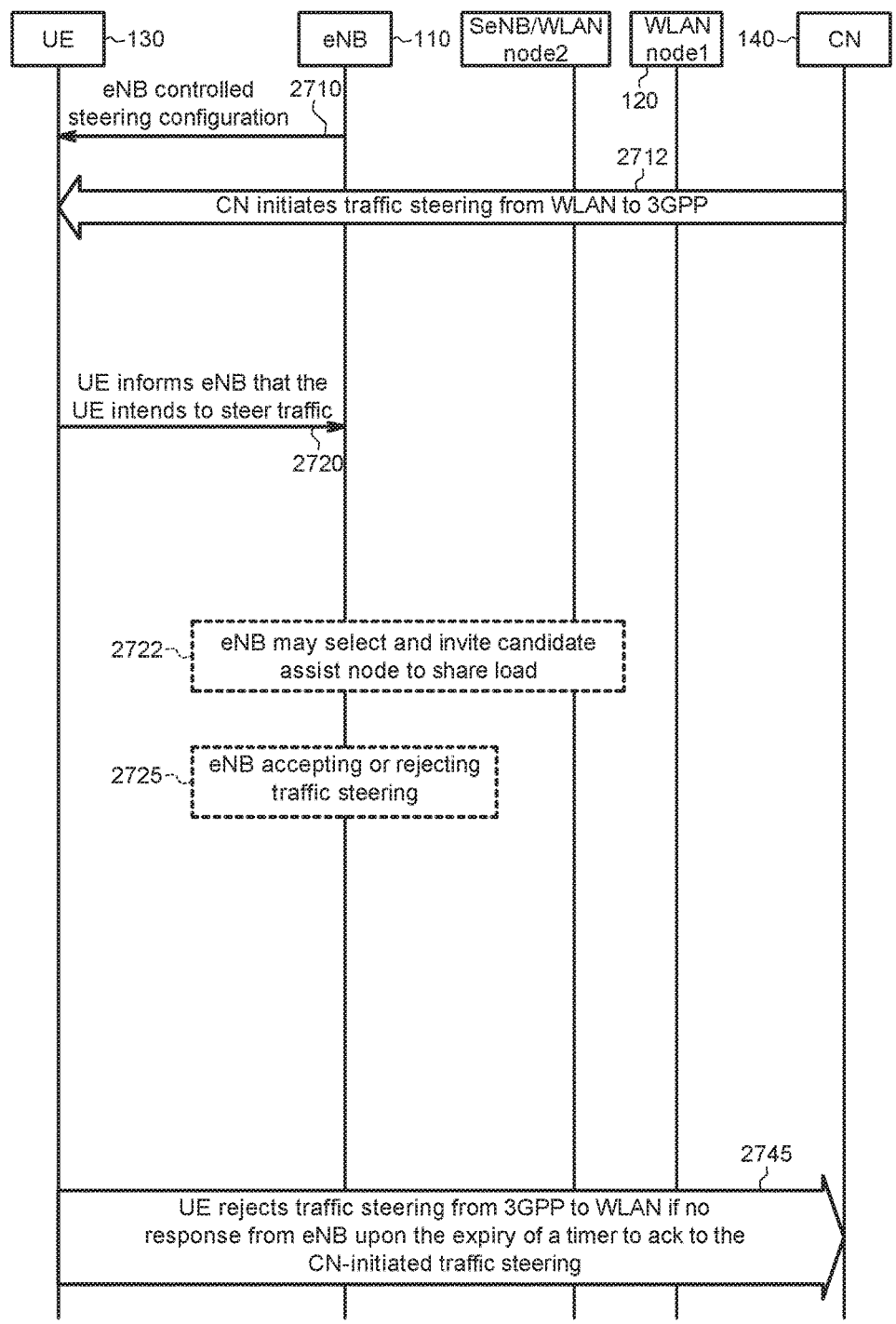

Embodiment B-1.2-c: From WLAN to 3GPP, with eNB/WLAN Node Interface, CN Initiated but No Response from eNB FIG. 27 shows a traffic steering method according to the embodiment B-1.2-c of the application. In the embodiment B-1.2-c, the CN 140 initiates a traffic steering request, but the eNB 110 does not respond.

In step 2710, the eNB 110 sends an "eNB controlled steering configuration" message to one or more UEs 130 in the coverage of the eNB 110.

In step 2712, the UE 130 receives an indication from the core network 140 that the core network 140 initiates traffic steering from WLAN to 3GPP for the UE 130.

The UE 130 sends a "traffic steering request" to the eNB 110 to inform the eNB 110 that the UE 130 intends to steer traffic to obtain the admission for traffic steering in step 2720.

In step 2722, the eNB 110 may select and invite at least one candidate assist node to share load.

In step 2725, the eNB 110 determines whether to accept or reject the traffic steering request. After the eNB 110 determines to reject the traffic steering request from the UE 130, the eNB 110 may perform no action to the traffic steering request or the eNB 110 may decide not to respond to the traffic steering request. If so, no response would be sent to the requesting UE 130 from the eNB 110.

The UE does not perform traffic steering without admission of eNB. Upon expiry of the waiting timer for the time window of expecting to receive a response message from the eNB 110, in step 2745, the UE 130 rejects traffic steering from WLAN to 3GPP requested by the CN 140 if the UE 130 does not receive a response from the eNB 110.

Embodiment B-1.3-a: From WLAN to 3GPP, with eNB/WLAN Node Interface, WLAN Node Initiated (Per UE Traffic Steering)

Figure 28:
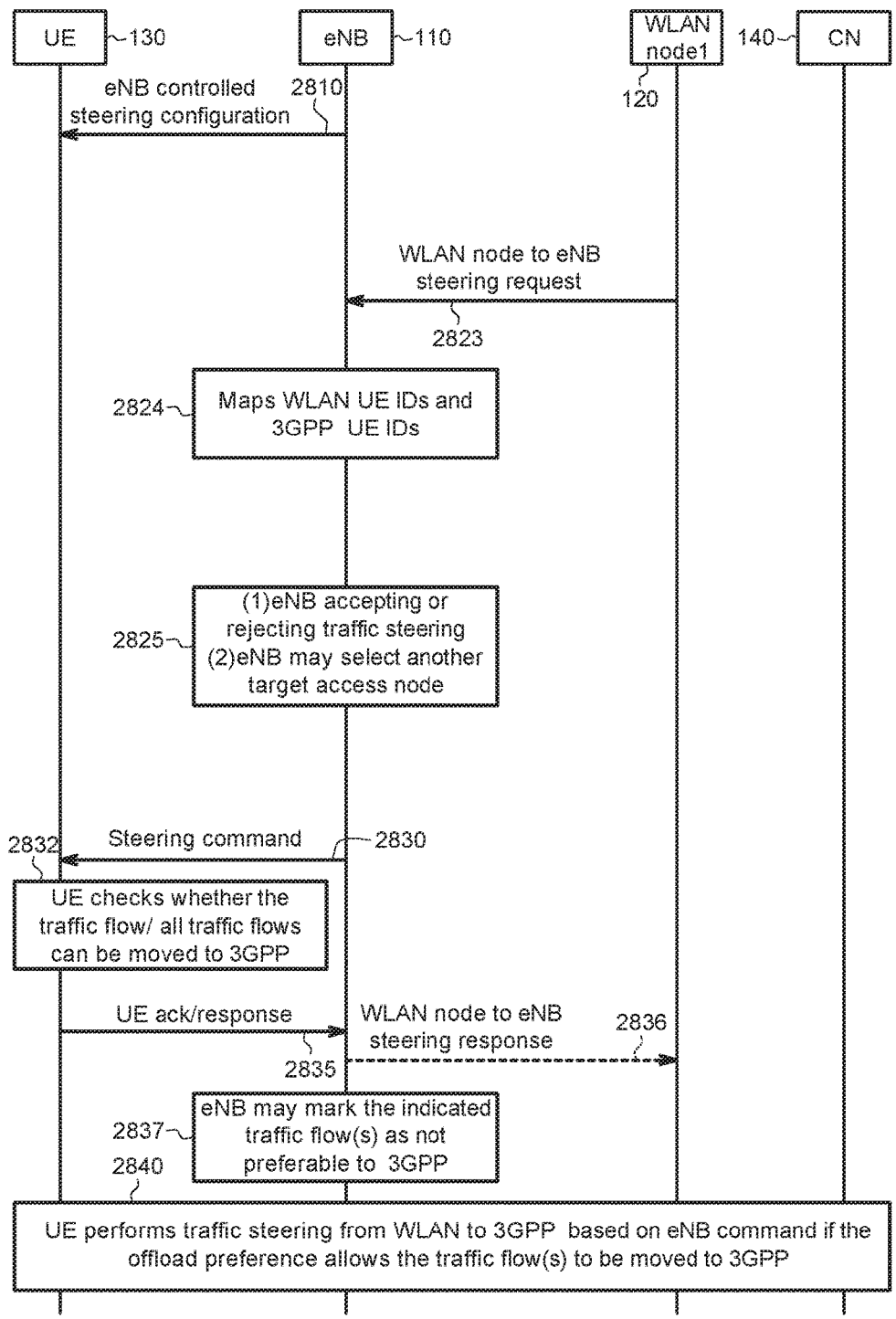

FIG. 28 shows a traffic steering method according to the embodiment B-1.3-a of the application. In the embodiment B-1.3-a, the WLAN node 120 initiates a traffic steering request.

In step 2810, the eNB 110 sends an "eNB controlled steering configuration" message to one or more UEs 130 in the coverage of the eNB 110.

The WLAN node 120 which has an interface with the eNB 110 may send a "WLAN to eNB steering request" message to the eNB 110 in step 2823. The WLAN to eNB steering request message may include the information of (1) UE ID: the identifier that the UE used in a WLAN for WLAN access, e.g., the MAC address of the UE or the IP address given by the WLAN; (2) QoS information; and/or (3) list of {APN, traffic flow IDs}. "APN" identifies the APN that the one or more traffic flow(s) be transmitted through and "traffic flow ID(s)" identifies the one or more traffic flow(s) corresponded to the specific APN.

When the eNB 110 receives the WLAN to eNB steering request message from the WLAN node 120, the eNB 110 maps the WLAN UE ID with the 3GPP UE ID in step 2824. If the 3GPP UE ID is not found (that is, the match is failed), the eNB 110 rejects the WLAN to eNB steering request by sending a WLAN to eNB steering response message to the requesting WLAN node 120 with parameters indicating rejecting of the traffic steering from WLAN to 3GPP.

If the 3GPP UE ID is found by the eNB 110 (i.e. the match is successful), the eNB 110 determines whether to accept or reject the traffic to be steered from WLAN to 3GPP in step 2825. If the eNB 110 accepts, the eNB 110 may select another target access node, and the eNB 110 sends a "steering command" message to the UE 130 in step 2830.

Upon receiving the steering command message from the eNB 110, the UE 130 checks whether the one or more bearer(s) indicated in the steering command message are allowed to be moved to from WLAN to 3GPP in step 2832.

In step 2835, the UE 130 may send a "UE ack" or a "UE response" message to the eNB 110 to acknowledge the steering command message sent by the eNB 110. The UE ack or UE response message may include an indication (e.g., no release traffic flow(s) indication) to indicate that the traffic flow(s) of the specific APN should not be released according to the policy rules maintained in the UE 130.

In step 2836, the eNB 110 may send a WLAN to eNB steering response message to the requesting WLAN node 120. The WLAN to eNB steering response message may include the following information: acceptation or rejection; and/or cause.

In step 2837, if the eNB 110 receives from the UE the UE ack or UE response message which including the indication (e.g., no release traffic flow(s) indication) to indicate that the one or more traffic flow(s) of the specific APN should not be released, the eNB 110 should not release the specific traffic flow(s); and the eNB 110 may mark the indicated traffic flow(s) as not allowed to be steered WLAN in step 2837.

In step 2840, the UE performs traffic steering from WLAN to 3GPP based on the steering command if the offload preference allows the traffic flow(s) to be moved to 3GPP.

The performing of the traffic steering message may utilize the information including: the cause of traffic steering (cause=eNB-initiated); the identifier of the target access node which was indicated by the eNB 110; the traffic flow ID(s) to identify one or more traffic flow(s) that will be steered; and/or the APN.

Embodiment B-1.3-b: From WLAN to 3GPP, with eNB/WLAN Node Interface, WLAN Node Initiated (Per UE Traffic Steering)

Figure 29:
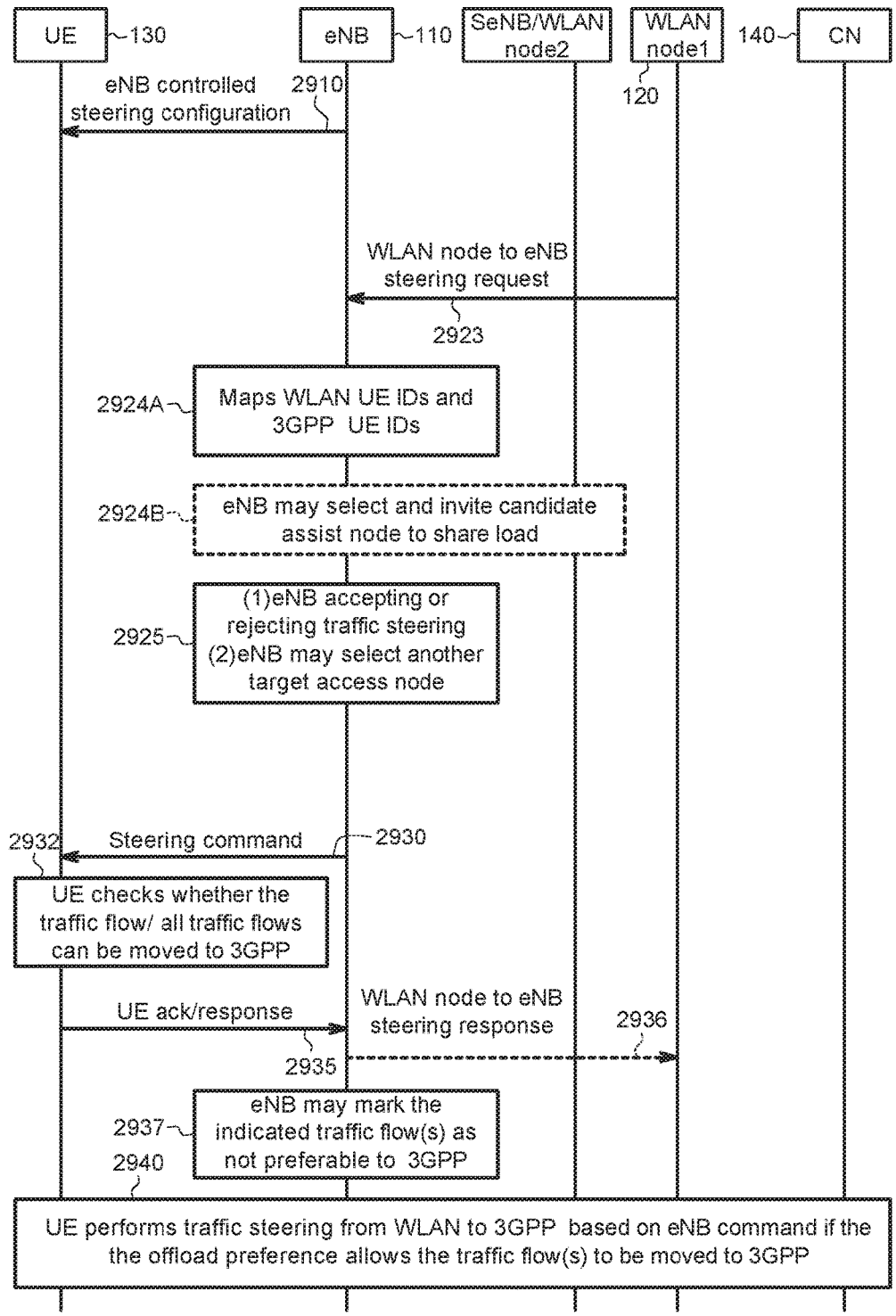

FIG. 29 shows a traffic steering method according to the embodiment B-1.3-b of the application. In the embodiment B-1.3-b, the WLAN node 120 initiates a traffic steering request.

In step 2910, the eNB 110 sends an "eNB controlled steering configuration" message to one or more UEs 130 in the coverage of the eNB 110.

The WLAN node 120 which has an interface with the eNB 110 may send a "WLAN to eNB steering request" message to the eNB 110 in step 2923.

When the eNB 110 receives the WLAN to eNB steering request message from the WLAN node 120, the eNB 110 maps the WLAN UE ID with the 3GPP UE ID in step 2924A. If the 3GPP UE ID is not found, the eNB 110 rejects the WLAN to eNB steering request by sending a WLAN to eNB steering response message to the requesting WLAN node 120 with parameters indicating rejecting of the traffic steering from WLAN to 3GPP.

If the 3GPP UE ID is found by the eNB 110, the eNB may select and invite at least one candidate assist node, for example but not limited by, another eNB (SeNB) or another WLAN node (WLAN node 2), to share load in step 2924B.

The eNB 110 determines whether to accept or reject the traffic to be steered from WLAN to 3GPP in step 2925. If the eNB 110 accepts, the eNB 110 may select another target access node, and the eNB 110 sends a "steering command" message to the requesting UE 130 in step 2930.

Upon receiving the steering command message from the eNB 110, the UE 130 checks whether the one or more traffic flow(s) indicated in the steering command message are allowed to be moved to from WLAN to 3GPP in step 2932.

In step 2935, the UE 130 may send a "UE ack" or a "UE response" message to the eNB 110 to acknowledge the steering command message sent by the eNB 110. The UE ack or UE response message may include an indication (e.g., no release traffic flow(s) indication) to indicate that the traffic flow(s) of the specific APN should not be released according to the policy rules maintained in the UE 130.

In step 2936, the eNB 110 may send a "WLAN to eNB steering response" message to the requesting WLAN node 120. The WLAN to eNB steering response message may include the following information: acceptation or rejection; and/or cause.

In step 2937, if the eNB 110 receives from the UE the UE ack or UE response message which including the indication (e.g., no release traffic flow(s) indication) to indicate that the one or more traffic flow(s) of the specific APN should not be released, the eNB 110 should not release the specific traffic flow(s); and the eNB 110 may mark the indicated traffic flow(s) as not allowed to be steered WLAN in step 2937.

In step 2940, the UE performs traffic steering from WLAN to 3GPP based on the steering command if the offload preference allows the traffic flow(s) to be moved to 3GPP.

The performing of the traffic steering message may utilize the information including: the cause of traffic steering (cause=eNB-initiated); the identifier of the target access node which was indicated by the eNB 110; the traffic flow ID(s) to identify one or more traffic flow(s) that will be steered; and/or the APN.

Embodiment B-1.3-c: From WLAN to 3GPP, with eNB/WLAN Node Interface, WLAN Node Initiated (to Steer Traffic for Multiple UEs)

Figure 30:
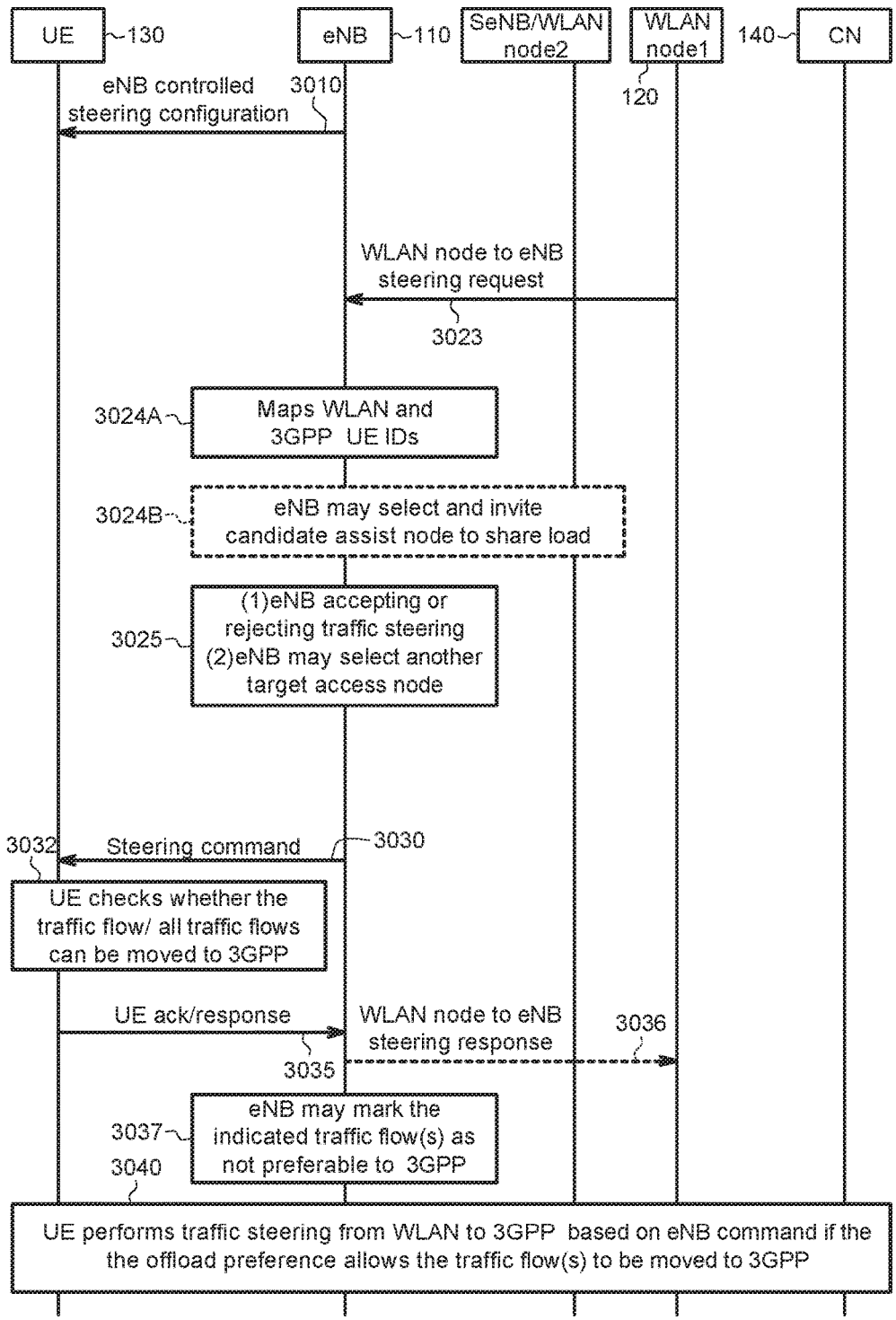

FIG. 30 shows a traffic steering method according to the embodiment B-1.3-c of the application. In the embodiment B-1.3-c, the WLAN node 120 initiates a traffic steering request to steer traffic for multiple UEs.

In step 3010, the eNB 110 sends an "eNB controlled steering configuration" message to multiple UEs 130 in the coverage of the eNB 110.

The WLAN node 120 which has an interface with the eNB 110 may send a "WLAN to eNB steering request" message to the eNB 110 in step 3023.

When the eNB 110 receives the WLAN to eNB steering request message from the WLAN node 120, the eNB 110 maps the WLAN UE ID with the 3GPP UE ID for each of the UEs in step 3024A. If the 3GPP UE ID is not found, the eNB 110 rejects the WLAN to eNB steering request by sending a WLAN to eNB steering response message to the requesting WLAN node 120 with parameters indicating rejecting of the traffic steering from WLAN to 3GPP.

If the 3GPP UE ID is found by the eNB 110, the eNB may select and invite at least one candidate assist node, for example but not limited by, another eNB (SeNB) or another WLAN node (WLAN node 2), to share load in step 3024B.

The eNB 110 determines whether to accept or reject the traffic to be steered from WLAN to 3GPP in step 3025. If the eNB 110 accepts, the eNB 110 may select another target access node in step 3025, and the eNB 110 sends a "steering command" message (traffic steering command) for each of the UEs to the UE 130 in step 3030.

Upon receiving the steering command message from the eNB 110, the UE 130 checks whether the one or more traffic flow(s) indicated in the steering command message are allowed to be moved to from WLAN to 3GPP in step 3032.

In step 3035, the UE 130 and/or other UE(s) may send a UE ack or a UE response message to the eNB 110 to acknowledge the steering command message sent by the eNB 110. The "UE ack" or "UE response" message may include an indication (e.g., no release traffic flow(s) indication) to indicate that the traffic flow(s) of the specific APN should not be released according to the policy rules maintained in the UE 130.

In step 3036, the eNB 110 may send a "WLAN to eNB steering response" message to the requesting WLAN node 120. The WLAN to eNB steering response message may include the following information: acceptation or rejection; and/or a list of {UE ID, QoS info, list* of {APN, traffic flow ID(s)}}. UE ID identifies a UE that is accepted (or rejected) to steer traffic from WLAN to 3GPP. QoS info represents the values of the one or more bearer level QoS parameter(s), APN identifies the APN that the one or more traffic flow(s) is transmitted through, and traffic flow ID(s) identifies the one or more traffic flow(s) corresponded to the specific APN.

There may be a corresponding WLAN timer for the eNB 110 to send a WLAN to eNB steering response message to the requesting WLAN node 120 before the expiry of the WLAN timer.

If the eNB 110 receives from the UE the UE ack or UE response message which including the indication (e.g., no release traffic flow(s) indication) to indicate that the one or more traffic flow(s) of the specific APN should not be released, the eNB 110 should not release the specific traffic flow(s); and the eNB 110 may mark the indicated traffic flow(s) as not allowed to be steered WLAN in step 3037.

In step 3040, the UE performs traffic steering from WLAN to 3GPP based on the steering command if the offload preference allows the traffic flow(s) to be moved to 3GPP.

Embodiment B-1.3-d: From WLAN to 3GPP, with eNB/WLAN Node Interface, WLAN Node Initiated (for Negotiate for Steering Multiple UEs)

Figure 31:
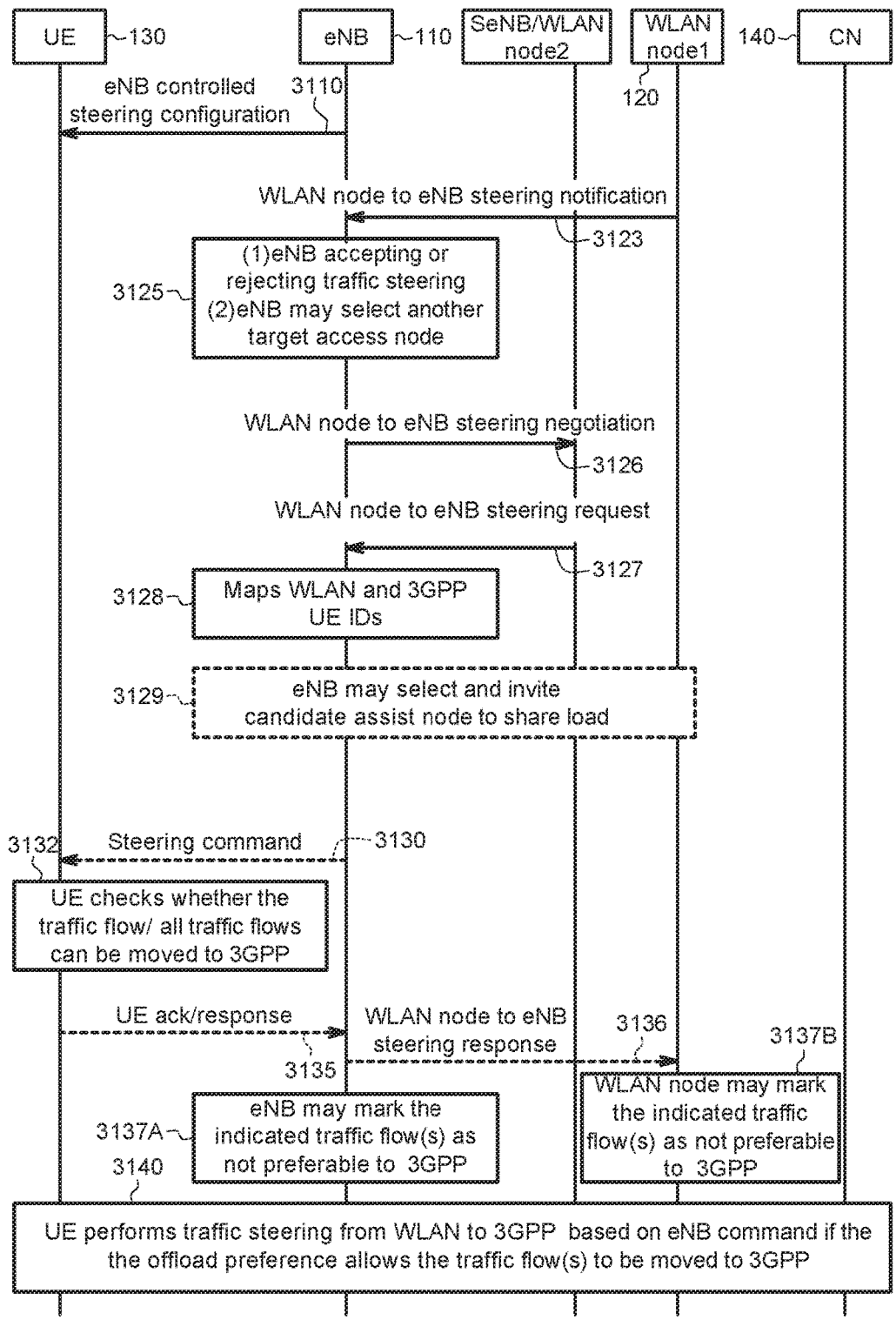

FIG. 31 shows a traffic steering method according to the embodiment B-1.3-d of the application. In the embodiment B-1.3-d, the WLAN node 120 initiates a traffic steering request to negotiate for steering multiple UEs.

In step 3110, the eNB 110 sends an "eNB controlled steering configuration" message to multiple UEs 130 in the coverage of the eNB 110.

The WLAN node 120 which has an interface with the eNB 110 may send a "WLAN to eNB steering notification" message to the eNB 110 in step 3123. The WLAN to eNB steering notification message may include the following information: a list of {GBR (Guaranteed Bit Rate)/non-GBR, AMBR (Aggregate Maximum Bit Rate) subtotal per QoS category} to indicate the QoS requirement in a per QoS category basis. The QoS category is for example but not limited by, PDB (Packet Delay Budget), QCI (QoS Class Identifier). The "GBR/non-GBR" is a parameter that indicates whether the traffic to be steered requiring the support of GBR or not. The parameter "AMBR subtotal per QoS category" refers to the subtotal of the AMBR (i.e., may be the subtotal of the AMBR of multiple UEs) in a per QoS category basis.

If the eNB 110 receives the WLAN to eNB steering notification message, the eNB 110 determines whether to accept or reject the traffic to be steered from WLAN to 3GPP in step 3125. If the eNB 110 accepts, the eNB 110 may select another target access node in step 3125.

If the eNB 110 decides to accept the traffic to be steered from WLAN to 3GPP, the eNB 110 sends a "WLAN to eNB steering negotiation" message to the requesting WLAN node 120 in step 3126. The WLAN to eNB steering negotiation message includes the following information: a list of {GBR/non-GBR, AMBR subtotal per QoS category} to indicate the QoS requirement in a per QoS category basis.

The WLAN node 120 may decide and select the UEs or traffics to be steered from WLAN to 3GPP. The WLAN node 120 may send a "WLAN to eNB steering request" message to the eNB 110 in step 3127. The WLAN to eNB steering request message may include the following information: list of {UE ID, QoS info, list of {APN, traffic flow ID(s)}}. The parameter "UE ID" represents the identities the corresponding UE used in a WLAN for WLAN access, e.g., the MAC address of the UE or the IP address of each UE given by the WLAN. The list of {APN, traffic flow ID(s)}: to identify one or more traffic flow(s) that will be steered.

When the eNB 110 receives the WLAN to eNB steering request message from the WLAN node 120, the eNB 110 maps the WLAN UE ID with the 3GPP UE ID for each of the UEs in step 3128. If the 3GPP UE ID is not found, the eNB 110 rejects the WLAN to eNB steering request by sending a WLAN to eNB steering response message to the requesting WLAN node 120 with parameters indicating rejecting of the traffic steering from WLAN to 3GPP.

If the 3GPP UE ID is found by the eNB 110, the eNB may select and invite at least one candidate assist node, for example but not limited by, another eNB (SeNB) or another WLAN node (WLAN node2), to share load in step 3129.

The eNB 110 sends a "steering command" message for each of the UEs to the requesting UE 130 in step 3130.

Upon receiving the steering command message from the eNB 110, the UE 130 and/or other UE(s) checks whether the one or more traffic flow(s) indicated in the steering command message are allowed to be moved to from WLAN to 3GPP in step 3132.

In step 3135, the UE 130 may send a "UE ack" or a "UE response" message to the eNB 110 to acknowledge the steering command message sent by the eNB 110. The UE ack or UE response message may include an indication (e.g., no release traffic flow(s) indication) to indicate that the traffic flow(s) of the specific APN should not be released according to the policy rules maintained in the UE 130.

In step 3136, the eNB 110 may send a "WLAN to eNB steering response" message to the requesting WLAN node 120. The WLAN to eNB steering response message may include the following information: acceptation or rejection; and/or a list of {UE ID, QoS info, list* of {APN, traffic flow ID(s)}}.

There may be a corresponding WLAN timer for the eNB 110 to send a WLAN to eNB steering response message to the requesting WLAN node 120 before the expiry of the WLAN timer.

If the eNB 110 receives from the UE the UE ack or UE response message which including the indication (e.g., no release traffic flow(s) indication) to indicate that the one or more traffic flow(s) of the specific APN should not be released, the eNB 110 should not release the specific traffic flow(s); and the eNB 110 may mark the indicated traffic flow(s) as not allowed to be steered to 3GPP in step 3137A.

If the WLAN node 120 receives the WLAN to eNB steering response message, the WLAN node 120 may mark the rejected traffic flow(s) as not preferable to 3GPP in step 3137B.

In step 3140, the UE performs traffic steering from WLAN to 3GPP based on the steering command if the offload preference allows the traffic flow(s) to be moved to 3GPP.

Figure 32:
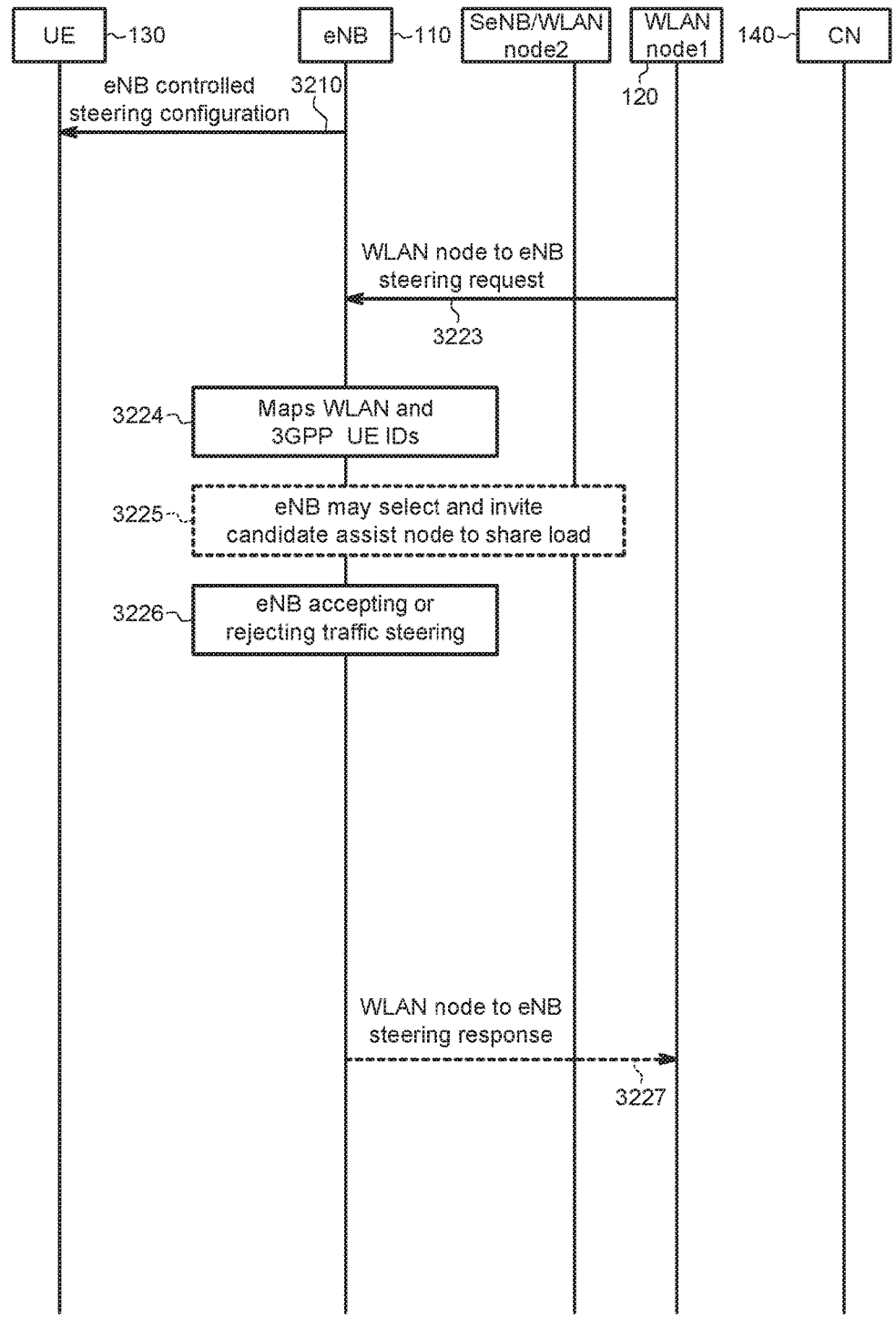

Embodiment B-1.3-e: From WLAN to 3GPP, with eNB/WLAN Node Interface, WLAN Node Initiated (to Steer Single/Multiple UEs) but eNB Rejected or No Response FIG. 32 shows a traffic steering method according to the embodiment B-1.3-e of the application. In the embodiment B-1.3-e, the WLAN node 120 initiates a traffic steering request to steer single/multiple UEs but the eNB 110 rejects or does not respond.

In step 3210, the eNB 110 sends an "eNB controlled steering configuration" message to multiple UEs 130 in the coverage of the eNB 110.

In step 3223, the WLAN node 120 may send a "WLAN to eNB steering request" message to the eNB 110. The WLAN to eNB steering request message may include the following information: list of {UE ID, QoS info, list of {APN, traffic flow ID(s)}}.

When the eNB 110 receives the WLAN to eNB steering request message from the WLAN node 120, the eNB 110 maps the WLAN UE ID with the 3GPP UE ID for each of the UEs in step 3224. If any of the 3GPP UE ID(s) is not found, the eNB 110 rejects the WLAN to eNB steering request by sending a WLAN to eNB steering response message to the requesting WLAN node 120 with parameters indicating rejecting of the traffic steering from WLAN to 3GPP. The WLAN to eNB steering response message to reject the traffic steering from WLAN to 3GPP may include the UE ID(s) that couldn't be mapped to 3GPP UE ID(s).

If the eNB 110 decides to reject the traffic steering request of the requesting WLAN node 120, the eNB 110 sends a "WLAN to eNB steering response" message to the WLAN node 120 in step 3227. The WLAN to eNB steering response message may include the following information: acceptation or rejection indication, an indication to present the rejection of traffic steering from WLAN to 3GPP; and/or cause referring to the cause for rejection.

Embodiment B-1.3-f: From WLAN to 3GPP, with eNB/WLAN Node Interface, WLAN Initiated (to Steer all Traffic of a UE to 3GPP)

Figure 33:
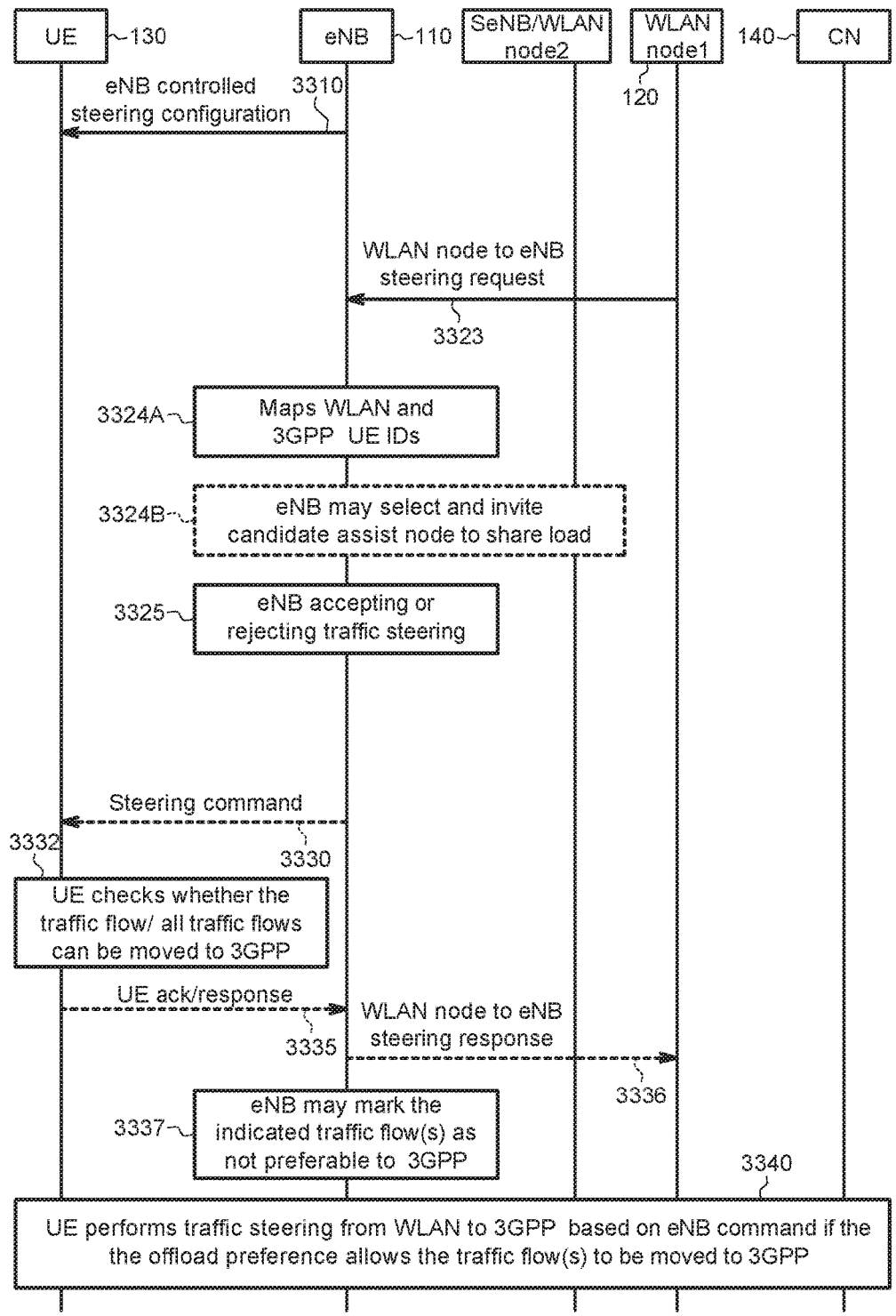

FIG. 33 shows a traffic steering method according to the embodiment B-1.3-f of the application. In the embodiment B-1.3-f, the WLAN node 120 initiates a traffic steering request to steer all traffic of a UE to 3GPP.

In step 3310, the eNB 110 sends an "eNB controlled steering configuration" message to the UE 130 in the coverage of the eNB 110.

The WLAN node 120 which has an interface with the eNB 110 may send a "WLAN to eNB steering request" message to the eNB 110 in step 3323. The WLAN to eNB steering request message includes "all traffic indication" and "a list of {UE ID, list of {APN, traffic flow ID(s), QoS info}}". The "all traffic indication" is to indicate that the request is for steering all traffic associated with the given list of {UE ID, list of {APN, traffic flow ID(s), QoS info}}.

When the eNB 110 receives the WLAN to eNB steering request message from the WLAN node 120, the eNB 110 maps the WLAN UE ID with the 3GPP UE ID in step 3324A. If the 3GPP UE ID is not found, the eNB 110 rejects the WLAN to eNB steering request by sending a WLAN to eNB steering response message to the requesting WLAN node 120 with parameters indicating rejecting of the traffic steering from WLAN to 3GPP.

If the 3GPP UE ID is found by the eNB 110, the eNB may select and invite at least one candidate assist node, for example but not limited by, another eNB (SeNB) or another WLAN node (WLAN node 2), to share load in step 3324B.

The eNB 110 determines whether to accept or reject the traffic to be steered from WLAN to 3GPP in step 3325. If the eNB 110 accepts, the eNB 110 may select another target access node. The eNB 110 sends a "steering command" message to the UE 130 in step 3330.

Upon receiving the steering command message from the eNB 110, the UE 130 checks whether the one or more bearer(s) indicated in the steering command message are allowed to be moved to from WLAN to 3GPP in step 3332.

In step 3335, the UE 130 may send a "UE ack" or a "UE response" message to the eNB 110 to acknowledge the steering command message sent by the eNB 110. The UE ack or UE response message may include an indication (e.g., no release traffic flow(s) indication) to indicate that the traffic flow(s) of the specific APN should not be released according to the policy rules maintained in the UE 130.

In step 3336, the eNB 110 may send a "WLAN to eNB steering response" message to the requesting WLAN node 120. The WLAN to eNB steering response message may include the following information: acceptation or rejection.

There may be a corresponding WLAN timer for the eNB 110 to send a WLAN to eNB steering response message to the requesting WLAN node 120 before the expiry of the WLAN timer.

If the eNB 110 receives from the UE the UE ack or UE response message which including the indication (e.g., no release bearer indication) to indicate that the one or more traffic flow(s) of the specific APN should not be released, the eNB 110 should not release the specific traffic flow(s); and the eNB 110 may mark the indicated traffic flow(s) as not allowed to be steered to 3GPP in step 3337.

In step 3340, the UE performs traffic steering from WLAN to 3GPP based on the steering command if the offload preference allows the traffic flow(s) to be moved to 3GPP.

Figure 34:
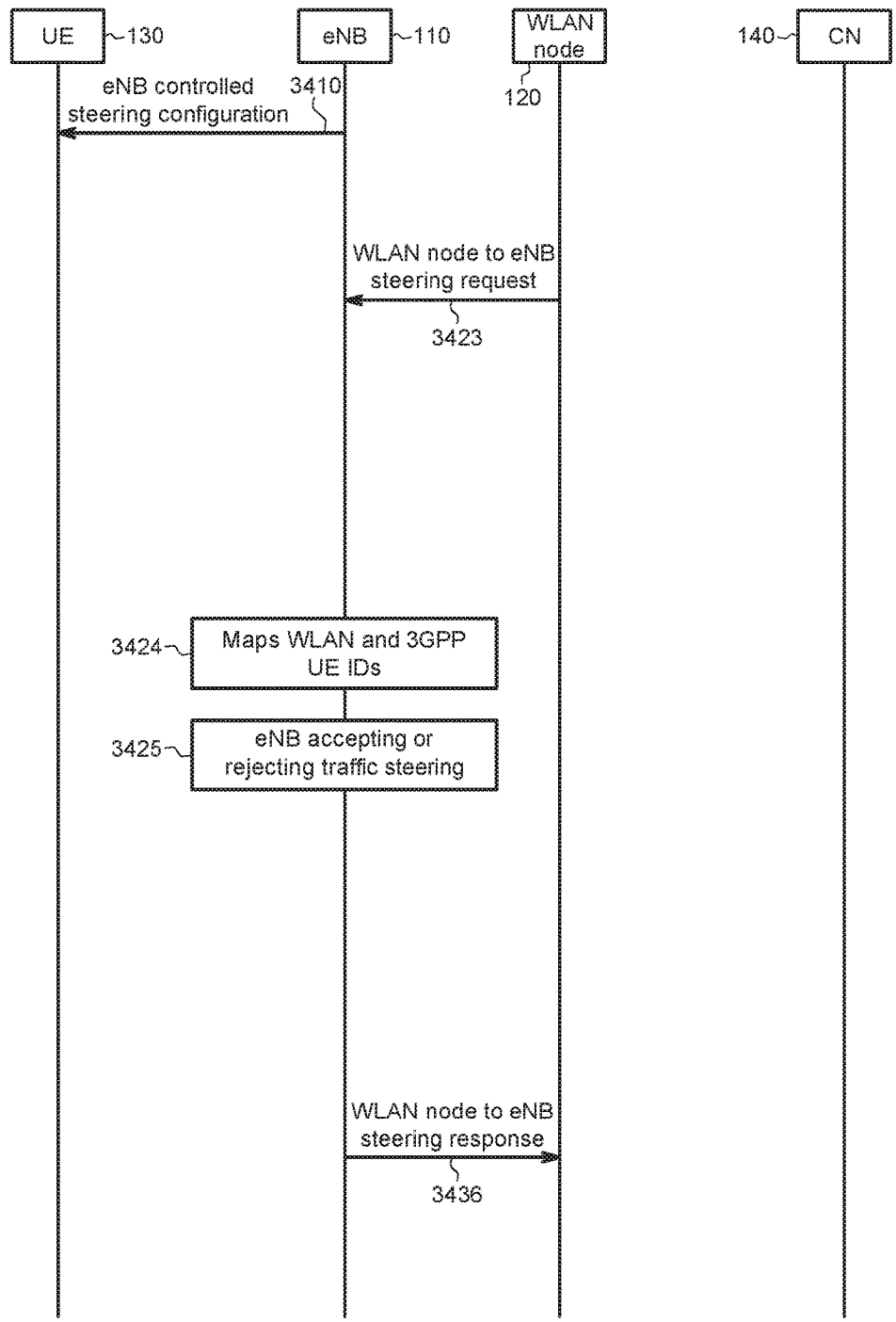

Embodiment B-1.3-g: From WLAN to 3GPP, with eNB/WLAN Node Interface, WLAN Initiated to Steer all Traffic of a UE to 3GPP but eNB Rejected FIG. 34 shows a traffic steering method according to the embodiment B-1.3-g of the application. In the embodiment B-1.3-g, the WLAN node 120 initiates a traffic steering request to steer all traffic of a UE to 3GPP, but eNB rejects.

In step 3410, the eNB 110 sends an "eNB controlled steering configuration" message to the UE 130 in the coverage of the eNB 110.

The WLAN node 120 which has an interface with the eNB 110 may send a "WLAN to eNB steering request" message to the eNB 110 in step 3423. The WLAN to eNB steering request message includes "all traffic indication" and "a list of {UE ID, list of {APN, traffic flow ID(s), QoS info}}".

When the eNB 110 receives the WLAN to eNB steering request message from the WLAN node 120, the eNB 110 maps the WLAN UE ID with the 3GPP UE ID in step 3424.

If the 3GPP UE ID is not found, the eNB 110 rejects the WLAN to eNB steering request by sending a WLAN to eNB steering response message to the requesting WLAN node 120 with parameters indicating rejecting of the traffic steering from WLAN to 3GPP.

The eNB 110 determines whether to accept or reject the traffic to be steered from WLAN to 3GPP in step 3425. If the eNB 110 rejects, the eNB 110 sends a "steering command" message (reject indication, cause) to the UE 130 in step 3436.

Figure 35:
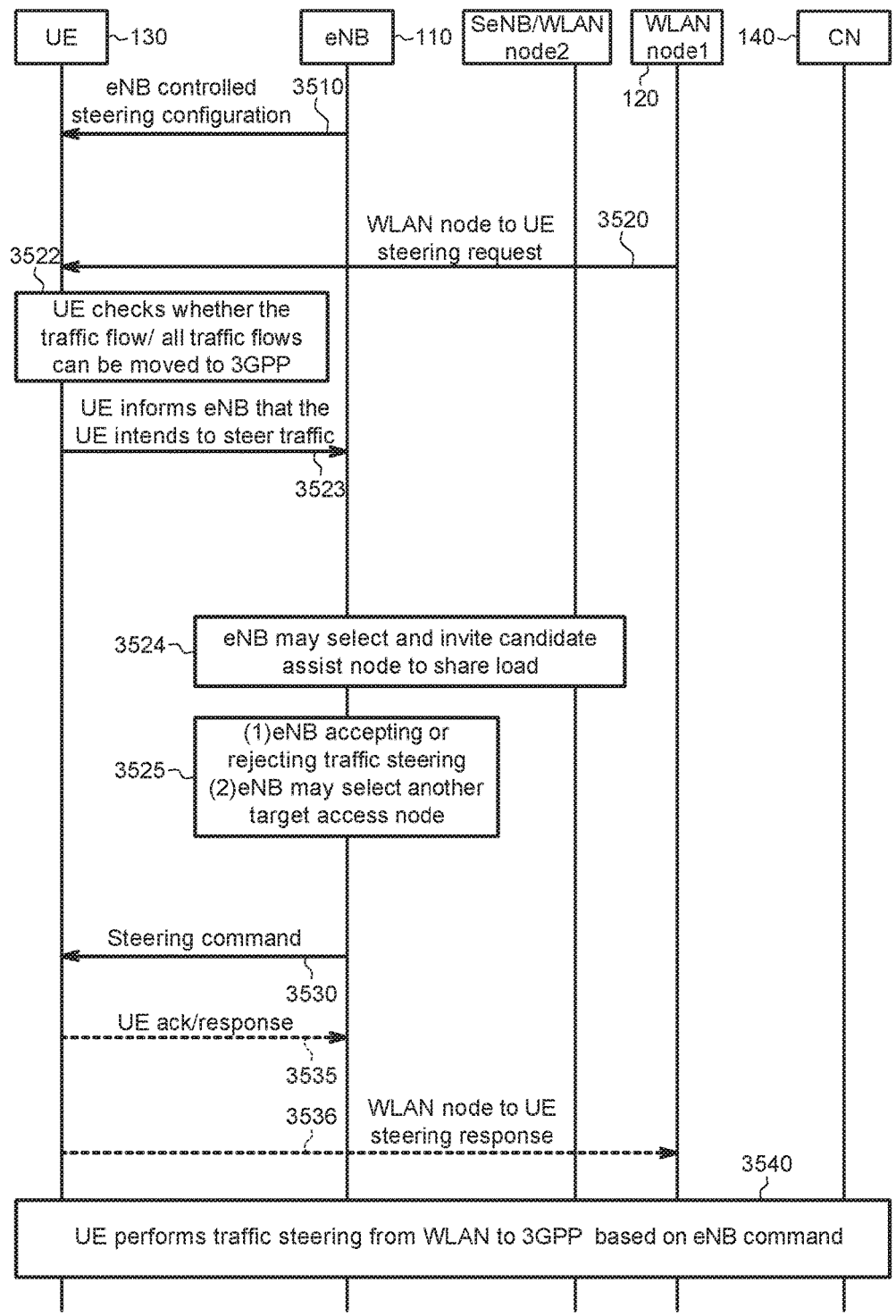

Embodiment B-1.3-h: From WLAN to 3GPP, with eNB/WLAN Node Interface, WLAN Node Initiated FIG. 35 shows a traffic steering method according to the embodiment B-1.3-h of the application. In the embodiment B-1.3-h, the WLAN node 120 initiates a traffic steering request to steer traffic for a target UE.

In step 3510, the eNB 110 sends an "eNB controlled steering configuration" message to the UE 130 in the coverage of the eNB 110.

The WLAN node 120 may send a "WLAN to UE steering request" message to the UE 130 in step 3520. In step 3520, if the WLAN node 120 selects a UE or traffic flow(s) to be steered from WLAN to 3GPP, the WLAN sends the WLAN to UE steering request message which may include the following information: a list of {APN, traffic flow ID(s)}.

Upon receiving the WLAN to UE steering request message from the WLAN node 120, the UE 130 checks whether the one or more traffic flow(s) indicated in the WLAN node to UE steering request message are allowed to be moved to from WLAN to 3GPP in step 3522.

In step 3523, the UE 130 informs the eNB 110 that the UE 130 intends to steer traffic message to the eNB 110 to obtain the admission for traffic steering. The information in step 3523 may include the information of: (1) "UE ID" identifying that the identity of a UE used in a WLAN for WLAN access, e.g., the MAC address of the UE or the IP address given by the WLAN; (2) "cause" referring the cause of traffic steering (cause=WLAN node-initiated); (3) "the direction of the intended traffic steering" (move in); (4) the identifier of an source access node; (5) QoS info; and (6) a list of {APN, traffic flow ID(s)}.

The UE 130 may start a waiting timer for the time window of expecting to receive a response message from the eNB 110 when the UE 130 informs the eNB 110 that the UE 130 intends to steer traffic.

In step 3524, the eNB 110 may select and invite at least one candidate assist node to share load.

In step 3525, the eNB 110 decides to accept or reject the traffic steering request, and the eNB 110 may select another target access node.

If the eNB 110 decides to accept the traffic steering request, the eNB 110 sends a "traffic steering command" to the UE 130 in step 3530. The eNB 110 may select one or more traffic flow ID(s) from the information of step 3523.

In step 3535, the UE 130 may send a "UE ack" or a "UE response" message to the eNB 110 to acknowledge the steering command message sent by the eNB 110.

In step 3536, the UE 130 may send a WLAN to UE steering response message to the WLAN node 120 to acknowledge the steering request sent by the WLAN node 120. If the WLAN node to UE steering response message from the UE 130 to the WLAN node 120 includes the indication (e.g., no release traffic flow(s) indication) to indicate that the one or more traffic flow(s) of the specific APN should not be steered to 3GPP, the WLAN node 120 may mark the indicated traffic flow(s) as not preferable to 3GPP.

In step 3540, the UE 130 performs traffic steering from WLAN to 3GPP if the eNB 110 admitted the steering. The performing of the traffic steering message may utilize the information including: (1) the cause of traffic steering (e.g., cause=WLAN node-initiated); (2) target access node; and/or (3) traffic flow ID and/or (4) APN.

Embodiment B-1.3-i: From WLAN to 3GPP, with eNB/WLAN Node Interface, WLAN Node Initiated (to Steer all Traffic of a UE to 3GPP)

Figure 36:
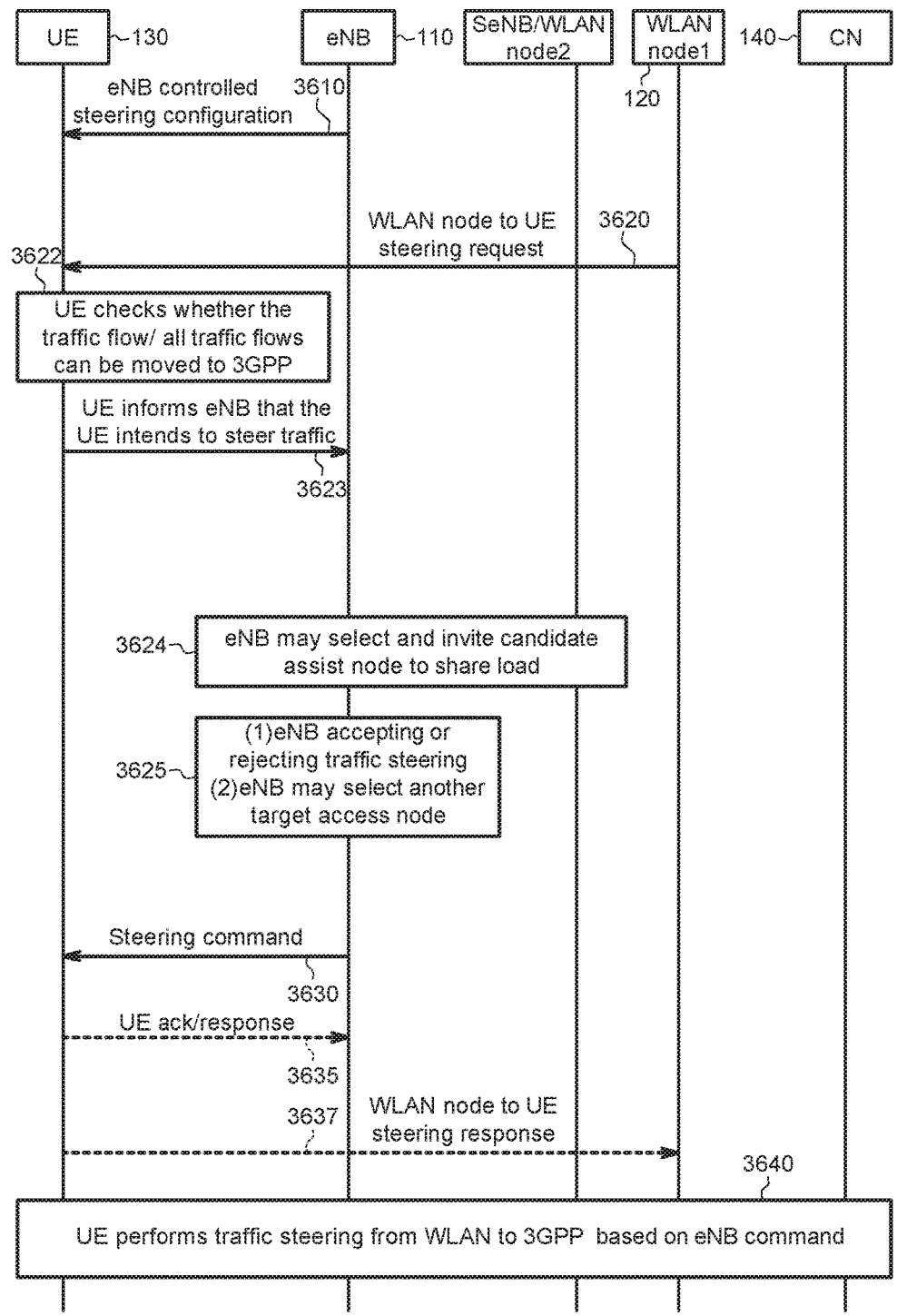

FIG. 36 shows a traffic steering method according to the embodiment B-1.3-i of the application. In the embodiment B-1.3-i, the WLAN node 120 initiates a traffic steering request to steer traffic for a target UE to 3GPP.

In step 3610, the eNB 110 sends an "eNB controlled steering configuration" message to the UE 130 in the coverage of the eNB 110.

The WLAN node 120 may send a "WLAN node to UE steering request" message to the UE 130 in step 3620. The WLAN node to UE steering request message includes "all traffic indication" and "a list of {list of {APN, traffic flow ID(s)}}".

Upon receiving the WLAN node to UE steering request message from the WLAN node 120, the UE 130 checks whether the one or more traffic flow(s) indicated in the WLAN node to UE steering request message are allowed to be moved to from WLAN to 3GPP in step 3622.

In step 3623, the UE 130 informs the eNB 110 that the UE 130 intends to steer traffic message to the eNB 110 to obtain the admission for traffic steering. The information in step 3623 may include the information of: (1) "UE ID" identifying that the identity of a UE used in a WLAN for WLAN access, e.g., the MAC address of the UE or the IP address given by the WLAN; (2) "cause" referring the cause of traffic steering (cause=WLAN node-initiated); (3) "the direction of the intended traffic steering" (move in); (4) the identifier of an source access node; (5) QoS info; and/or (6) a list of {APN, traffic flow ID(s)}.

The UE 130 may start a waiting timer for the time window of expecting to receive a response message from the eNB 110 when the UE 130 informs the eNB 110 that the UE 130 intends to steer traffic.

In step 3624, the eNB 110 may select and invite at least one candidate assist node to share load. The eNB 110 avoids selecting the source access node given in the notification from the UE 130.

In step 3625, the eNB 110 decides to accept or reject the traffic steering request, and the eNB 110 may select another target access node. The eNB 110 avoids selecting the source access node given in the notification from the UE 130.

If the eNB 110 decides to accept the traffic steering request (i.e. accept all traffic from WLAN), the eNB 110 sends a "traffic steering command" to the UE 130 in step 3630. In one embodiment, the eNB 110 may accept all or part of traffic from WLAN. In one embodiment, the eNB 110 may reject all of the traffic from WLAN.

In step 3635, the UE 130 may send a "UE ack" or a "UE response" message to the eNB 110 to acknowledge the steering command message sent by the eNB 110.

In step 3637, the UE 130 may send a "WLAN node to UE steering response" message to the WLAN node 120 to acknowledge the steering request sent by the WLAN node 120. If the WLAN node to UE steering response message from the UE 130 to the WLAN node 120 includes the indication (e.g., no release traffic flow(s) indication) to indicate that the one or more traffic flow(s) of the specific APN should not be steered to 3GPP, the WLAN node 120 may mark the indicated traffic flow(s) as not preferable to 3GPP.

In step 3640, the UE 130 performs traffic steering from WLAN to 3GPP if the eNB 110 admitted the steering. The performing of the traffic steering message may utilize the information including: (1) the cause of traffic steering (e.g., cause=WLAN node-initiated); (2) target access node; (3) traffic flow ID and/or (4) APN.

Figure 37:
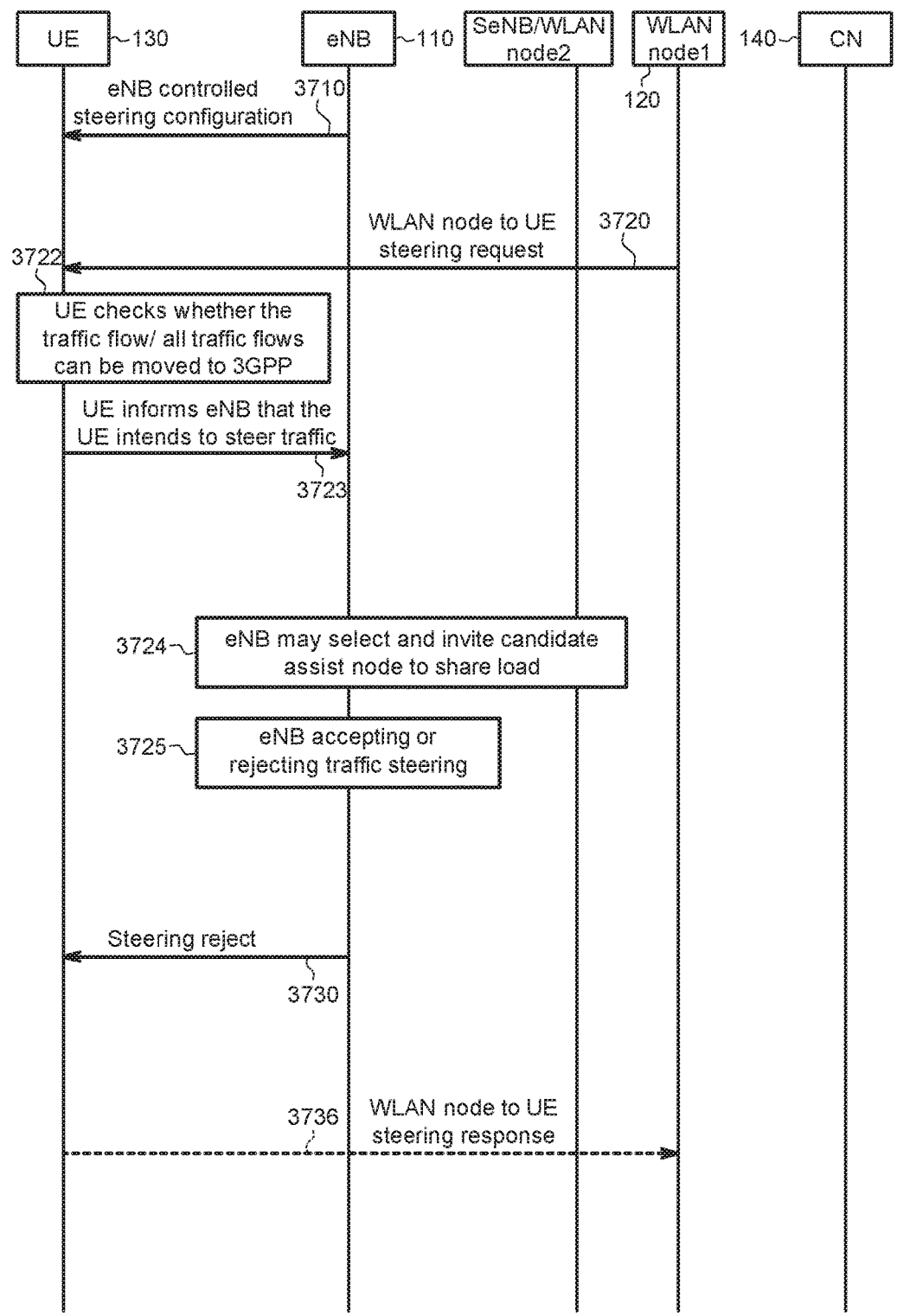

Embodiment B-1.3-j: From WLAN to 3GPP, with eNB/WLAN Node Interface, WLAN Node Initiated to Steer all Traffic of a UE to 3GPP but eNB Rejected FIG. 37 shows a traffic steering method according to the embodiment B-1.3-j of the application. In the embodiment B-1.3-j, the WLAN node 120 initiates a traffic steering request to steer traffic for a target UE to 3GPP, but the eNB 110 rejects.

In step 3710, the eNB 110 sends an "eNB controlled steering configuration" message to the UE 130 in the coverage of the eNB 110.

The WLAN node 120 may send a "WLAN node to UE steering request" message to the UE 130 in step 3720. The WLAN node to UE steering request message includes "all traffic indication" and/or "a list of {list of {APN, traffic flow ID(s)}}".

Upon receiving the WLAN node to UE steering request message from the WLAN node 120, the UE 130 checks whether the one or more traffic flow(s) indicated in the WLAN node to UE steering request message are allowed to be moved to from WLAN to 3GPP in step 3722.

In step 3723, the UE 130 informs the eNB 110 that the UE 130 intends to steer traffic message to the eNB 110 to obtain the admission for traffic steering. The information in step 3723 may include the information of: (1) "UE ID" identifying the identity of a UE that the UE used in a WLAN for WLAN access, e.g., the MAC address of the UE or the IP address given by the WLAN; (2) "cause" referring the cause of traffic steering (cause=WLAN node-initiated); (3) "the direction of the intended traffic steering" (move in); (4) the identifier of an source access node; (5) QoS info; and/or (6) a list of {APN, traffic flow ID(s)}.

The UE 130 may start a waiting timer for the time window of expecting to receive a response message from the eNB 110 when the UE 130 informs the eNB 110 that the UE 130 intends to steer traffic.

In step 3724, the eNB 110 may select and invite at least one candidate assist node to share load. The eNB 110 avoids selecting the source access node given in the notification from the UE 130.

In step 3725, the eNB 110 decides to accept or reject the traffic steering request. If the eNB 110 decides to reject the traffic steering intention of the requesting UE 130, the eNB 110 sends a "steering reject" message to the requesting UE 130 in step 3730.

Upon receiving the steering reject message from the eNB 110, in step 3736, the UE 130 may send a "WLAN node to UE steering response" message to the WLAN node 120 to acknowledge the steering request sent by the WLAN node 120. The WLAN node to eNB steering response message may include the following information: "indication of rejection" and/or "cause" (e.g., cause=eNB rejected).

Figure 38:
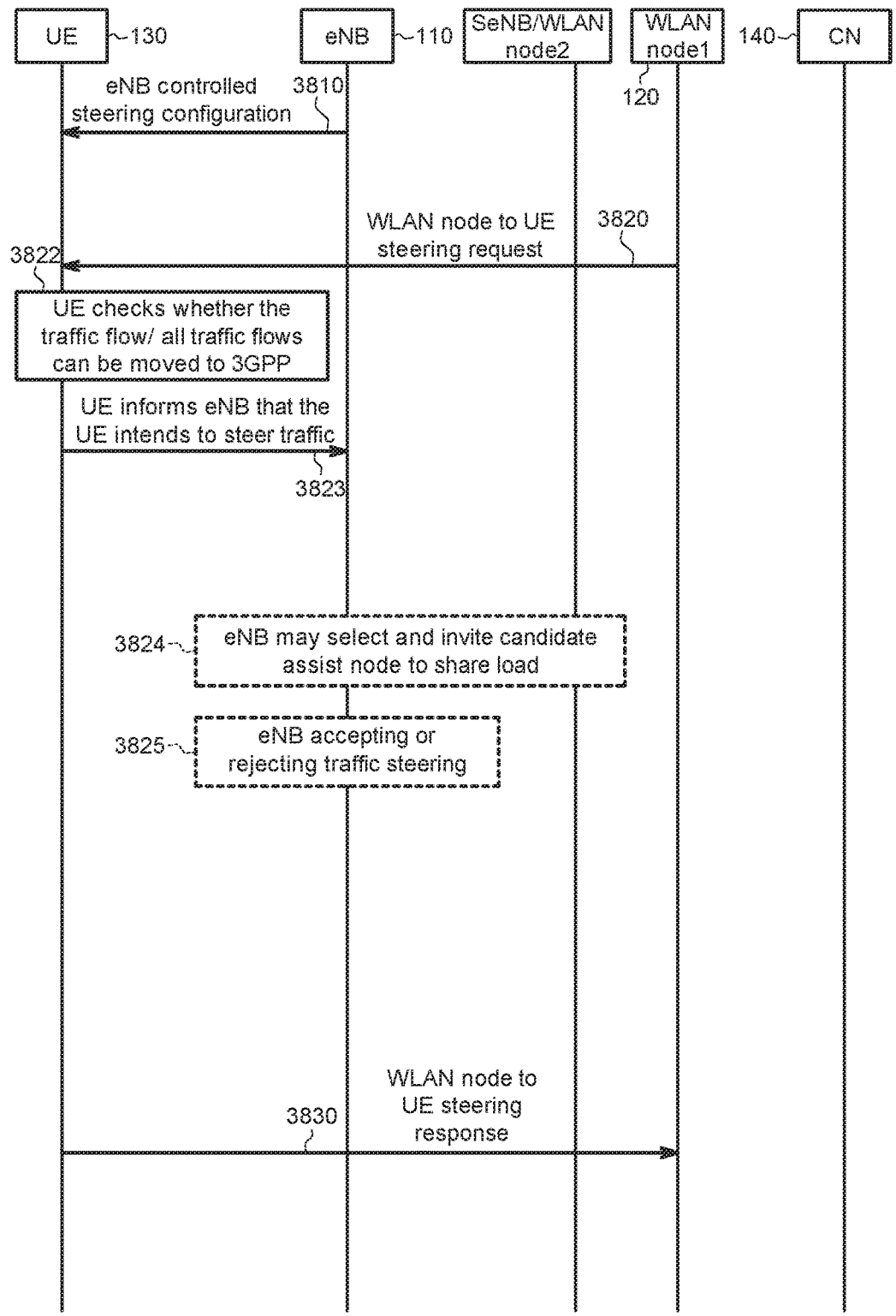

Embodiment B-1.3-k: From WLAN to 3GPP, with eNB/WLAN Node Interface, WLAN Node Initiated to Steer all Traffic of a UE to 3GPP but eNB No Response FIG. 38 shows a traffic steering method according to the embodiment B-1.3-k of the application. In the embodiment B-1.3-k, the WLAN node 120 initiates a traffic steering request to steer traffic for a target UE to 3GPP, but the eNB 110 does not respond.

In step 3810, the eNB 110 sends an "eNB controlled steering configuration" message to the UE 130 in the coverage of the eNB 110.

The WLAN node 120 may send a "WLAN node to UE steering request" message to the UE 130 in step 3820. The WLAN node to UE steering request message includes "all traffic indication" and/or "a list of {list of {APN, traffic flow ID(s)}}".

Upon receiving the WLAN node to UE steering request message from the WLAN node 120, the UE 130 checks whether the one or more traffic flow(s) indicated in the WLAN node to UE steering request message are allowed to be moved to from WLAN to 3GPP in step 3822.

In step 3823, the UE 130 informs the eNB 110 that the UE 130 intends to steer traffic message to the eNB 110 to obtain the admission for traffic steering. The information in step 3823 may include the information of: (1) "UE ID" identifying the identity of a UE that the UE used in a WLAN for WLAN access, e.g., the MAC address of the UE or the IP address given by the WLAN; (2) "cause" referring the cause of traffic steering (cause=WLAN node-initiated); (3) "the direction of the intended traffic steering" (move in); (4) the identifier of an source access node; (5) QoS info; and/or (6) a list of {APN, traffic flow ID(s)}.

The UE 130 may start a waiting timer for the time window of expecting to receive a response message from the eNB 110 when the UE 130 informs the eNB 110 that the UE 130 intends to steer traffic.

In step 3824, the eNB 110 may select and invite at least one candidate assist node to share load. The eNB 110 avoids selecting the source access node given in the notification from the UE 130.

In step 3825, the eNB 110 decides to accept or reject the traffic steering request.

The eNB 110 may perform no action in response to the traffic steering request from the UE 130 or the eNB 110 may decide not to respond to the traffic steering request from the UE 130. If so, no response would be sent to the requesting UE 130 from the eNB 110.

Upon expiry of the waiting timer for the time window of expecting to receive a response message from eNB 110, the UE 130 may send a "WLAN node to UE steering response" message to the WLAN node 120 to acknowledge the steering request sent by the WLAN node 120 in step 3830. The WLAN node to UE steering response message may include the following information: (1) "rejection" referring an indication to reject the traffic steering from WLAN to 3GPP, and/or (2) "cause" presenting that rejection is based on some reason (e.g., cause=others).

Figure 39:
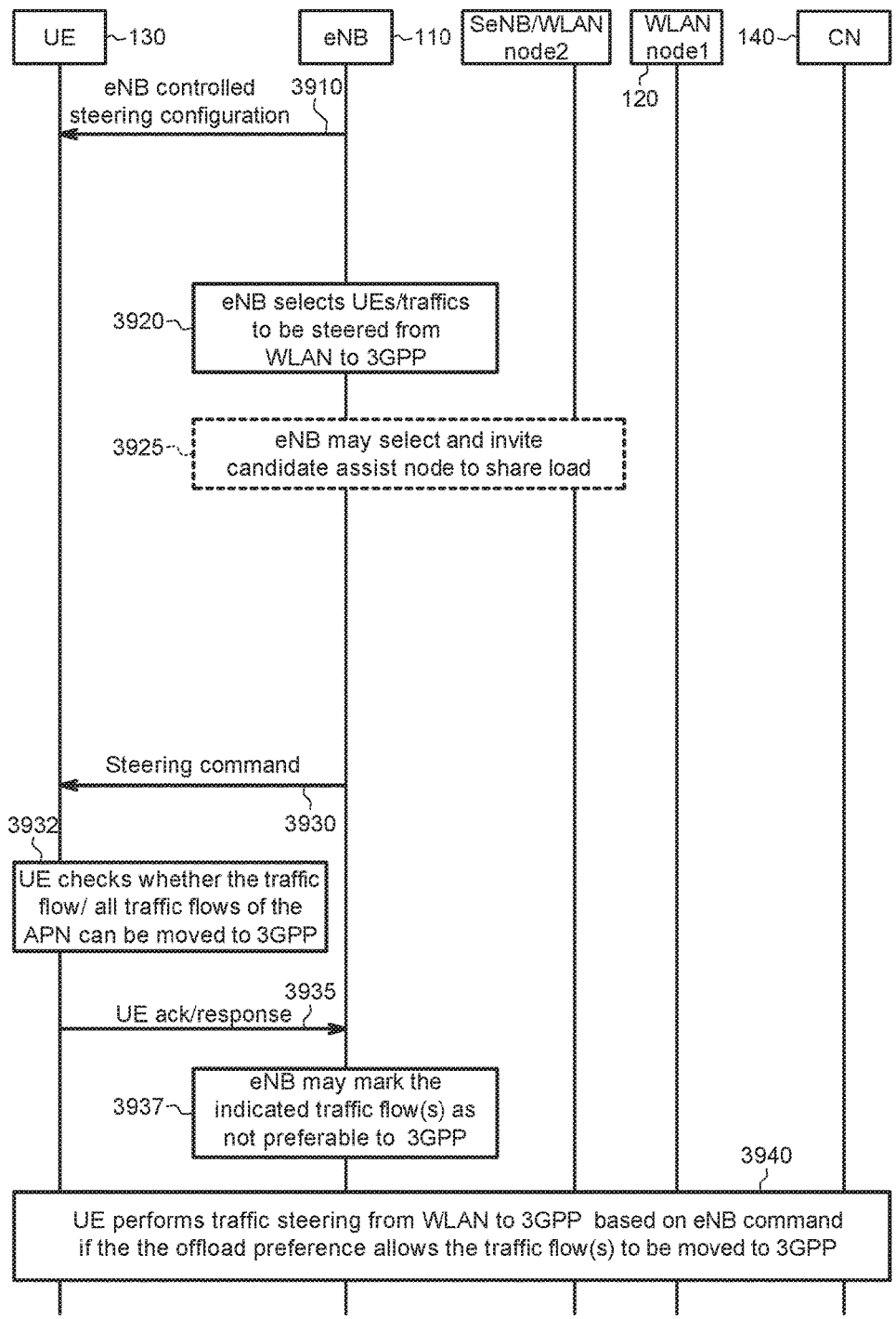

Embodiment B-1.4-a: From WLAN to 3GPP, with eNB/WLAN Node Interface, eNB Initiated FIG. 39 shows a traffic steering method according to the embodiment B-1.4-a of the application. In the embodiment B-1.4-a, the eNB 110 initiates a traffic steering request.

In step 3910, the eNB 110 sends an "eNB controlled steering configuration" message to one or more UEs 130 in the coverage of the eNB 110.

In step 3920, the eNB 110 selects UEs or traffic flow(s) to be steered from WLAN to 3GPP, e.g., based on the measurement reports from the UEs 130, or load of the target access node reported by the UEs 130 or by the WLAN node(s) 120, or by the estimation of the eNB 110.

In step 3925, the eNB 110 may select and invite at least one candidate assist node (SeNB or WLAN node2) to share load.

In step 3930, the eNB 110 sends a "steering command" message to the UE 130. The steering command may include the information of: target access node; RAN assistance info; APN; and/or traffic flow(s). The APN and traffic flow ID may uniquely identify the source access node.

Upon receiving the steering command message from the eNB 110, the UE 130 checks whether the one or more traffic flow(s) indicated in the steering command message are allowed to be moved to from WLAN to 3GPP in step 3932.

In step 3935, the UE 130 may send a "UE ack" or a "UE response" message to the eNB 110 to acknowledge the steering command message sent by the eNB 110. The UE ack or UE response message may include an indication (e.g., no release traffic flow(s) indication) to indicate that the traffic flow(s) of the specific APN should not be released according to the policy rules maintained in the UE 130.

If the eNB 110 receives from the UE the UE ack or UE response message which including the indication (e.g., no release traffic flow(s) indication) to indicate that the one or more traffic flow(s) of the specific APN should not be released, the eNB 110 should not release the specific traffic flow(s); and the eNB 110 may mark the indicated traffic flow(s) as not allowed to be steered WLAN in step 3937.

In step 3940, the UE performs traffic steering from WLAN to 3GPP based on the steering command if the offload preference allows the traffic flow(s) to be moved to 3GPP.

The performing of the traffic steering message may utilize the information including the cause of traffic steering (cause=eNB-initiated); the identifier of the target access node which was indicated by the eNB 110; the traffic flow ID(s) to identify one or more traffic flow(s) that will be steered; and/or the APN.

In the embodiment B-2, the UE 130 has ongoing PDN connection(s) over WLAN. The UE 130 has active 3GPP connection(s). The eNB 110 configures the UEs 130 for measurement control, and the UE 130 performs measurement report(s) based on the measurement control from the eNB 110. The UE 130 may send the UE ID used in the selected WLAN to the eNB 110. The UE ID used in WLAN could be e.g., the IP address of the UE 130 used in the WLAN, or the MAC address of the UE 130.

In the embodiment B-2, there are at least four embodiments, i.e. the embodiment B-2.1 (in which the traffic steering is initiated by the UE 130), the embodiment B-2.2 (in which the traffic steering is initiated by the CN 140), the embodiment B-2.3 (in which the traffic steering is initiated by the WLAN node 120), and the embodiment B-2.4 (in which the traffic steering is initiated by the eNB 110).

Embodiment B-2.1-a: From WLAN to 3GPP, No eNB/WLAN Node Interface, UE Initiated

Figure 40:
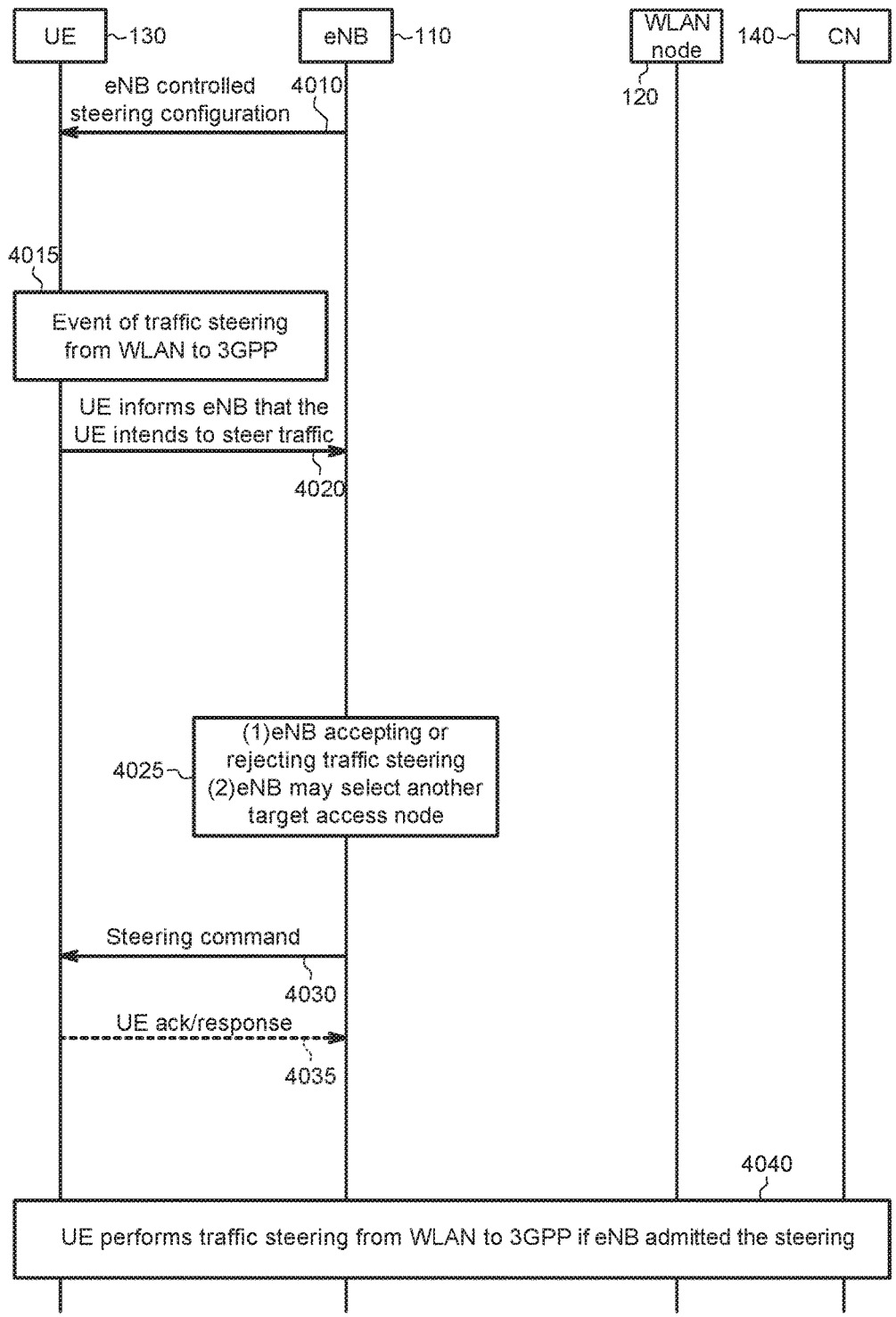

FIG. 40 shows a traffic steering method according to the embodiment B-2.1-a of the application. In the embodiment B-2.1-a, the traffic steering is initiated by the UE 130.

In step 4010, the eNB 110 sends an "eNB controlled steering configuration" message to one or more UEs 130 in the coverage of the eNB 110. If the UE 130 determines that the event of traffic steering from the WLAN access network to the 3GPP access network occurs in step 4015, the UE 130 sends a "traffic steering request" to inform the eNB 110 that the UE 130 intends to steer traffic to obtain the admission for traffic steering in step 4020.

Further, the UE 130 may start a waiting timer for the window of expecting to receive a response message from the eNB 110 after the UE 130 sends the traffic steering request.

In step 4025, the eNB 110 determines whether to accept or reject the traffic steering request. Further, if the eNB 110 accepts the traffic steering request, the eNB 110 may select another target access node for the UE 130 (e.g., based on the load of the target access node reported by the UE 130, or by the WLAN node 120 or by the estimation of the eNB 110). The eNB 110 avoids selecting the source access node given in the notification from the UE 130.

In step 4030, the eNB 110 sends a "traffic steering command" to inform the UE 130 if the eNB 110 accepts the traffic steering request.

In step 4035, the UE 130 may send a "UE ack" or a "UE response" message to the eNB 110 to acknowledge the traffic steering command sent by the eNB 110, and in step 4040 the UE 130 performs traffic steering if the eNB 110 admitted the traffic steering.

Embodiment B-2.1-b: From WLAN to 3GPP, No eNB/WLAN Node Interface, UE Initiated with Dual Connectivity (DC)

Figure 41:
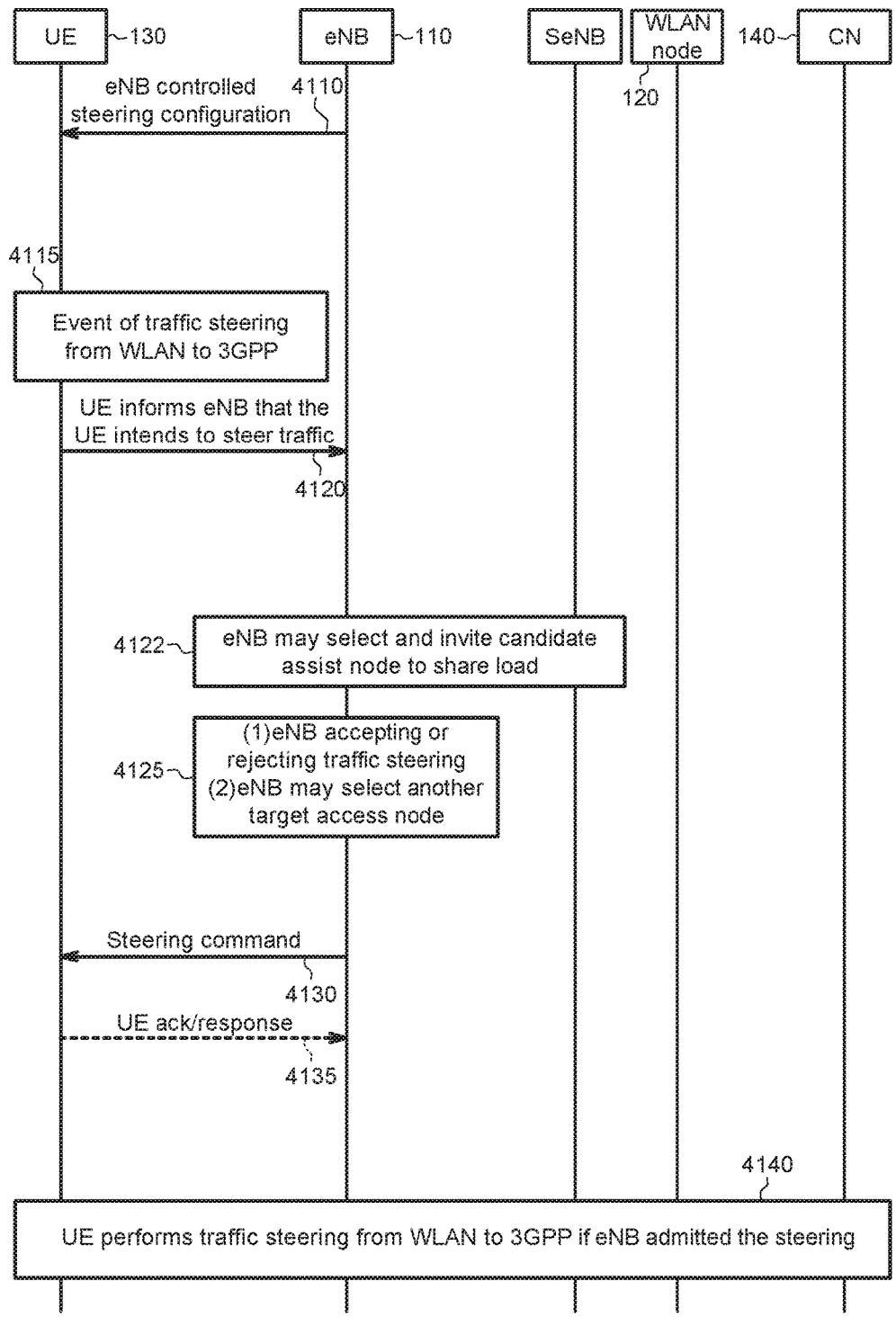

FIG. 41 shows a traffic steering method according to the embodiment B-2.1-b of the application. In the embodiment B-2.1-b, the traffic steering is initiated by the UE 130.

In step 4110, the eNB 110 sends an "eNB controlled steering configuration" message to one or more UEs 130 in the coverage of the eNB 110. If the UE 130 determines that the event of traffic steering from the WLAN access network to the 3GPP access network occurs in step 4115, the UE 130 sends a "traffic steering request" to inform the eNB 110 that the UE 130 intends to steer traffic to obtain the admission for traffic steering in step 4120.

Further, in FIG. 41, the UE 130 may start a waiting timer for the window of expecting to receive a response message from the eNB 110 after the UE 130 sends the traffic steering request.

In step 4122, the eNB 110 may select and invite other candidate assist node to share load.

In step 4125, the eNB 110 determines whether to accept or reject the traffic steering request. Further, if the eNB 110 accepts the traffic steering request, the eNB may select another target access node for the UE 130 in step 4125.

In step 4130, the eNB 110 sends a "traffic steering command" to inform the UE 130 if the eNB 110 accepts the traffic steering request.

In step 4135, the UE 130 may send a "UE ack" or a "UE response" message to the eNB 110 to acknowledge the traffic steering command sent by the eNB 110. In step 4140, the UE 130 performs traffic steering from WLAN to 3GPP if the eNB 110 admitted the traffic steering.

Figure 42:
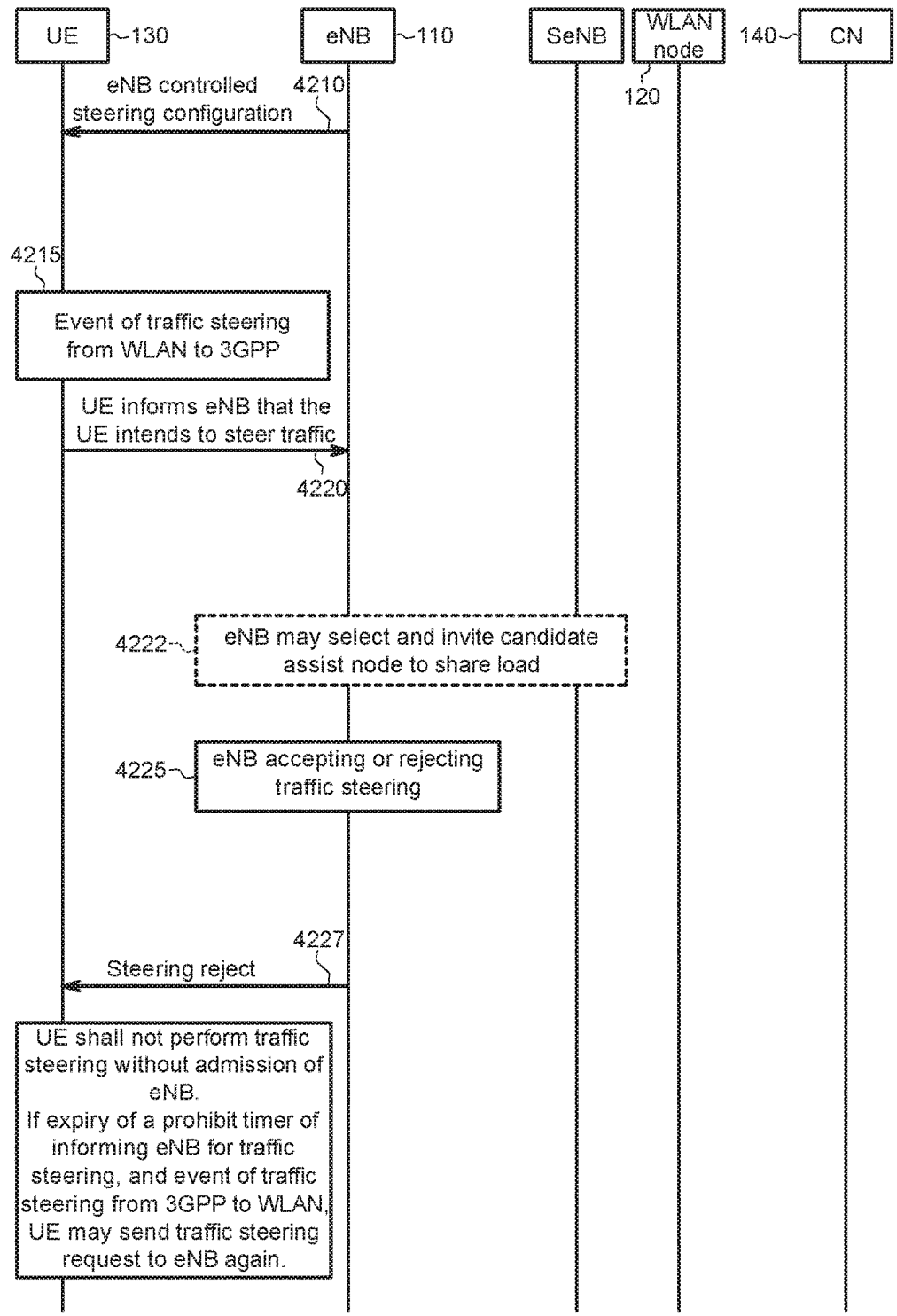

Embodiment B-2.1-c: From WLAN to 3GPP, No eNB/WLAN Node Interface, UE Initiated but eNB Rejects FIG. 42 shows a traffic steering method according to the embodiment B-2.1-c of the application. In the embodiment B-2.1-c, the UE 130 initiates a traffic steering request, but the eNB 110 rejects.

In step 4210, the eNB 110 sends an "eNB controlled steering configuration" message to one or more UEs 130 in the coverage of the eNB 110. If the UE 130 determines that the event of traffic steering from the WLAN access network to the 3GPP access network occurs in step 4215, the UE 130 sends a "traffic steering request" to inform the eNB 110 that the UE 130 intends to steer traffic to obtain the admission for traffic steering in step 4220.

Further, the UE 130 may start a waiting timer for the window of expecting to receive a response message from the eNB 110 after the UE 130 sends the traffic steering request.

In step 4222, the eNB 110 may select and invite other candidate assist node to share load.

In step 4225, the eNB 110 determines whether to accept or reject the traffic steering request. If the eNB 110 decides to reject the traffic steering intention of the requesting UE 130, the eNB 110 sends a "steering reject" message to the requesting UE 130 in step 4227.

Without admission of the eNB 110, the UE 130 does not perform traffic steering. The UE 130 may start a prohibit timer of informing eNB for traffic steering. If the prohibit timer of informing eNB for traffic steering is expired, and event of traffic steering from 3GPP to WLAN occurs, the UE 130 may send the traffic steering request to the eNB 110 again.

Figure 43:
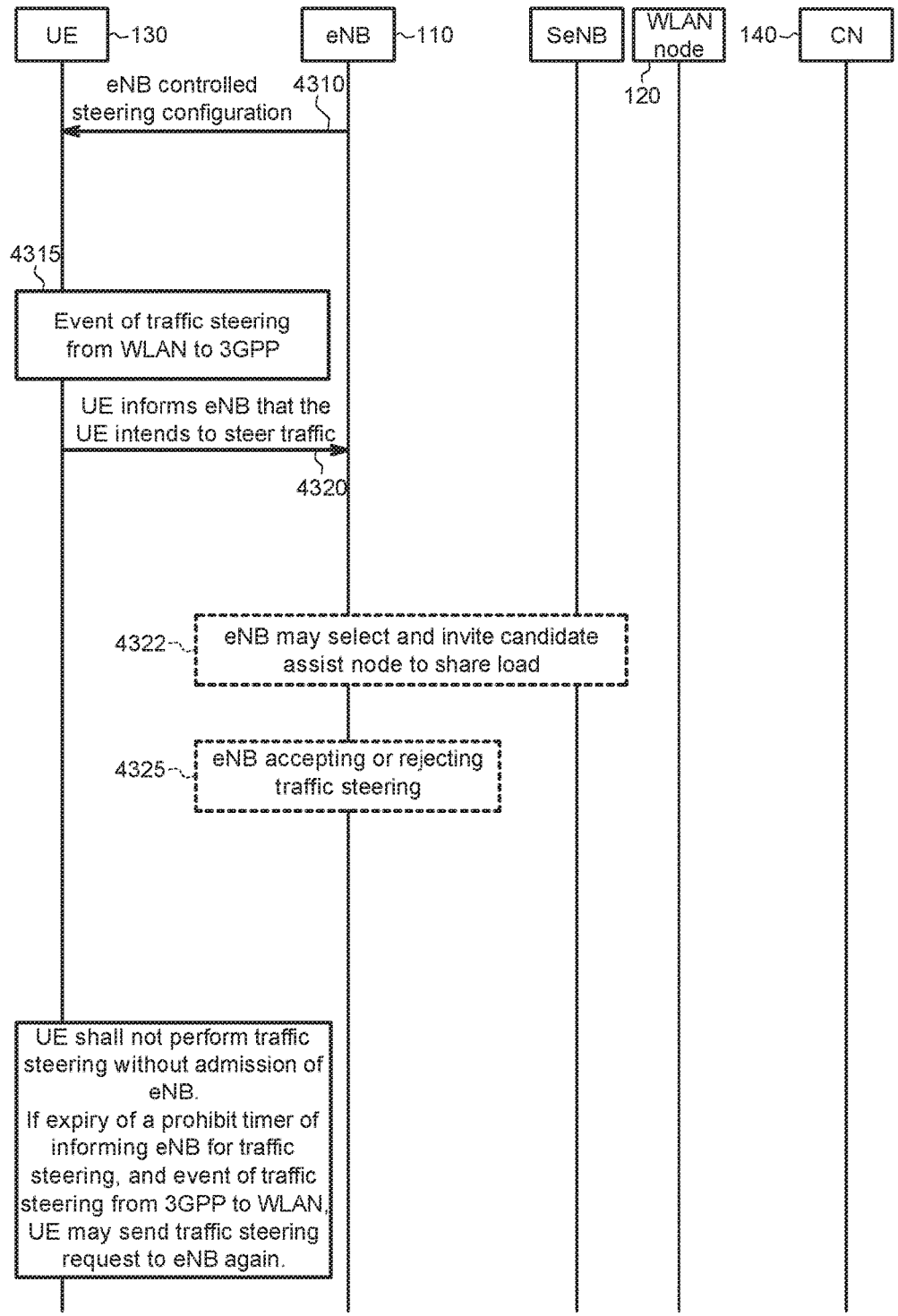

Embodiment B-2.1-d: From WLAN to 3GPP, No eNB/WLAN Node Interface, UE Initiated but No Response from eNB FIG. 43 shows a traffic steering method according to the embodiment B-2.1-d of the application. In the embodiment B-2.1-d, the UE 130 initiates a traffic steering request, but the eNB 110 does not respond.

In step 4310, the eNB 110 sends an "eNB controlled steering configuration" message to one or more UEs 130 in the coverage of the eNB 110. If the UE 130 determines that the event of traffic steering from the WLAN access network to the 3GPP access network occurs in step 4315, the UE 130 sends a "traffic steering request" to inform the eNB 110 that the UE 130 intends to steer traffic to obtain the admission for traffic steering in step 4320.

Further, the UE 130 may start a waiting timer for the window of expecting to receive a response message from the eNB 110 after the UE 130 sends the traffic steering request.

In step 4322, the eNB 110 may select and invite other candidate assist node to share load.

In step 4325, the eNB 110 determines whether to accept or reject the traffic steering request. After the eNB 110 determines to reject the traffic steering request from the UE 130, the eNB 110 may perform no action to the traffic steering request or the eNB 110 may decide not to respond to the traffic steering request. If so, no response would be sent to the requesting UE 130 from the eNB 110.

Without admission of the eNB 110, the UE 130 does not perform traffic steering. The UE 130 may start a prohibit timer of informing eNB for traffic steering. If the prohibit timer of informing eNB for traffic steering is expired, and event of traffic steering from 3GPP to WLAN occurs, the UE 130 may send the traffic steering request to the eNB 110 again.

Embodiment B-2.2-a: From WLAN to 3GPP, No eNB/WLAN Node Interface, CN Initiated

Figure 44:
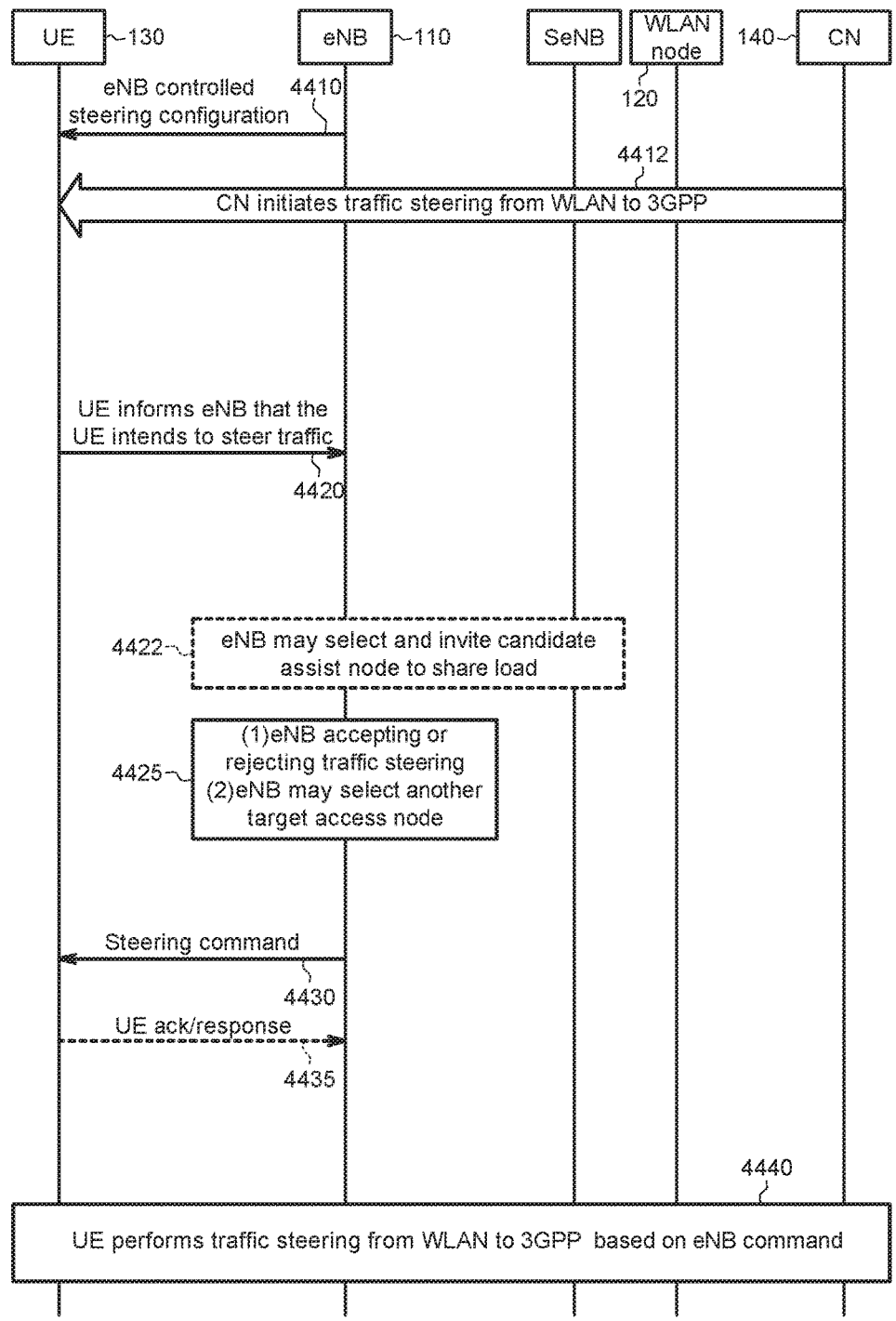

FIG. 44 shows a traffic steering method according to the embodiment B-2.2-a of the application. In the embodiment B-2.2-a, the CN 140 initiates a traffic steering request.

In step 4410, the eNB 110 sends an "eNB controlled steering configuration" message to one or more UEs 130 in the coverage of the eNB 110.

In step 4412, when the UE 130 receives an indication from the core network 140 that the core network 140 initiates traffic steering from WLAN to 3GPP for the UE 130, the UE 130 sends a "traffic steering request" to the eNB 110 to inform the eNB 110 that the UE 130 intends to steer traffic to obtain the admission for traffic steering in step 4420.

In step 4422, the eNB 110 may select and invite at least one candidate assist node to share load.

In step 4425, the eNB 110 determines whether to accept or reject the traffic steering request. Further, if the eNB 110 accepts the traffic steering request, the eNB may select another target access node for the UE 130 (e.g., based on the load of the target access node reported by UEs, or by WLAN(s) or by the estimation of the eNB 110) in step 4425.

In step 4430, the eNB 110 sends a "traffic steering command" to inform the UE 130 if the eNB 110 accepts the traffic steering request. In step 4435, the UE 130 may send a "UE ack" or a "UE response" message to the eNB 110 to acknowledge the traffic steering command sent by the eNB 110.

In step 4440, the UE 130 performs traffic steering if the eNB 110 admitted the traffic steering.

The embodiment in which the CN 140 initiates traffic steering from WLAN to 3GPP, no eNB/WLAN node Interface and UE supporting DC is similar to the above embodiment B-2.2-a and thus, the details are omitted here.

Figure 45:
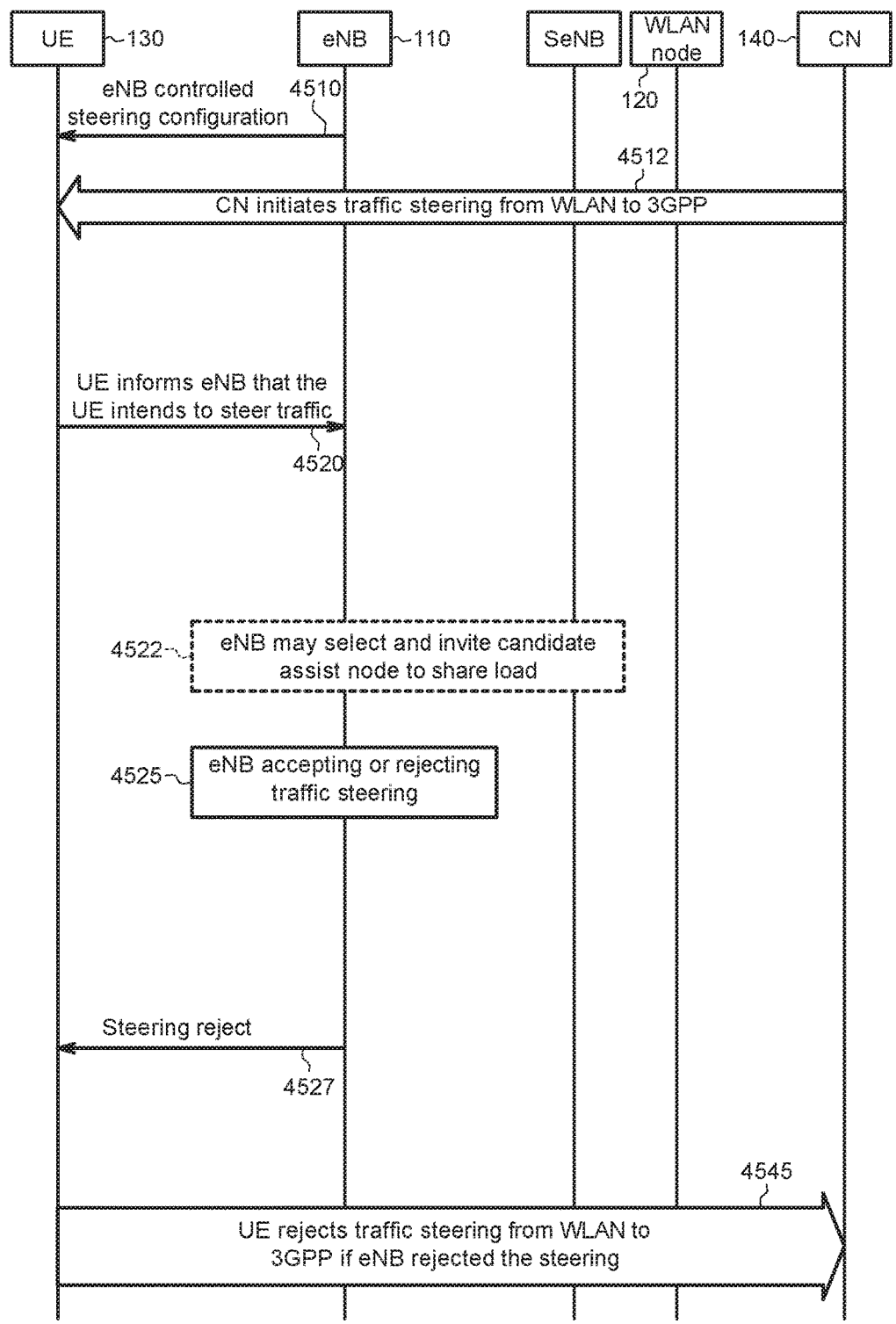

Embodiment B-2.2-b: From WLAN to 3GPP, No eNB/WLAN Node Interface, CN Initiated but eNB Rejected FIG. 45 shows a traffic steering method according to the embodiment B-2.2-b of the application. In the embodiment B-2.2-b, the CN 140 initiates a traffic steering request, but the eNB 110 rejects.

In step 4510, the eNB 110 sends an "eNB controlled steering configuration" message to one or more UEs 130 in the coverage of the eNB 110.

In step 4512, when the UE 130 receives an indication from the core network 140 that the core network 140 initiates traffic steering from WLAN to 3GPP for the UE 130, the UE 130 sends a "traffic steering request" to the eNB 110 to inform the eNB 110 that the UE 130 intends to steer traffic to obtain the admission for traffic steering in step 4520.

In step 4522, the eNB 110 may select and invite at least one candidate assist node to share load.

In step 4525, the eNB 110 determines whether to accept or reject the traffic steering request. If the eNB 110 decides to reject the traffic steering intention of the requesting UE 130, the eNB 110 sends a "steering reject" message to the requesting UE 130 in step 4527.

Upon receiving the steering reject message from the eNB 110, the UE 130 rejects traffic steering from 3GPP to WLAN requested by the CN 140 in step 4545. The rejection message from the UE 130 to the CN 140 may include the cause presenting that the eNB 110 rejects the traffic steering (e.g., cause=eNB-controlled) from WLAN to 3GPP.

Figure 46:
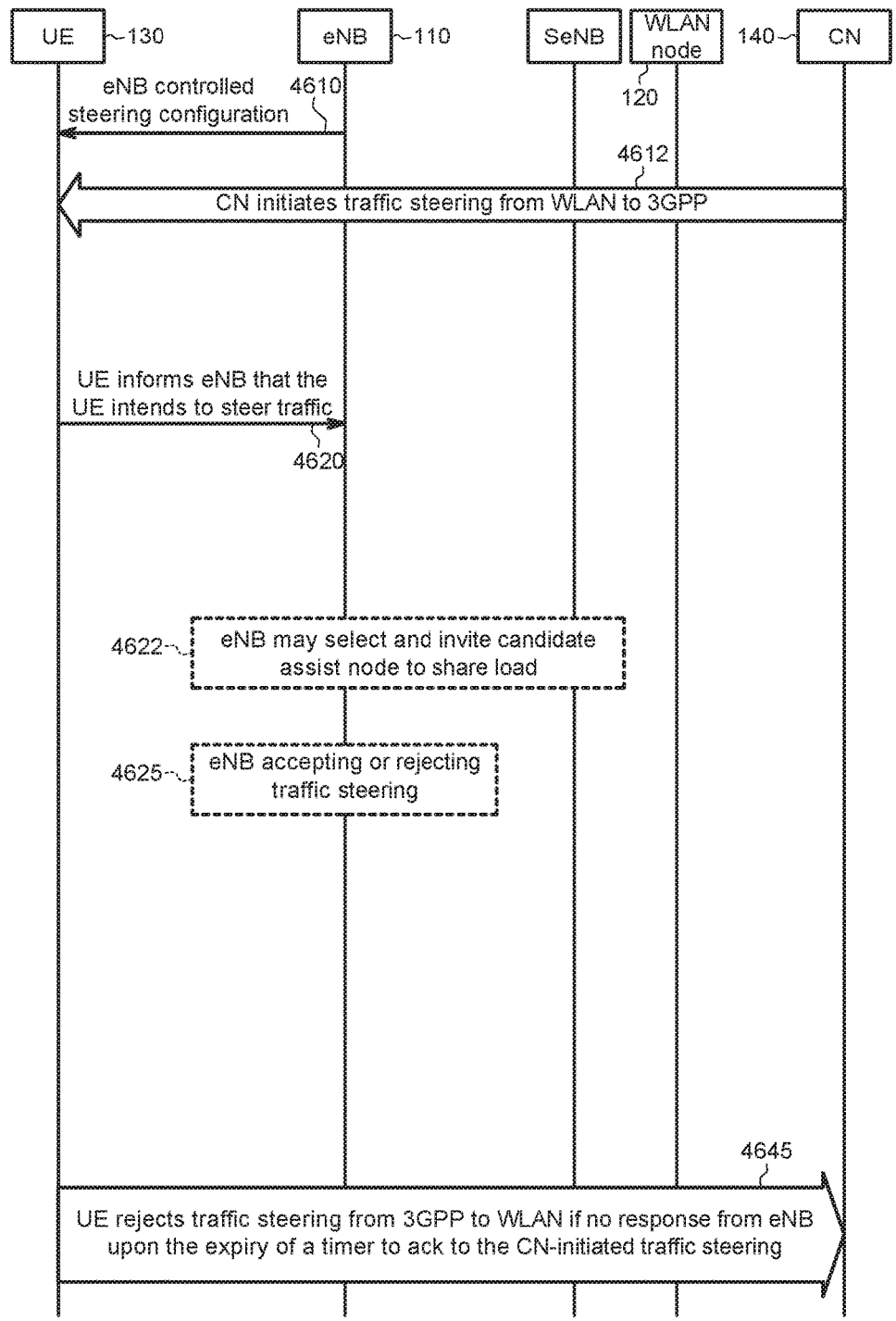

Embodiment B-2.2-c: From WLAN to 3GPP, No eNB/WLAN Node Interface, CN Initiated but No Response from eNB FIG. 46 shows a traffic steering method according to the embodiment B-2.2-c of the application. In the embodiment B-2.2-c, the CN 140 initiates a traffic steering request, but the eNB 110 does not respond.

In step 4610, the eNB 110 sends an "eNB controlled steering configuration" message to one or more UEs 130 in the coverage of the eNB 110.

In step 4612, when the UE 130 receives an indication from the core network 140 that the core network 140 initiates traffic steering from WLAN to 3GPP for the UE 130, the UE 130 sends a "traffic steering request" to the eNB 110 to inform the eNB 110 that the UE 130 intends to steer traffic to obtain the admission for traffic steering in step 4620.

In step 4622, the eNB 110 may select and invite at least one candidate assist node to share load.

In step 4625, the eNB 110 determines whether to accept or reject the traffic steering request. After the eNB 110 determines to reject the traffic steering request from the UE 130, the eNB 110 may perform no action to the traffic steering request or the eNB 110 may decide not to respond to the traffic steering request. If so, no response would be sent to the requesting UE 130 from the eNB 110.

The UE does not perform traffic steering without admission of eNB. Upon expiry of the waiting timer for the time window of expecting to receive a response message from the eNB 110, in step 4645, the UE 130 rejects traffic steering from WLAN to 3GPP requested by the CN 140 if the UE 130 does not receive a response from the eNB 110.

Figure 47:
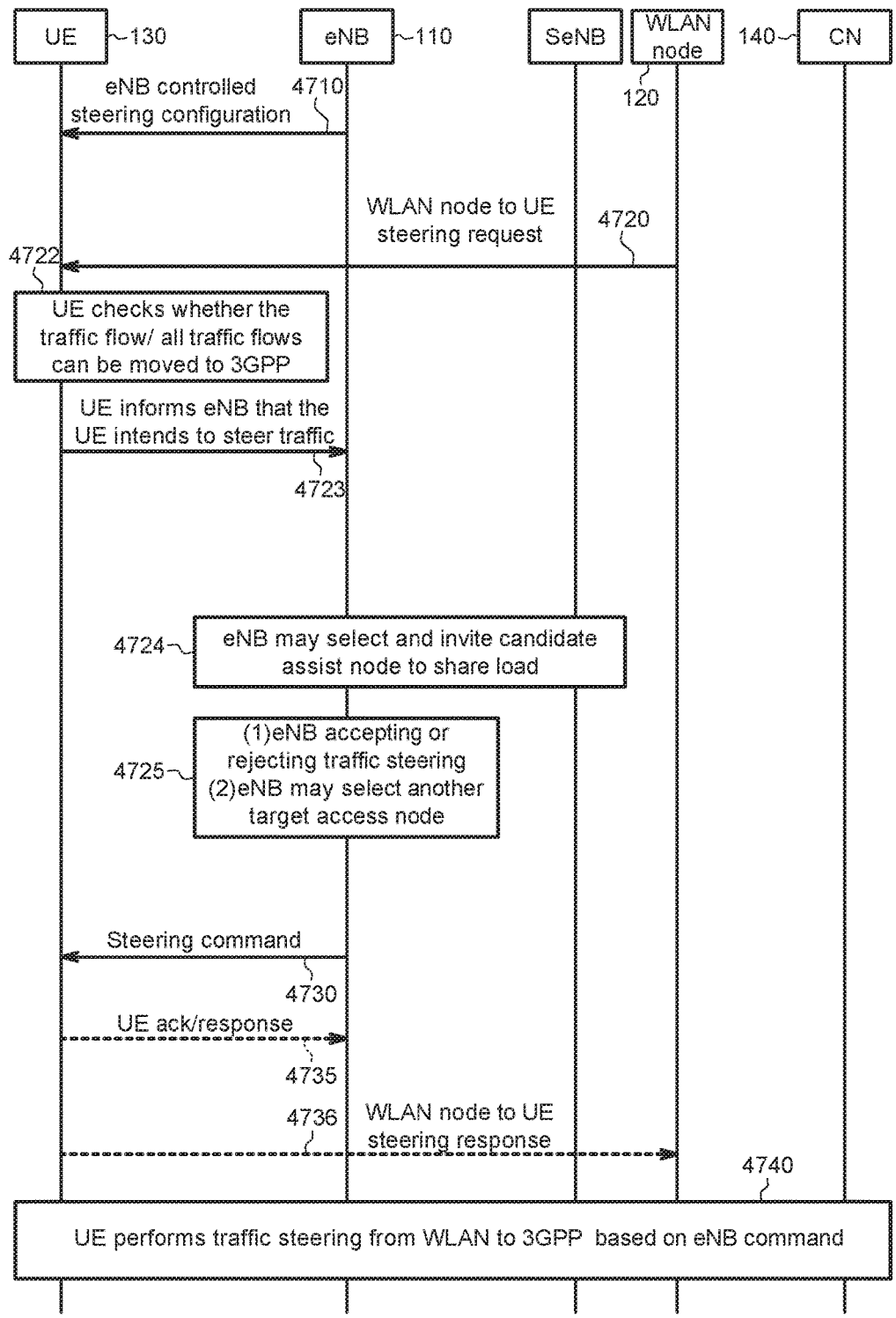

Embodiment B-2.3-a: From WLAN to 3GPP, No eNB/WLAN Node Interface, WLAN Node Initiated FIG. 47 shows a traffic steering method according to the embodiment B-2.3-a of the application. In the embodiment B-2.3-a, the WLAN node 120 initiates a traffic steering request to steer traffic for a target UE.

In step 4710, the eNB 110 sends an "eNB controlled steering configuration" message to the UE 130 in the coverage of the eNB 110.

The WLAN node 120 may send a WLAN node to UE steering request message to the UE 130 in step 4720. In step 4720, if the WLAN node 120 selects a UE or traffic flow(s) to be steered from WLAN to 3GPP, the WLAN sends the WLAN node to UE steering request message which may include the following information: a list of {APN, traffic flow ID(s)}.

Upon receiving the WLAN node to UE steering request message from the WLAN node 120, the UE 130 checks whether the one or more traffic flow(s) indicated in the WLAN node to UE steering request message are allowed to be moved to from WLAN to 3GPP in step 4722.

In step 4723, the UE 130 informs the eNB 110 that the UE 130 intends to steer traffic message to the eNB 110 to obtain the admission for traffic steering. The information in step 4723 may include: (1) "UE ID" identifying the identity of a UE that the UE used in a WLAN for WLAN access, e.g., the MAC address of the UE or the IP address given by the WLAN; (2) "cause" referring the cause of traffic steering (cause=WLAN node-initiated); (3) "the direction of the intended traffic steering" (move in); (4) the identifier of an source access node; (5) QoS info; and/or (6) a list of {APN, traffic flow ID(s)}.

The UE 130 may start a waiting timer for the time window of expecting to receive a response message from the eNB 110 when the UE 130 informs the eNB 110 that the UE 130 intends to steer traffic.

In step 4724, the eNB 110 may select and invite at least one candidate assist node to share load.

In step 4725, the eNB 110 decides to accept or reject the traffic steering request, and the eNB 110 may select another target access node.

If the eNB 110 decides to accept the traffic steering request, the eNB 110 sends a "traffic steering command" to the UE 130 in step 4730.

In step 4735, the UE 130 may send a "UE ack" or a "UE response" message to the eNB 110 to acknowledge the steering command message sent by the eNB 110.

In step 4736, the UE 130 may send a "WLAN node to UE steering response" message to the WLAN node 120 to acknowledge the steering request sent by the WLAN node 120. If the WLAN node to UE steering response message from the UE 130 to the WLAN node 120 includes the indication (e.g., no release traffic flow(s) indication) to indicate that the one or more traffic flow(s) of the specific APN should not be steered to 3GPP, the WLAN node 120 may mark the indicated traffic flow(s) as not preferable to 3GPP.

In step 4740, the UE 130 performs traffic steering from WLAN to 3GPP if the eNB 110 admitted the steering. The performing of the traffic steering message may utilize the information including: (1) the cause of traffic steering (e.g., cause=WLAN node-initiated); (2) target access node; (3) traffic flow ID(s) and/or (4) APN.

Figure 48:
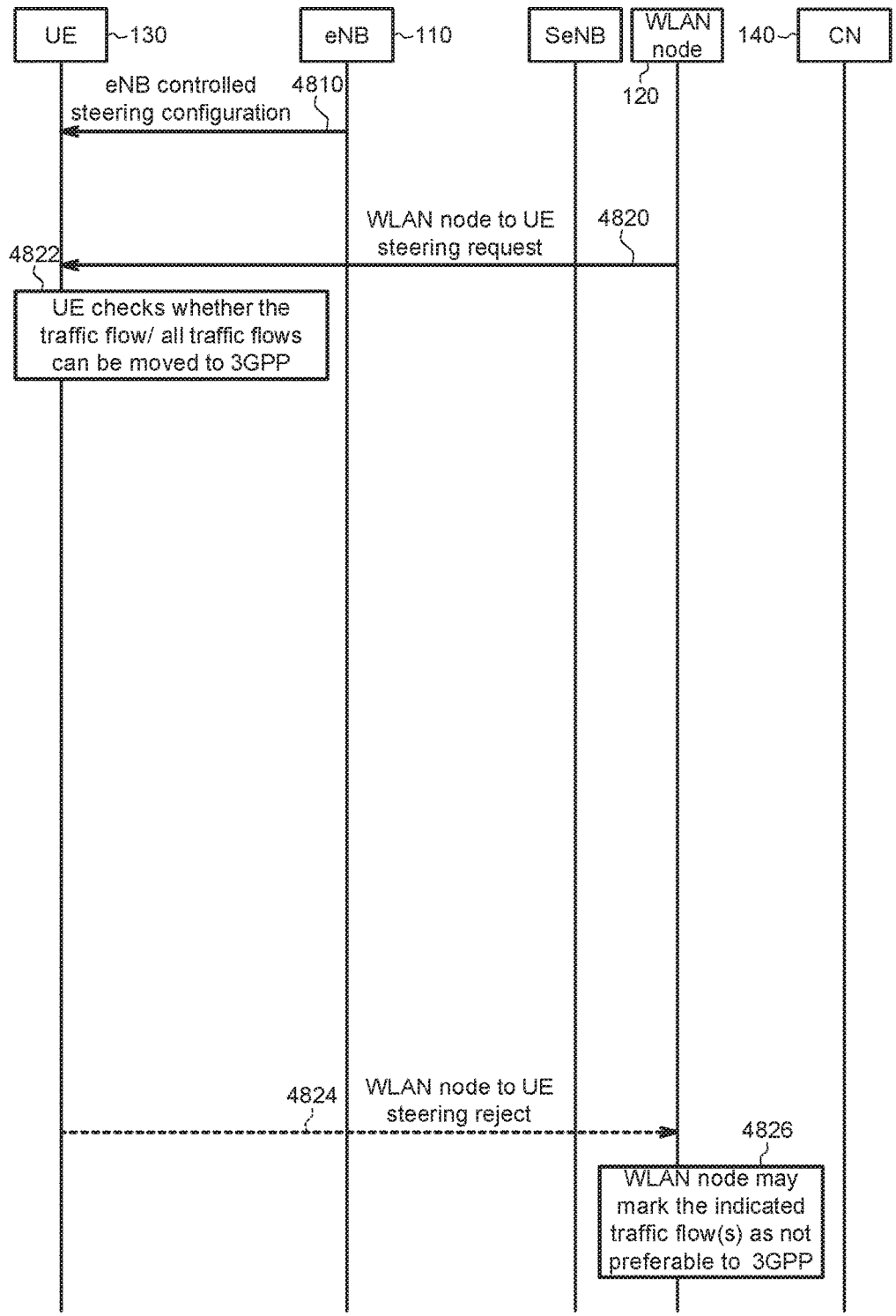

Embodiment B-2.3-b: From WLAN to 3GPP, No eNB/WLAN Node Interface, WLAN Node Initiated but UE Rejected FIG. 48 shows a traffic steering method according to the embodiment B-2.3-b of the application. In the embodiment B-2.3-b, the WLAN node 120 initiates a traffic steering request to steer traffic for a target UE, but the UE rejects.

In step 4810, the eNB 110 sends an "eNB controlled steering configuration" message to the UE 130 in the coverage of the eNB 110.

The WLAN node 120 may send a "WLAN node to UE steering request" message to the UE 130 in step 4820. In step 4820, if the WLAN node 120 selects a UE or traffic flow(s) to be steered from WLAN to 3GPP, the WLAN sends the WLAN node to UE steering request message which may include the following information: a list of {APN, traffic flow ID(s)}.

Upon receiving the WLAN node to UE steering request message from the WLAN node 120, the UE 130 checks whether the one or more traffic flow(s) indicated in the WLAN node to UE steering request message are allowed to be moved to from WLAN to 3GPP in step 4822.

If the UE 130 decides to reject the traffic steering indication from the WLAN node 120, in step 4824, the UE 130 may send a "WLAN node to UE steering reject" message to the WLAN, may include the information of: an indication (e.g., no release traffic flow(s) indication) to indicate that the traffic flow(s) of the specific APN should not be released according to the policy rules maintained in the UE.

Upon receiving the WLAN node to UE steering reject message from the UE, the WLAN node 120 may mark the indicated traffic flow(s) as not preferable to 3GPP in step 4726.

Embodiment B-2.3-c: From WLAN to 3GPP, No eNB/WLAN Node Interface, WLAN Node Initiated (to Steer all Traffic of a UE to 3GPP)

Figure 49:
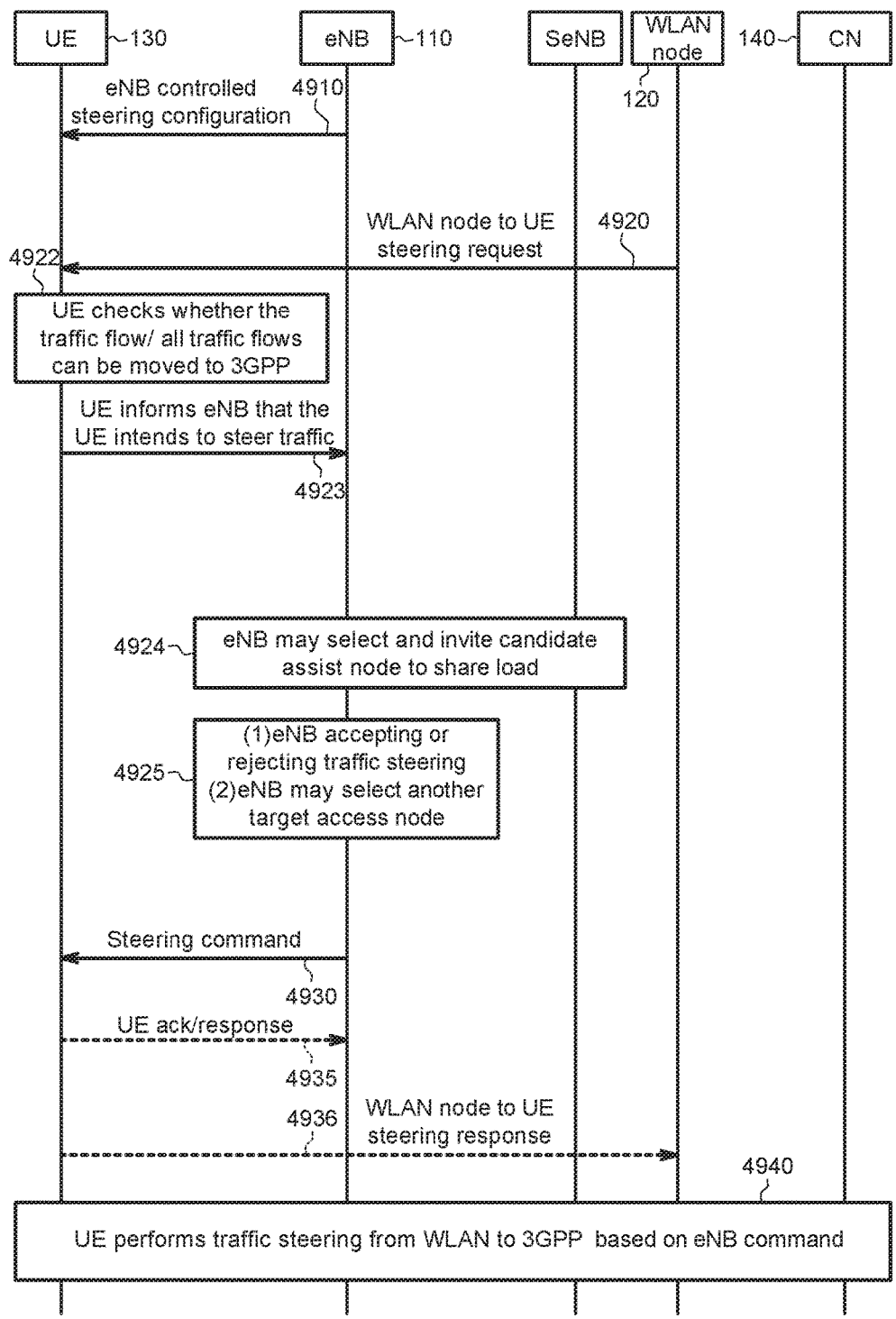

FIG. 49 shows a traffic steering method according to the embodiment B-2.3-c of the application. In the embodiment B-2.3-c, the WLAN node 120 initiates a traffic steering request to steer traffic for a target UE to 3GPP.

In step 4910, the eNB 110 sends an "eNB controlled steering configuration" message to the UE 130 in the coverage of the eNB 110.

The WLAN node 120 may send a "WLAN node to UE steering request" message to the UE 130 in step 4920. The WLAN node to UE steering request message includes "all traffic indication" and "a list of {list of {APN, traffic flow ID(s)}}".

Upon receiving the WLAN node to UE steering request message from the WLAN node 120, the UE 130 checks whether the one or more traffic flow(s) indicated in the WLAN node to UE steering request message are allowed to be moved to from WLAN to 3GPP in step 4922.

In step 4923, the UE 130 informs the eNB 110 that the UE 130 intends to steer traffic message to the eNB 110 to obtain the admission for traffic steering. The information in step 4923 may include: (1) "UE ID" identifying the identity of a UE that the UE used in a WLAN for WLAN access, e.g., the MAC address of the UE or the IP address given by the WLAN; (2) "cause" referring the cause of traffic steering (cause=WLAN node-initiated); (3) "the direction of the intended traffic steering" (move in); (4) the identifier of an source access node; (5) QoS info; and/or (6) a list of {APN, traffic flow ID(s)}.

The UE 130 may start a waiting timer for the time window of expecting to receive a response message from the eNB 110 when the UE 130 informs the eNB 110 that the UE 130 intends to steer traffic.

In step 4924, the eNB 110 may select and invite at least one candidate assist node to share load. The eNB 110 avoids selecting the source access node given in the notification from the UE 130.

In step 4925, the eNB 110 decides to accept or reject the traffic steering request, and the eNB 110 may select another target access node. The eNB 110 avoids selecting the source access node given in the notification from the UE 130.

If the eNB 110 decides to accept the traffic steering request (i.e. accept all traffic from WLAN), the eNB 110 sends a "traffic steering command" to the UE 130 in step 4930.

In step 4935, the UE 130 may send a "UE ack" or a "UE response" message to the eNB 110 to acknowledge the steering command message sent by the eNB 110.

In step 4936, the UE 130 may send a "WLAN node to UE steering response" message to the WLAN node 120 to acknowledge the steering request sent by the WLAN node 120. If the WLAN node to UE steering response message from the UE 130 to the WLAN node 120 includes the indication (e.g., no release traffic flow(s) indication) to indicate that the one or more traffic flow(s) of the specific APN should not be steered to 3GPP, the WLAN node 120 may mark the indicated traffic flow(s) as not preferable to 3GPP.

In step 4940, the UE 130 performs traffic steering from WLAN to 3GPP if the eNB 110 admitted the steering. The performing of the traffic steering message may utilize the information including: (1) the cause of traffic steering (e.g., cause=WLAN node-initiated); (2) target access node; (3) traffic flow ID(s) and/or (4) APN.

Figure 50:
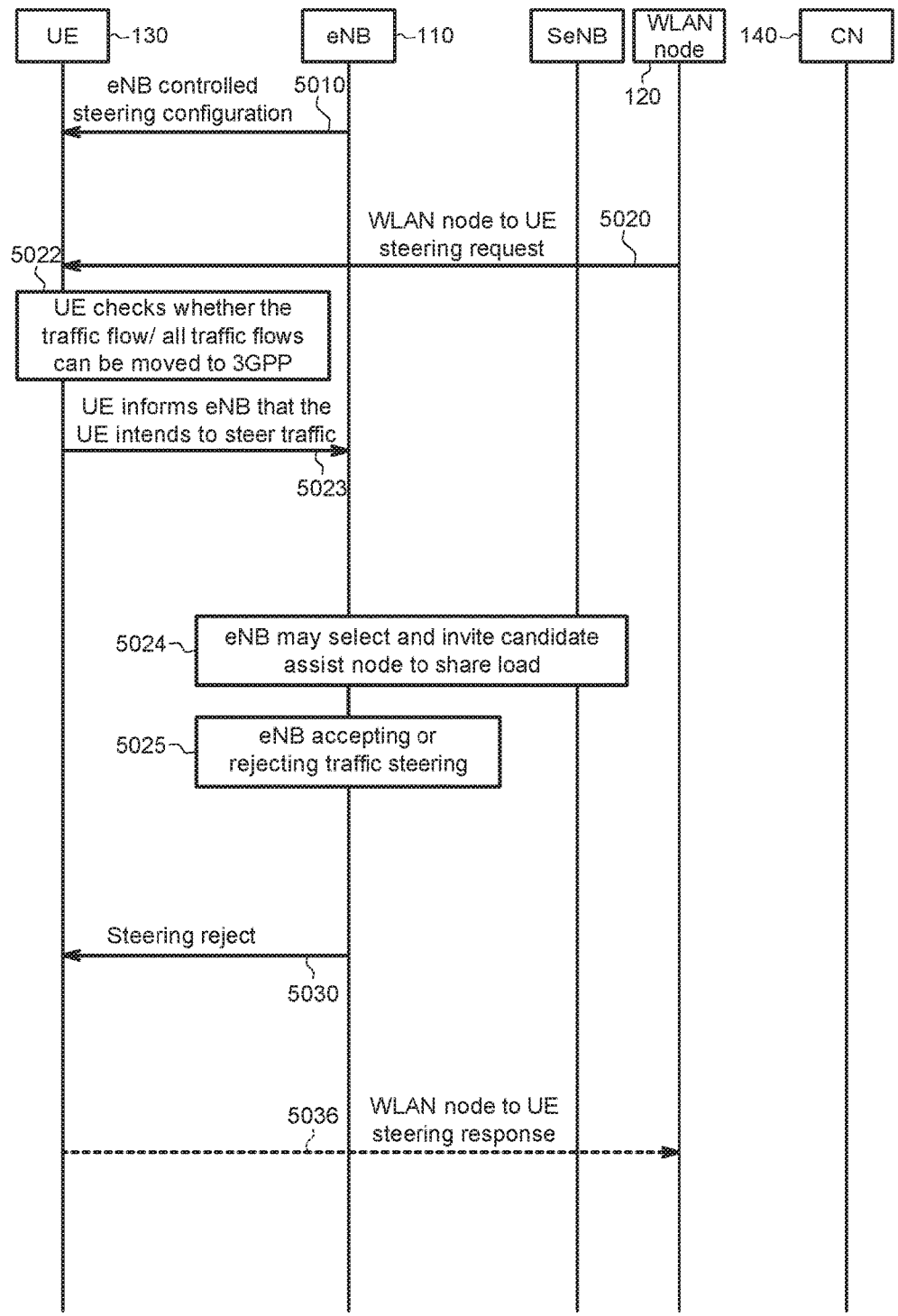

Embodiment B-2.3-d: From WLAN to 3GPP, No eNB/WLAN Node Interface, WLAN Node Initiated to Steer all Traffic of a UE to 3GPP but eNB Rejected FIG. 50 shows a traffic steering method according to the embodiment B-2.3-d of the application. In the embodiment B-2.3-d, the WLAN node 120 initiates a traffic steering request to steer traffic for a target UE to 3GPP, but the eNB 110 rejects.

In step 5010, the eNB 110 sends an "eNB controlled steering configuration" message to the UE 130 in the coverage of the eNB 110.

The WLAN node 120 may send a "WLAN node to UE steering request" message to the UE 130 in step 5020. The WLAN node to UE steering request message includes "all traffic indication" and "a list of {list of {APN, traffic flow ID(s)}}".

Upon receiving the WLAN node to UE steering request message from the WLAN node 120, the UE 130 checks whether the one or more traffic flow(s) indicated in the WLAN node to UE steering request message are allowed to be moved to from WLAN to 3GPP in step 5022.

In step 5023, the UE 130 informs the eNB 110 that the UE 130 intends to steer traffic message to the eNB 110 to obtain the admission for traffic steering. The information in step 5023 may include: (1) "UE ID" identifying the identity of a UE that the UE used in a WLAN for WLAN access, e.g., the MAC address of the UE or the IP address given by the WLAN; (2) "cause" referring the cause of traffic steering (cause=WLAN node-initiated); (3) "the direction of the intended traffic steering" (move in); (4) the identifier of an source access node; (5) QoS info; and/or (6) a list of {APN, traffic flow ID(s)}.

The UE 130 may start a waiting timer for the time window of expecting to receive a response message from the eNB 110 when the UE 130 informs the eNB 110 that the UE 130 intends to steer traffic.

In step 5024, the eNB 110 may select and invite at least one candidate assist node to share load. The eNB 110 avoids selecting the source access node given in the notification from the UE 130.

In step 5025, the eNB 110 decides to accept or reject the traffic steering request. If the eNB 110 decides to reject the traffic steering intention of the requesting UE 130, the eNB 110 sends a "steering reject" message to the requesting UE 130 in step 5030.

Upon receiving the steering reject message from the eNB 110, the UE 130 may send a "WLAN node to UE steering response" message to the WLAN node 120 to acknowledge the steering request sent by the WLAN node 120. The WLAN node to eNB steering response message may include the following information: "indication of rejection" and "cause" (e.g., cause=eNB rejected).

Figure 51:
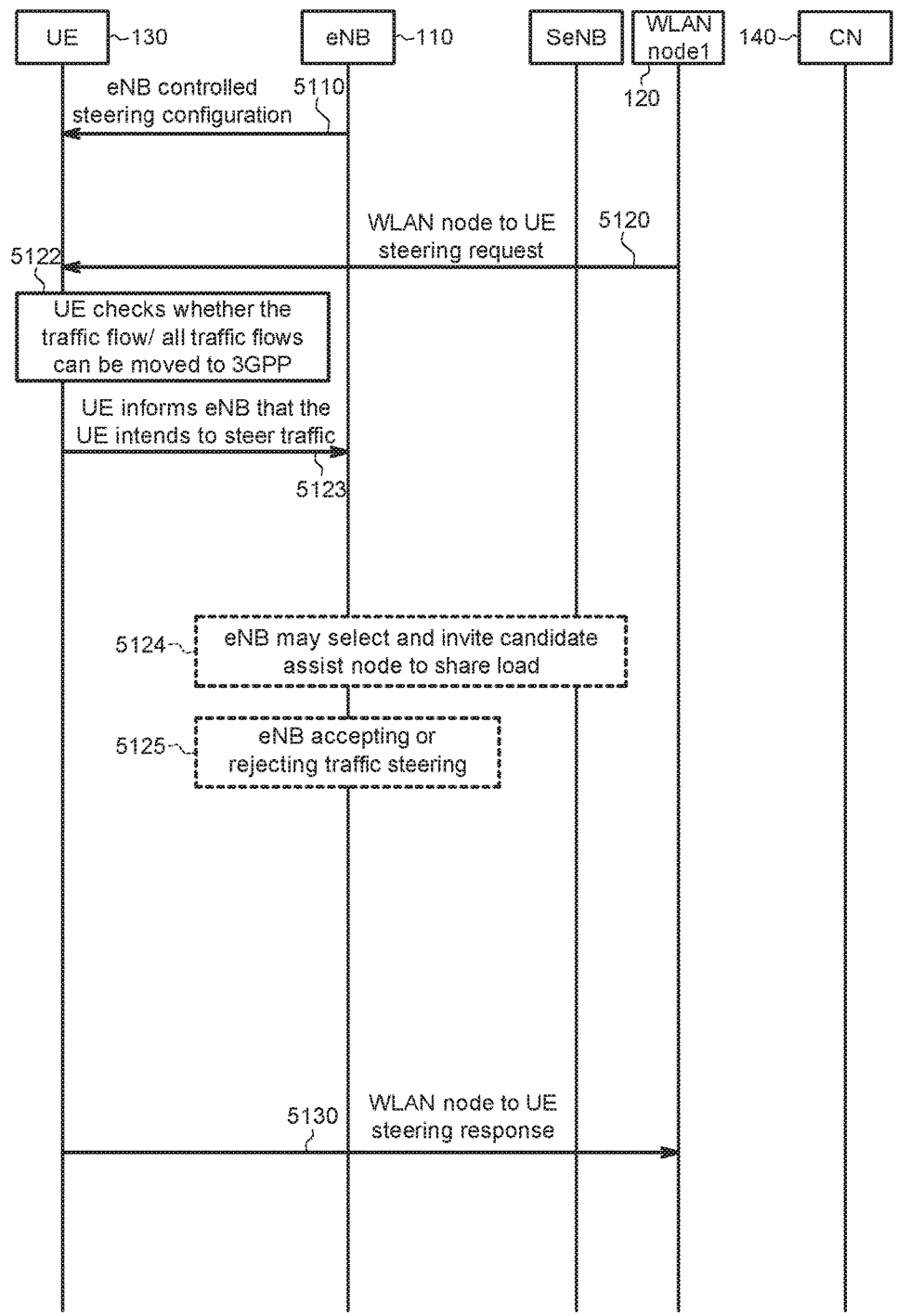

Embodiment B-2.3-e: From WLAN to 3GPP, No eNB/WLAN Node Interface, WLAN Node Initiated to Steer all Traffic of a UE to 3GPP but eNB No Response FIG. 51 shows a traffic steering method according to the embodiment B-2.3-e of the application. In the embodiment B-2.3-e, the WLAN node 120 initiates a traffic steering request to steer traffic for a target UE to 3GPP, but the eNB 110 does not respond.

In step 5110, the eNB 110 sends an "eNB controlled steering configuration" message to the UE 130 in the coverage of the eNB 110.

The WLAN node 120 may send a "WLAN node to UE steering request" message to the UE 130 in step 5120. The WLAN node to UE steering request message includes "all traffic indication" and/or "a list of {list of {APN, traffic flow ID(s)}}".

Upon receiving the WLAN node to UE steering request message from the WLAN node 120, the UE 130 checks whether the one or more traffic flow(s) indicated in the WLAN node to UE steering request message are allowed to be moved to from WLAN to 3GPP in step 5122.

In step 5123, the UE 130 informs the eNB 110 that the UE 130 intends to steer traffic message to the eNB 110 to obtain the admission for traffic steering. The information in step 5123 may include: (1) "UE ID" identifying the identity of a UE that the UE used in a WLAN for WLAN access, e.g., the MAC address of the UE or the IP address given by the WLAN; (2) "cause" referring the cause of traffic steering (cause=WLAN node-initiated); (3) "the direction of the intended traffic steering" (move in); (4) the identifier of an source access node; (5) QoS info; and/or (6) a list of {APN, traffic flow ID(s)}.

The UE 130 may start a waiting timer for the time window of expecting to receive a response message from the eNB 110 when the UE 130 informs the eNB 110 that the UE 130 intends to steer traffic.

In step 5124, the eNB 110 may select and invite at least one candidate assist node to share load. The eNB 110 avoids selecting the source access node given in the notification from the UE 130.

In step 5125, the eNB 110 decides to accept or reject the traffic steering request.

The eNB 110 may perform no action in response to the traffic steering request from the UE 130 or the eNB 110 may decide not to respond to the traffic steering request from the UE 130. If so, no response would be sent to the requesting UE 130 from the eNB 110.

Upon expiry of the waiting timer for the time window of expecting to receive a response message from eNB 110, the UE 130 may send a "WLAN node to UE steering response" message to the WLAN node 120 to acknowledge the steering request sent by the WLAN node 120 in step 5130. The WLAN node to UE steering response message may include the following information: (1) "rejection" referring an indication to reject the traffic steering from WLAN to 3GPP, and/or (2) "cause" presenting that rejection is based on some reason (e.g., cause=others).

Embodiment B-2.4: From WLAN to 3GPP, No eNB/WLAN Node Interface, eNB Initiated

Figure 52:
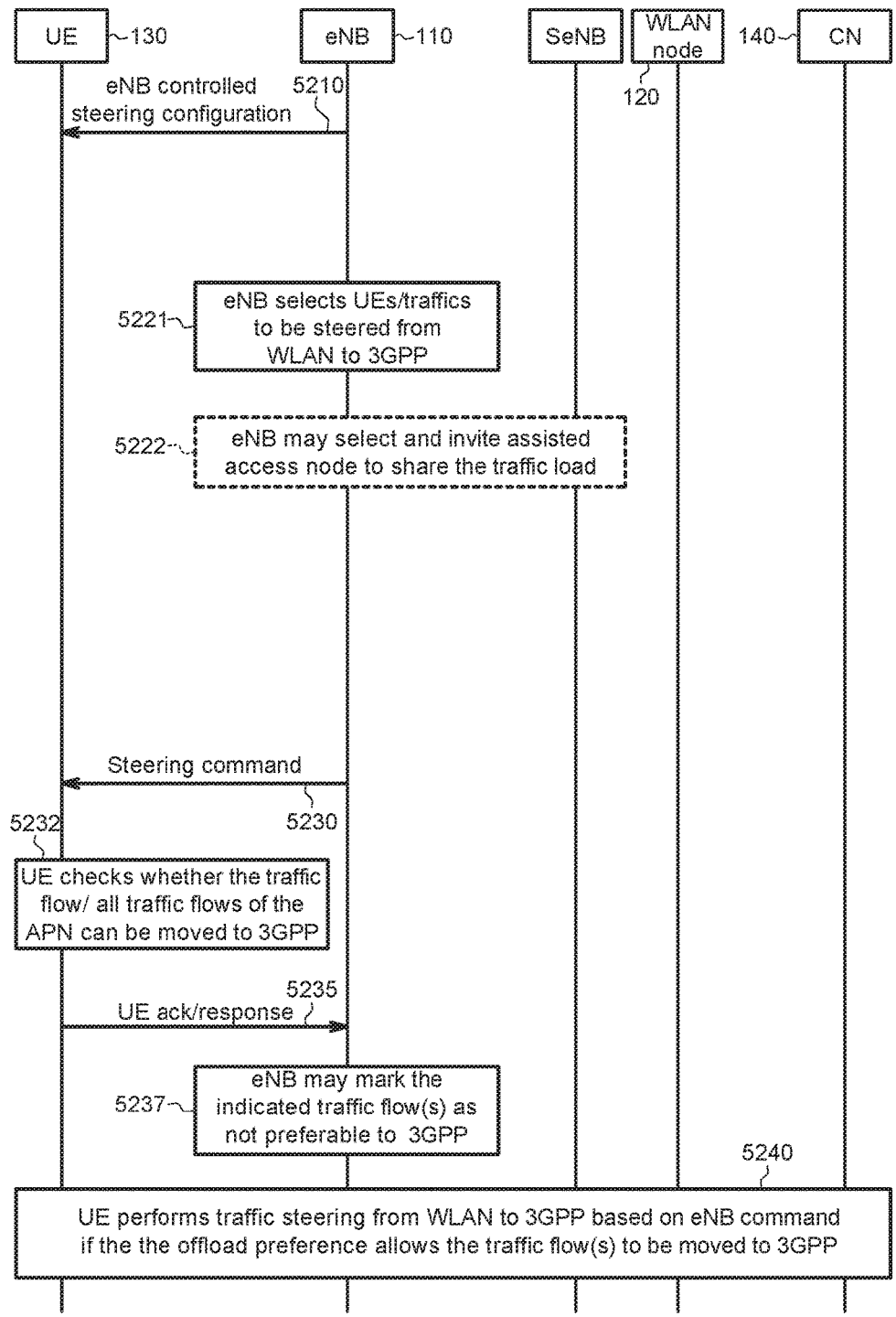

FIG. 52 shows a traffic steering method according to the embodiment B-2.4 of the application. In the embodiment B-2.4, the eNB 110 initiates a traffic steering request.

In step 5210, the eNB 110 sends an "eNB controlled steering configuration" message to one or more UEs 130 in the coverage of the eNB 110.

When the eNB 110 selects UEs and/or traffic flow(s) to be steered from WLAN to 3GPP (e.g., based on the measurement reports from UEs, or load of target access node reported by UEs, or by the estimation of the network element of 3GPP access network) in step 5221, the eNB 110 may select and invite at least one candidate assist node to share load in step 5222.

In step 5230, the eNB 110 sends a "traffic steering command" to inform the UE 130 if the eNB 110 initiates the traffic steering.

Upon receiving the steering command message from the eNB 110, the UE 130 checks whether the one or more traffic flow(s) indicated in the steering command message are allowed (e.g., complying with the policy rules maintained in the UE for offload preference) to be moved to WLAN in step 5232.

In step 5235, the UE 130 may send a "UE ack" or a "UE response" message to the eNB 110 to acknowledge the steering command message sent by the eNB 110.

The UE ack or UE response message may include an indication (e.g., no release traffic flow(s) indication) to indicate that the traffic flow(s) of the specific APN should not be released according to the policy rules maintained in the UE 130. In step 5237, if the eNB 110 receives from the UE the UE ack or UE response message includes the indication (e.g., no release traffic flow(s) indication) to indicate that the one or more traffic flow(s) of the specific APN should not be released, the eNB 110 should not release the specific traffic flow(s); and the eNB 110 may mark the indicated traffic flow(s) as not allowed to be steered to WLAN in step 5237.

In step 5240, the UE performs traffic steering from WLAN to 3GPP based on the steering command if the offload preference allows the bearer(s) to be moved to 3GPP.

Embodiment C: The eNB Requesting WLAN Resource for Split Bearer

Figure 53:
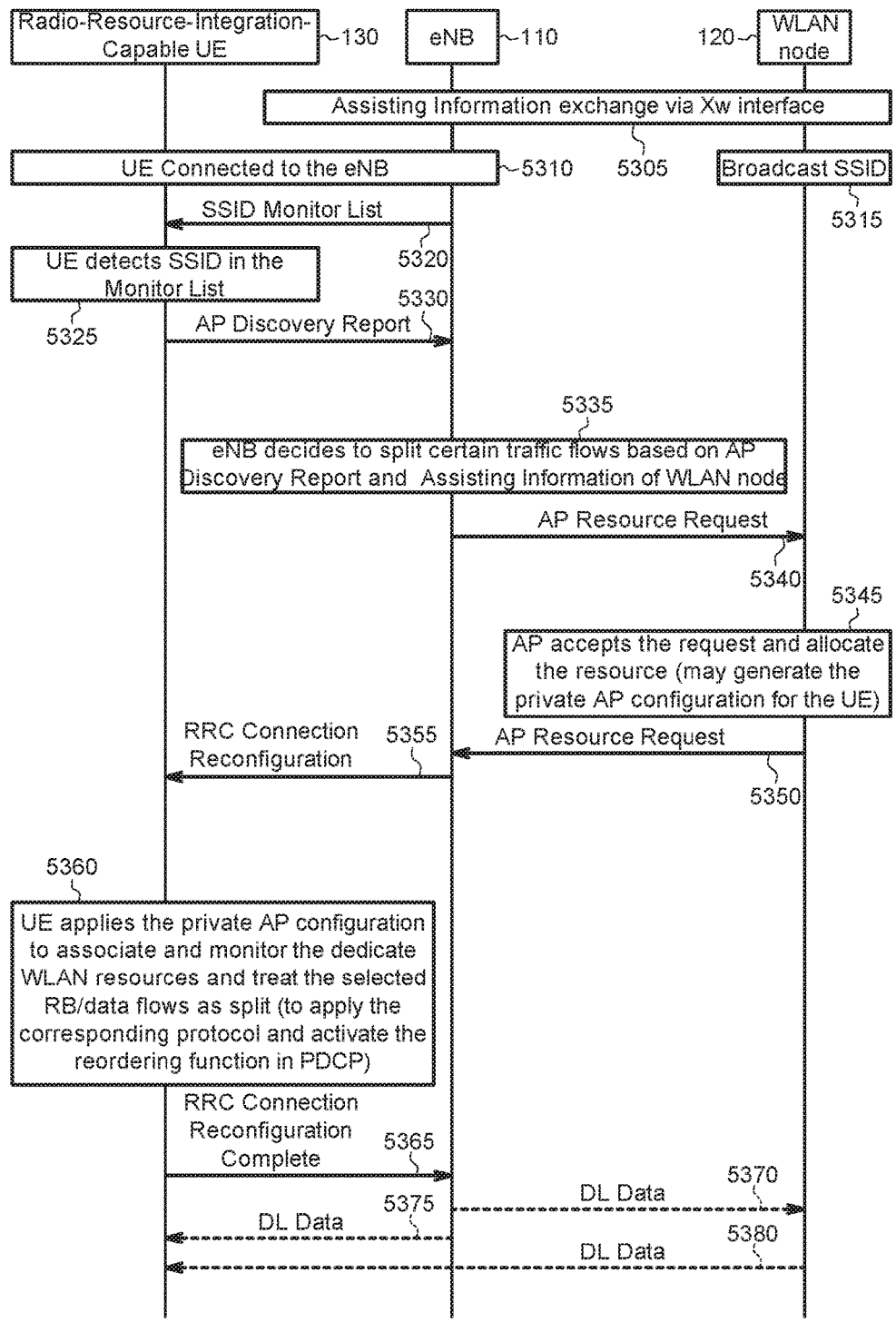
FIG. 53 shows a signal flow according to an embodiment of the application, which shows how the eNB shares load with other access node.

FIG. 53 shows a signal flow chart according to the embodiment C of the application. The embodiment C shows how the eNB 110 shares load with other access node.

In step 5305, the eNB 110 and the WLAN node 120 exchanges assisting information with each other via the interface Xw. The assisting Information exchanged between the eNB 110 and the WLAN node 120 may include: (1) the public/common SSID of the WLAN node 120; (2) the BSSID of an aggregated WLAN node to identify a specific aggregated WLAN node; (3) the capability of the aggregated WLAN node which includes the supported/selected channel frequencies and bandwidth of the aggregated WLAN node (thus the eNB 110 may be aware of the capability of the WLAN node); and/or (4) the IP address and the port number of the Xw interface binding: including the IP addresses and port numbers of the Xw interface control entities at eNB and at the aggregated WLAN node, respectively.

About the public/common SSID of the WLAN node 120, there may be a specific SSID configured (by MNO (Mobile Network Operator) or SPO (Service Provider Organization)) to all aggregated WLAN node in a realm of a PLMN (Public Land Mobile Network). The SSID is broadcasted by the aggregated WLAN node in beacons to allows the WLAN node be discovered by the UE 130.

In step 5310, the UE 130 connects to the target eNB 110. In the embodiment C, the UE 130 is a radio-resource-integration-capable UE. In details, the radio-resource-integration-capable UE is capable to access the LTE access network and the WLAN access network simultaneously and capable to support radio resource integration of the LTE access network and the WLAN access network.

The term "split bearer" is a bearer which utilizes both the radio resources of the eNB 110 and the WLAN node 120. For split bearers, the S1-U (S1 for the user plane) connection to the S-GW (serving gateway) is terminated in the eNB 110. Marked PDCP (Packet Data Convergence Protocol) PDU (protocol data unit) is transferred between the eNB 110 and the WLAN node 120 via the interface Xw. The WLAN node and eNB are involved in transmitting data of this bearer type over the air interface.

The term "assisted bearer" is a bearer which utilize the radio resource of the WLAN node 120. For assisted bearers, the S1-U connection to the S-GW is terminated in the eNB 110. Marked PDCP PDU data is transferred between the eNB 110 and the WLAN node 120 via the interface Xw. Only the WLAN node is involved in transmitting data of this bearer type over the air interface.

The UE 130 may inform its capabilities (whether it is radio-resource-integration-capable or not) to the eNB 110 in the RRC connection procedure.

In step 5315, the WLAN node 120 broadcasts SSID.

After the radio-resource-integration-capable UE 130 is connected to the eNB 110, the eNB 110 sends a "SSID monitor list" to the UE 130 in step 5320. The SSID monitor list contains the SSID(s) of the WLAN node(s) that the eNB 110 can request the resource for split bearer(s).

The WLAN node having SSID is in the SSID monitor list may have higher priorities.

According to the deployments (whether there is an Xw interface to the WLAN node) and/or the assisting information of the WLAN node, the content of the SSID monitor list could be changed.

The eNB 110 could sends the SSID monitor list at any time when necessary.

Upon receiving the SSID monitor list, the UE 130 checks that whether the UE 130 detects any SSID in the SSID monitor list in step 5325. If there is at least one of the SSID in the SSID monitor list detected by the UE 130, the UE 130 sends the "AP discovery report" to the eNB 110 in step 5330. The SSID detection report may include (1) SSID of WLAN node that the UE selected and/or (2) SSID(s) of WLAN node(s) having signal quality higher than the threshold (including the WLAN node that the UE selected).

If the UE can detect at least one of the SSID in the SSID monitor list, it means that the UE opens its WLAN module. The UE may have completed the authentication procedure to one of the detected SSID.

The AP discovery report may include SSID, BSSID, UE MAC address, signal quality, and/or UE class. The AP discovery report may be sent periodically or by event-triggered (e.g., when a WLAN node is added to/removed from the WLAN node list in the previous AP discovery report).

There are several different ways for the UE 130 to report the AP discovery report. In one of the report ways, the UE 130 scans the frequencies and select one WLAN node to perform the authentication and the association procedures (i.e., AP selection). After successful AP selection, the UE 130 send the AP discovery report (related to the selected AP (i.e., a WLAN node)) to the eNB 10 if the SSID of this selected AP is in the SSID monitor list.

In another of the report ways, after successful authentication by the UE 130, the UE 130 send the AP discovery report to the eNB 110 and the AP discovery report may contain the information of more than one AP. For example, the UE 130 reports all the BSSID(s) of WLAN node(s) having the signal quality above the given threshold. In the second way, the eNB 110 may need to configure the threshold value in the SSID monitor List or by broadcasting.

Upon receiving the AP discovery report, the eNB would decide whether or not to use WLAN resources for certain bearers based on the AP discovery report and/or the assisting Information from the WLAN node 120 in step 5335.

Once the eNB 110 decides to split certain bearers, the eNB 110 sends the "AP resource request" to the WLAN node 120 in step 5340. The AP resource request may include RB (radio bearer) ID(s), corresponding QoS parameters, and/or UE MAC address.

Once the WLAN node 120 accepts the request from the eNB 110 in step 5345, the WLAN node 120 allocates the resource and the WLAN node 120 may generate the private AP configuration for the UE 130. The private AP configuration may include the private SSID, central frequency, bandwidth for the UE, security info (such as keys, algorithm, etc.) for association, IP address of the UE and/or time pattern.

The WLAN node 120 sends back the "AP resource acknowledgement in step 5350. The AP resource acknowledgement includes the private AP configuration generating by the WLAN node 120 for granting the WLAN resource.

Upon receiving the AP resource acknowledgement, the eNB sends the "RRCConnectionReconfiguration" message to the UE 130 in step 5355. The RRCConnectionReconfiguration message includes radio resource configuration for split bearer, private AP configuration (deriving from the AP resource acknowledgement) together with the DC-RB-type-change indication (to-be-split) to the UE 130 to configure the split bearer(s).

Upon receiving the RRCConnectionReconfiguration message containing the radio resource configuration for split bearer, the private AP configuration (deriving from the AP resource acknowledgement) and DC-RB-type-change indication (to-be-split) from the eNB 110, the UE applies the configurations to setup the split bearer(s) in step 5360. For example, the UE applies the private AP configuration to associate and monitor the dedicate WLAN resources and treats the selected RB/data flows as split (to apply the corresponding protocol for the split bearer and to activate the reordering function in PDCP). Also, the UE 130 may need to perform authentication procedure before performing association if the private AP configuration is related to another WLAN node, not the currently WLAN node the UE performed authentication to.

After successful reconfigurations, the UE sends the "RRCConnectionReconfigurationComplete" message to the eNB 110 in step 5365.

Upon receiving the RRCConnectionReconfigurationComplete message from the UE 130, the eNB 110 transmits part of data via the interface Xw to the WLAN node 120 in step 5370 and transmits part of data via the interface Uu to the UE 130 in step 5375. The WLAN node 120 transmits those received data to the UE 130 in step 5380 according to the resource allocation granted and the UE 130 would receive data at the granted resource. Thus, by so, the WLAN node 120 may share the load of the eNB 110.

While providing the private AP configuration, the eNB 110 may transmit the AP measurement configuration and/or AP failure report configuration to gather the information from the WLAN node 120 in the same RRCConnectionReconfiguration message or in other messages. The AP measurement configuration may include the measurement type, the thresholds (for event-triggered report) and the period (for periodic report). The AP failure report configuration may include (1) thresholds of WLAN node signal quality and/or throughput; and (2) number and timer of attempts to associate with the WLAN node.

According to the AP measurement report and/or AP failure report, the eNB 110 may decide whether or not to re-configure the UE 130 (e.g., not to use WLAN resource, direct the UE to use another WLAN resource).

In summary, in one embodiment of the application, any one of the UE 130 and the eNB 110 decides whether to request a traffic steering; if the one of the UE 130 and the eNB 110 requests the traffic steering, the other one of the UE 130 and the eNB 110 decides whether to accept or reject the traffic steering; and if the other one of the UE 130 and the eNB 110 accepts the traffic steering, the UE 130 performs a selective traffic steering. Traffic flow(s) in the selective traffic steering are selected among the traffic flows of the traffic steering request/command wherein the traffic steering request/command includes a plurality of traffic flows. That is to say, in the application, when the UE performs the selective traffic steering, the UE steers a selective part of the traffic flows included in the traffic steering request/command.

In summary, in another embodiment of the application, if the UE 130 initiates a traffic steering to the eNB 110 to inform the eNB 110 that the UE 130 intends to steer traffic, the UE 130 performs a selective traffic steering after the UE 130 is informed by the eNB 110 that the eNB 110 accepts the traffic steering initiated by the UE 130; and if the eNB 110 initiates the traffic steering to the UE 130 to inform the UE 130 that the eNB 110 intends to steer traffic, the UE 130 determines whether to accept or reject the traffic steering initiated by the eNB 110, and the UE 130 performs a selective traffic steering after the UE 130 accepts the traffic steering initiated by the eNB 110.

In summary, in still another embodiment of the application, if the UE 130 initiates a traffic steering to the eNB 110 to inform the eNB 110 that the UE 130 intends to steer traffic, the eNB 110 determines whether to accept or reject the traffic steering initiated by the UE 130; and after the eNB 110 initiates the traffic steering, the eNB 110 commands the UE 130 to perform the selective traffic steering if the UE 130 confirms the traffic steering initiated from the eNB 110.

In summary, in yet another embodiment of the application, the WLAN node 120 initiates a traffic steering to the eNB 110; the eNB 110 maps the WLAN UE identifier of the UE 130 with the 3GPP UE identifier of the UE 130; if the eNB 110 accepts the traffic steering initiated by the WLAN node 120, the eNB 110 informs the UE 130; the UE 130 checks about whether one or more traffic flow(s) indicated in the traffic steering are allowed to be moved; and the UE 130 performs the traffic steering as a selective traffic steering if the UE 130 confirms that the one or more traffic flow(s) to be moved.

As described above, in the embodiments of the application, traffic steering initiated by the UE or the CN or the WLAN node is further admitted by the eNB for enhancing the utilization and load balance of the radio resources.

Further, in the embodiments of the application, the UE may assign which of the UE traffic flow(s) is/are to be steered (i.e. partial/selective traffic steering). Thus, by partial/selective traffic steering, the resource efficiency is improved.

Further, in the embodiments of the application, traffic steering determined by the eNB is further confirmed by the UE to avoid possible conflicts with operator policies.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A traffic steering method in a heterogeneous radio access network system, the heterogeneous radio access network system including a mobile device, a first base station operated in a first wireless access network and a second base station operated in a second wireless access network different from the first wireless access network, the mobile device wireless communicating with the first base station and the second base station, the traffic steering method comprising:

sending a first message to request a traffic steering by any one of the mobile device and the first base station, the first message indicating a plurality of traffic flows between the mobile device and the first base station;

deciding whether to accept or reject the first message by the other one of the mobile device and the first base station and sending a second message by the other one of the mobile device and the first base station to the one of the mobile device and the first base station which sends the first message;

sending a third message by the one of the mobile device and the first base station according to the second message if the one of the mobile device and the first base station is the mobile device; and if the other one of the mobile device and the first base station accepts the first message, performing a selective traffic steering by the mobile device, wherein the selective traffic steering comprises one or more traffic flow(s), and the one or more traffic flow(s) in the selective traffic steering which are to be steered from the first base station to the second base station are selected by the mobile device from among the plurality of traffic flows indicated in the first message.

2. The traffic steering method according to claim 1, wherein if the mobile device determines that a traffic steering event occurs or the mobile device receives an indication from a core network that the core network requests a traffic steering, the mobile device sends the first message to inform the first base station that the mobile device intends to steer traffic, wherein the first message is a traffic steering request;

the first base station sends the second message to inform the mobile device if the first base station accepts the first message; and the mobile device sends the third message to the first base station to acknowledge the second message sent by the first base station, and the mobile device performs the selective traffic steering.

3. The traffic steering method according to claim 2, wherein the first message includes the plurality of traffic flows;

one or more traffic flow(s) in the second message are selected from among the plurality of traffic flows in the first message; and the one or more traffic flow(s) in the selective traffic steering are the one or more traffic flow(s) in the second message.

4. The traffic steering method according to claim 2, wherein the first message from the mobile device includes a mobile device identifier, a traffic steering cause, a direction of the traffic steering, an identifier of a target access node, a quality of service information or a list to identify one or more traffic flow(s) to be steered; and the mobile device identifier is an identifier that the mobile device used in a second wireless access network different from the first wireless access network.

5. The traffic steering method according to claim 2, wherein the mobile device starts a waiting timer for expecting to receive a response message from the first base station after the mobile device sends the first message.

6. The traffic steering method according to claim 2, wherein if the first base station accepts the first message, the first base station selects another target access node for the mobile device.

7. The traffic steering method according to claim 2, wherein the second message from the first base station to the mobile device includes an identifier of a target access node, an assistance information to assist the mobile device for access network detection, selection and for traffic steering, or a list to identify one or more traffic flow(s) to be steered.

8. The traffic steering method according to claim 2, wherein when the mobile device performs the selective traffic steering, the mobile device utilizes the following information: a traffic steering cause, a target access node identifier indicated by the first base station, a list of one or more traffic flow identifier(s) identifying one or more traffic flow(s) to be steered, or access point name (APN) information which identifies a network connection that the one or more traffic flow(s) are to be transmitted through.

9. The traffic steering method according to claim 2, wherein
if the first base station decides to reject the first message from the mobile device, the first base station sends the second message to the mobile device; and
the second message comprises: a rejection cause, or an assistance information to assist the mobile device for access network detection and selection and for traffic steering; and
if a prohibit timer started by the mobile device is expired, and the traffic steering event from 3GPP to WLAN holds or another event of traffic steering occurs, the mobile device sends another first message to the first base station.

10. The traffic steering method according to claim 2, wherein
after the mobile device sends the first message to the first base station, the mobile device starts a timer for waiting awaiting a response from the first base station, and
if the waiting timer started by the mobile device is expired and no response is received from the first base station, the mobile device starts a prohibit timer; and
if the prohibit timer started by the mobile device is expired, and an event of traffic steering occurs, the mobile device sends another first message to the first base station.

11. The traffic steering method according to claim 1, wherein
the first base station determines whether a traffic steering event occurs;
if the traffic steering event occurs, the first base station sends the first message to inform the mobile device that the first base station intends to initiate the traffic steering, wherein the first message is a traffic steering command;
the mobile device determines whether to accept or reject the first message from the first base station; and
the mobile device sends the second message based on determination made by the mobile device.

12. The traffic steering method according to claim 11, wherein
the second message includes the plurality of traffic flows in the first message; and
the one or more traffic flow(s) in the selective traffic steering are the one or more traffic flows in the second message.

13. The traffic steering method according to claim 11, wherein
the first base station selects the plurality of traffic flow(s) of the first message to be steered;
upon receiving the first message from the first base station, the mobile device checks whether the traffic flows in the first message are to be moved;
the mobile device sends the second message to the first base station to acknowledge the first message, wherein the second message comprises an indication to indicate that one or more traffic flow(s) of the first message are not to be released;
if the first base station receives the second message indicating the one or more traffic flow(s) are not be released, the first base station does not release the indicated one or more traffic flow(s), and marks the indicated one or more traffic flow(s) as not to be steered; and
the mobile device performs the selective traffic steering.

14. The traffic steering method according to claim 1, wherein
the second base station sends a fourth message to the first base station;
if the first base station receives the fourth message from the second base station, the first base station maps a second mobile device identifier of the mobile device under the second wireless access network with a first mobile device identifier of the mobile device under the first wireless access network;
if the mapping by the first base station is successful, and the first base station accepts the fourth message, the first base station sends the first message to the mobile device;
upon receiving the first message from the first base station, the mobile device checks whether one or more traffic flow(s) indicated in the first message are to be moved;
if the first base station receives from the mobile device the second message which indicates that the one or more traffic flow(s) are not to be released, the first base station does not release the one or more traffic flow(s); and the first base station marks the one or more traffic flow(s) as not to be steered; and
the mobile device performs the selective traffic steering.

15. The traffic steering method according to claim 14, wherein
the second base station further sends a fifth message to the first base station;
if the first base station receives the fifth message, and if the first base station accepts to perform a traffic steering, the first base station sends a sixth message to the second base station; and
the second base station decides traffic flow(s) to be steered.

16. The traffic steering method according to claim 1, wherein
the second base station sends a seventh message to the mobile device;
the mobile device checks whether one or more traffic flow(s) of the seventh message are allowed to be moved;
the mobile device sends the first message;
if the first base station accepts the first message, the first base station sends the second message to the mobile device; and
the mobile device performs the selective traffic steering.

17. The traffic steering method according to claim 1, wherein
the second base station sends an eighth message to the first base station to steer all traffic flows of the mobile device.

18. The traffic steering method according to claim 1, wherein
if the first base station accepts the first message, the first base station selects another target access node for load sharing.

19. A traffic steering method in a heterogeneous radio access network system, the heterogeneous radio access network system including a mobile device, a first base station operated in a first wireless access network and a second base station operated in a second wireless access network different from the first wireless access network, the mobile device wireless communicated with the first base station and the second base station, the traffic steering method comprising:

sending, by the mobile device, a first message to the first base station to inform the first base station that the mobile device intends to steer traffic, the first message indicating a plurality of traffic flows between the mobile device and the first base station;

receiving, by the mobile device, a second message from the first base station, wherein one or more traffic flow(s) indicated in the second message are selected from among the plurality of traffic flows indicated in the first message;

sending a third message to the first base station from the mobile device according to the second message; and performing, by the mobile device, a selective traffic steering according to the second message, wherein one or more traffic flow(s) in the selective traffic steering which are to be steered from the first base station to the second base station are selected by the mobile device from among the one or more traffic flows indicated in the second message.

20. The traffic steering method according to claim 19, wherein
the mobile device determines that a traffic steering event occurs or the mobile device receives an indication of traffic steering; and
the mobile device sends the first message.

21. The traffic steering method according to claim 19, wherein
the traffic steering request includes a mobile device identifier that the mobile device used in a second wireless access network different from the first wireless access network, and/or a list to identify one or more traffic flow(s) to be steered.

22. A traffic steering method in a heterogeneous radio access network system, the heterogeneous radio access network system including a mobile device, a first base station operated in a first wireless access network and a second base station operated in a second wireless access network different from the first wireless access network, the mobile device wireless communicated with the first base station and the second base station, the traffic steering method comprising:
receiving, by the mobile device, a first message from the first base station, the first message indicating a plurality of traffic flows between the mobile device and the first base station;
determining, by the mobile device, whether to accept or reject the first message;
sending, by the mobile device, a second message to the first base station based on determination made by the mobile device when the mobile device accepts the first message, wherein traffic flow(s) indicated in the second message are selected from among the plurality of traffic flows indicated in the first message; and
performing, by the mobile device, a selective traffic steering wherein traffic flow(s) in the selective traffic steering which are to be steered from the first base station to the second base station are selected by the mobile device from among the traffic flows indicated in the second message.

23. A heterogeneous radio access network system including:
a mobile device;
a first base station operated in a first wireless access network, the mobile device wireless communicated with the first base station; and
a second base station operated in a second wireless access network different from the first wireless access network, the mobile device wireless communicating with the second base station;
wherein any one of the mobile device and the first base station sends a first message to request a traffic steering, the first message indicating a plurality of traffic flows between the mobile device and the first base station;
the other one of the mobile device and the first base station decides whether to accept or reject the first message and the other one of the mobile device and the first base station sends a second message to the one of the mobile device and the first base station which sends the first message;
the one of the mobile device and the first base station sends a third message according to the second message if the one of the mobile device and the first base station is the mobile device; and
if the other one of the mobile device and the first base station accepts the first message, the mobile device performs a selective traffic steering, wherein the selective traffic steering comprises one or more traffic flow (s), and the one or more traffic flow(s) in the selective traffic steering which are to be steered from the first base station to the second base station are selected by the mobile device from among the plurality of traffic flows indicated in the first message.

24. The heterogeneous radio access network system according to claim 23, wherein
if the mobile device determines that a traffic steering event occurs or the mobile device receives an indication from a core network that the core network requests a traffic steering, the mobile device sends the first message to inform the first base station that the mobile device intends to steer traffic, wherein the first message is a traffic steering request;
the first base station sends the second message to inform the mobile device if the first base station accepts the first message; and
the mobile device sends the third message to the first base station to acknowledge the second message sent by the first base station, and the mobile device performs the selective traffic steering.

25. The heterogeneous radio access network system according to claim 24, wherein
the first message includes the plurality of traffic flows;
one or more traffic flow(s) in the second message are selected from among the plurality of traffic flows in the first message; and
the one or more traffic flow(s) in the selective traffic steering are the one or more traffic flow(s) of the second message.

26. The heterogeneous radio access network system according to claim 23, wherein
the first base station determines whether a traffic steering event occurs;
if the traffic steering event occurs, the first base station sends the first message to inform the mobile device that the first base station intends to initiate the traffic steering, wherein the first message is a traffic steering command;
the mobile device determines whether to accept or reject the first message from the first base station; and
the mobile device sends the second message based on determination made by the mobile device.

27. The heterogeneous radio access network system according to claim 26, wherein the second message includes the plurality of traffic flows in the first message;

the one or more traffic flow(s) in the selective traffic steering are the one or more traffic flows in the second message.

\* \* \* \* \*